(12) United States Patent
Talagala et al.

(10) Patent No.: US 10,102,075 B2
(45) Date of Patent: Oct. 16, 2018

(54) SYSTEMS AND METHODS FOR STORAGE COLLISION MANAGEMENT

(71) Applicant: SanDisk Technologies LLC, Plano, TX (US)

(72) Inventors: Nisha Talagala, Livermore, CA (US); David Flynn, Sandy, UT (US); Swaminathan Sundararaman, San Jose, CA (US); Sriram Subramanian, San Jose, CA (US); David Nellans, Salt Lake City, UT (US); Robert Wipfel, Draper, UT (US); John Strasser, Syracuse, UT (US)

(73) Assignee: SanDisk Technologies LLC, Addison, TX (US)

( * ) Notice: Subject to any disclaimer, the term of this patent is extended or adjusted under 35 U.S.C. 154(b) by 167 days.

(21) Appl. No.: 15/080,161

(22) Filed: Mar. 24, 2016

(65) Prior Publication Data

US 2016/0203053 A1 Jul. 14, 2016

Related U.S. Application Data

(63) Continuation of application No. PCT/US2014/057227, filed on Sep. 24, 2014.

(Continued)

(51) Int. Cl.
| | | |
|---|---|---|
| *G06F 11/00* | (2006.01) | |
| *G06F 11/14* | (2006.01) | |
| *G06F 3/06* | (2006.01) | |
| *H04L 29/08* | (2006.01) | |
| *G06F 12/00* | (2006.01) | |
| *G06F 17/30* | (2006.01) | |

(Continued)

(52) U.S. Cl.
CPC ........ *G06F 11/1438* (2013.01); *G06F 3/0619* (2013.01); *G06F 3/0653* (2013.01); *G06F 3/0683* (2013.01); *G06F 11/2094* (2013.01); *G06F 12/00* (2013.01); *G06F 17/30* (2013.01); *H04L 67/1097* (2013.01); *G06F 3/0688* (2013.01); *G06F 11/1435* (2013.01); *G06F 11/1441* (2013.01); *G06F 12/0246* (2013.01); *G06F 2201/805* (2013.01)

(58) Field of Classification Search
CPC ............. G06F 11/1438; G06F 11/2094; G06F 11/1435; G06F 11/1441; G06F 3/0619; G06F 3/0653; G06F 3/0683; G06F 3/0688; G06F 12/00; G06F 12/0246; G06F 17/30; G06F 2201/805; H04L 67/1097
See application file for complete search history.

(56) References Cited

U.S. PATENT DOCUMENTS

| | | | | |
|---|---|---|---|---|
| 2012/0310882 A1* | 12/2012 | Werner | ............... | H04L 67/1095 707/624 |
| 2013/0042060 A1* | 2/2013 | Marukame | ........ | G06F 17/30982 711/108 |
| 2014/0067772 A1* | 3/2014 | Sabbouh | ........... | G06F 17/30312 707/690 |

* cited by examiner

*Primary Examiner* — Bryce P Bonzo
*Assistant Examiner* — Anthony J Amoroso
(74) *Attorney, Agent, or Firm* — Vierra Magen Marcus LLP

(57) ABSTRACT

A storage layer of a non-volatile storage device may be configured to provide key-value storage services. Key conflicts may be resolved by modifying the logical interface of data stored on the non-volatile storage device. Resolving a key conflict may comprise identifying an alternative key and implementing one or more range move operations configured to bind the stored data to the alternative key. The move (Continued)

operations may be implemented without relocating the data on the non-volatile storage device.

20 Claims, 32 Drawing Sheets

Related U.S. Application Data

(60) Provisional application No. 61/881,861, filed on Sep. 24, 2013.

(51) Int. Cl.
*G06F 11/20* (2006.01)
*G06F 12/02* (2006.01)

SYSTEMS AND METHODS FOR STORAGE COLLISION MANAGEMENT

TECHNICAL FIELD

This disclosure relates to storage systems and, in particular, to systems and methods for efficiently managing storage collisions, such as hash name collisions.

DETAILED DESCRIPTION

Figure 1A:
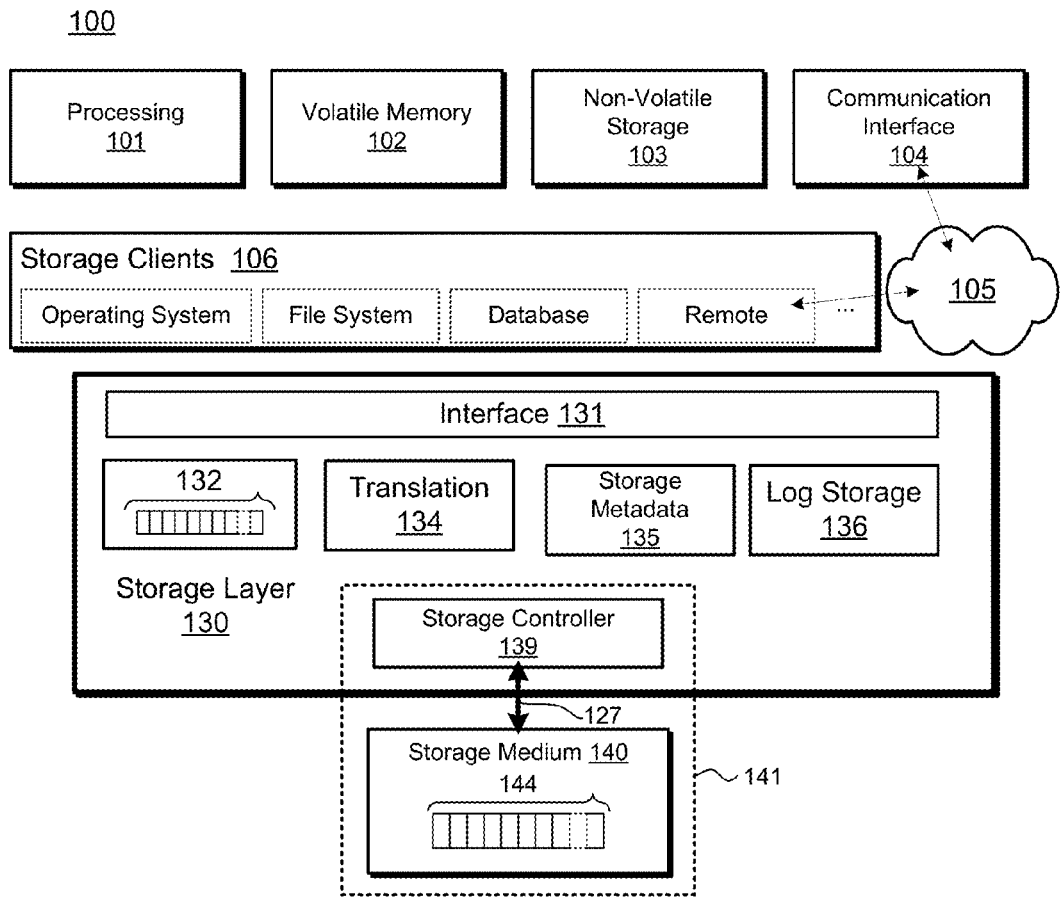
FIG. 1A is a block diagram of one embodiment of a storage system for collision management.

Disclosed herein are embodiments of a method for managing key-value storage operations, comprising storing key-value pairs on a non-volatile storage device, the key value pairs comprising keys and respective data values, detecting a name conflict pertaining to an identified key-value pair stored on the non-volatile storage device, and resolving the name conflict by binding a data segment of the identified key-value pair stored on the non-volatile storage device to a different key such that the binding between the different key and the data value persists after a restart event. In some embodiments, binding comprises storing a packet on the non-volatile storage device configured to associate the data segment of the identified key-value pair stored on the non-volatile storage device with the different key. Alternatively, or in addition, binding may comprise storing metadata on the non-volatile storage device configured to associate an intermediate identifier corresponding to a data segment of the identified key-value pair with the different key.

The disclosed method may further include maintaining a key map corresponding to key-value pairs stored on the non-volatile storage device, identifying the key conflict by use of the key map, and/or generating the different key. In some embodiments, the method includes relocating the data of the identified key-value pair from a first storage address on the storage device to a second storage address on the storage device, and associating the relocated data with persistent metadata corresponding to the different key.

Disclosed herein are embodiments of an apparatus for managing key-value storage operations, comprising a key-value storage module configured to detect a key collision involving a key of a data segment stored on a storage medium, a key translation module configured to select an alternative key for the stored data segment, and a storage layer configured to modify a key mapping of the stored data segment to associate the stored data segment with the alternative key. In some embodiments, the storage layer is further configured to store persistent data on the storage medium configured to tie the stored data segment to the alternative key. The persistent data may be configured to bind a storage address of the stored data segment to the alternative key and/or bind an intermediate address of the stored data to the alternative key.

In certain embodiments, the data segment is stored in a data packet comprising the key of the data segment, and the storage layer is configured to provide access to the data segment stored in the data packet by use of the alternative key. The key collision may correspond to a request to store a new key-value pair on the storage medium. In response, the storage layer may allocate intermediate identifiers for the new key-value pair, and bind the allocated intermediate identifiers to a data segment corresponding to the new key-value pair stored on the storage medium.

In some embodiments, the apparatus comprises a log storage module configured to store the data segment corresponding to the new key-value pair in a packet format comprising the key, and/or a translation layer configured to map the key to the intermediate identifiers allocated for the new key-value pair. The key-value storage module may be configured to generate the alternative key by use of data of the data segment stored on the storage medium (e.g., by use of two-layer hashing).

Disclosed herein are embodiments of a system for managing storage naming collisions, comprising means for associating a data segment stored at a first set of one or more storage addresses of a non-volatile storage medium with persistent metadata configured to bind the data segment to an identifier, means for detecting a name conflict pertaining to the identifier of the stored data segment, and means for binding the data segment stored at the first set of storage addresses of the non-volatile storage medium to a different identifier in response to detecting the name conflict. The system may further include means for storing a packet on the non-volatile storage medium configured to bind the first set of storage addresses to the different identifier. The packet may be configured to bind the different identifier to one or more intermediate addresses, and wherein the intermediate addresses are bound to the first set of storage addresses of the non-volatile storage medium. In some embodiments, the means for detecting the name conflict comprises means for maintaining a key address space comprising identifiers corresponding to data segments stored on the non-volatile storage medium.

FIG. 1A is a block diagram of one embodiment of a computing system 100 comprising a storage layer 130 configured to provide storage services to one or more storage clients 106. The storage layer 130 may be configured to provide open-to-close file services, as disclosed in further detail herein. The computing system 100 may comprise any suitable computing device, including, but not limited to, a server, desktop, laptop, embedded system, mobile device, and/or the like. In some embodiments, the computing system 100 may include multiple computing devices, such as a cluster of server computing devices. The computing system 100 may comprise processing resources 101, volatile memory resources 102 (e.g., random access memory (RAM)), non-volatile storage resources 103, and a communication interface 104. The processing resources 101 may include, but are not limited to, general purpose central processing units (CPUs), application-specific integrated circuits (ASICs), and programmable logic elements, such as field programmable gate arrays (FPGAs), programmable logic arrays (PLGs), and the like. The non-volatile storage resources 103 may comprise a non-transitory machine-readable storage medium, such as a magnetic hard disk, solid-state storage medium, optical storage medium, and/or the like. The communication interface 104 may be configured to communicatively couple the computing system 100 to a network 105. The network 105 may comprise any suitable communication network including, but not limited to, a Transmission Control Protocol/Internet Protocol (TCP/IP) network, a Local Area Network (LAN), a Wide Area Network (WAN), a Virtual Private Network (VPN), a Storage Area Network (SAN), a Public Switched Telephone Network (PSTN), the Internet, and/or the like.

The computing system 100 may comprise a storage layer 130, which may be configured to provide storage services to one or more storage clients 106. The storage clients 106 may include, but are not limited to, operating systems (including bare metal operating systems, guest operating systems, virtual machines, virtualization environments, and the like), file systems, database systems, remote storage clients (e.g., storage clients communicatively coupled to the computing system 100 and/or storage layer 130 through the network 105), and/or the like.

The storage layer 130 (and/or modules thereof) may be implemented in software, hardware, or a combination thereof. In some embodiments, portions of the storage layer 130 are embodied as executable instructions, such as computer program code, which may be stored on a persistent, non-transitory storage medium, such as the non-volatile storage resources 103. The instructions and/or computer program code may be configured for execution by the processing resources 101. Alternatively, or in addition, portions of the storage layer 130 may be embodied as machine components, such as general and/or application-specific components, programmable hardware, FPGAs, ASICs, hardware controllers, storage controllers, and/or the like.

The storage layer 130 may be configured to perform storage operations on a storage medium 140. The storage medium 140 may comprise any storage medium capable of storing data persistently. As used herein, "persistent" data storage refers to storing information on a persistent, non-volatile storage medium. The storage medium 140 may include non-volatile storage media such as solid-state storage media in one or more solid-state storage devices or drives (SSD), hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-ray drives, etc.), and/or the like.

In some embodiments, the storage medium 140 comprises non-volatile solid-state memory, which may include, but is not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), resistive random-access memory (RRAM), programmable metallization cell (PMC), conductive-bridging RAM (CBRAM), and/or the like. Although particular embodiments of the storage medium 140 are disclosed herein, the teachings of this disclosure could be applied to any suitable form of memory including both non-volatile and volatile forms. Accordingly, although particular embodiments of the storage layer 130 are disclosed in the context of non-volatile, solid-state storage devices 140, the storage layer 130 may be used with other storage devices and/or storage media.

In some embodiments, the storage medium 140 includes volatile memory, which may include, but is not limited to, RAM, dynamic RAM (DRAM), static RAM (SRAM), synchronous dynamic RAM (SDRAM), etc. The storage medium 140 may correspond to memory of the processing resources 101, such as a CPU cache (e.g., L1, L2, L3 cache, etc.), graphics memory, and/or the like. In some embodiments, the storage medium 140 is communicatively coupled to the storage layer 130 by use of an interconnect 127. The interconnect 127 may include, but is not limited to, peripheral component interconnect (PCI), PCI express (PCI-e), serial advanced technology attachment (serial ATA or SATA), parallel ATA (PATA), small computer system interface (SCSI), IEEE 1394 (FireWire), Fiber Channel, universal serial bus (USB), and/or the like. Alternatively, the storage medium 140 may be a remote storage device that is communicatively coupled to the storage layer 130 through the network 105 (and/or other communication interface, such as a Storage Area Network (SAN), a Virtual Storage Area Network (VSAN), and/or the like). The interconnect 127 may, therefore, comprise a remote bus, such as a PCE-e bus, a network connection (e.g., Infiniband), a storage network, Fibre Channel Protocol (FCP) network, HyperSCSI, and/or the like.

The storage layer 130 may be configured to manage storage operations on the storage medium 140 by use of, inter alia, a storage controller 139. The storage controller 139 may comprise software and/or hardware components including, but not limited to, one or more drivers and/or other software modules operating on the computing system 100, such as storage drivers, I/O drivers, filter drivers, and/or the like; hardware components, such as hardware controllers, communication interfaces, and/or the like; and so on. The storage medium 140 may be embodied on a storage device 141. Portions of the storage layer 130 (e.g., storage controller 139) may be implemented as hardware and/or software components (e.g., firmware) of the storage device 141.

The storage controller 139 may be configured to implement storage operations at particular storage locations of the storage medium 140. As used herein, a storage location refers to a unit of storage of a storage resource (e.g., a storage medium and/or device) that is capable of storing data persistently; storage locations may include, but are not limited to, pages, groups of pages (e.g., logical pages and/or offsets within a logical page), storage divisions (e.g., physical erase blocks, logical erase blocks, etc.), sectors, locations on a magnetic disk, battery-backed memory locations, and/or the like. The storage locations may be addressable within a storage address space 144 of the storage medium 140. Storage addresses may correspond to physical addresses, media addresses, back-end addresses, address offsets, and/or the like. Storage addresses may correspond to any suitable storage address space 144, storage addressing scheme, and/or arrangement of storage locations.

The storage layer 130 may comprise an interface 131 through which storage clients 106 may access storage services provided by the storage layer 130. The storage interface 131 may include one or more of a block device interface, a virtualized storage interface, one or more virtual storage units (VSUs), an object storage interface, a database storage interface, and/or other suitable interface and/or an Application Programming Interface (API).

The storage layer 130 may provide for referencing storage resources through a front-end storage interface. As used herein, a "front-end storage interface" refers to an interface and/or namespace through which storage clients 106 may refer to storage resources of the storage layer 130. A storage interface may correspond to a logical address space 132. The logical address space 132 may comprise a group, set, collection, range, and/or extent of identifiers. As used herein, a "identifier" or "logical identifier" (LID) refers to an identifier for referencing a source resource; LIDs may include, but are not limited to, names (e.g., file names, distinguished names, and/or the like), keys, data identifiers, references, links, LIDs, front-end identifiers, logical addresses, logical block addresses (LBAs), logical unit number (LUN) addresses, virtual unit number (VUN) addresses, virtual storage addresses, storage addresses, physical addresses, media addresses, back-end addresses, and/or the like.

The logical capacity of the logical address space 132 may correspond to the number of LIDs in the logical address space 132 and/or the size and/or granularity of the storage resources referenced by the LIDs. In some embodiments, the logical address space 132 may be "thinly provisioned." As used herein, a thinly provisioned logical address space 132 refers to a logical address space 132 having a logical capacity that exceeds the physical storage capacity of the underlying storage resources (e.g., exceeds the storage capacity of the storage medium 140). In one embodiment, the storage layer 130 is configured to provide a 64-bit logical address space 132 (e.g., a logical address space comprising $2^{26}$ unique LIDs), which may exceed the physical storage capacity of the storage medium 140. The large, thinly-provisioned logical address space 132 may allow storage clients 106 to efficiently allocate and/or reference contiguous ranges of LIDs, while reducing the chance of naming conflicts.

The translation module 134 of the storage layer 130 may be configured to map LIDs of the logical address space 132 to storage resources (e.g., data stored within the storage address space 144 of the storage medium 140). The logical address space 132 may be independent of the back-end storage resources (e.g., the storage medium 140); accordingly, there may be no set or pre-determined mappings between LIDs of the logical address space 132 and the storage addresses of the storage address space 144. In some embodiments, the logical address space 132 is sparse, thinly provisioned, and/or over-provisioned, such that the size of the logical address space 132 differs from the storage address space 144 of the storage medium 140.

The storage layer 130 may be configured to maintain storage metadata 135 pertaining to storage operations performed on the storage medium 140. The storage metadata 135 may include, but is not limited to, a forward map comprising any-to-any mappings between LIDs of the logical address space 132 and storage addresses within the storage address space 144, a reverse map pertaining to the contents of storage locations of the storage medium 140, validity bitmaps, reliability testing and/or status metadata, status information (e.g., error rate, retirement status, and so on), cache metadata, and/or the like. Portions of the storage metadata 135 may be maintained within the volatile memory resources 102 of the computing system 100. Alternatively, or in addition, portions of the storage metadata 135 may be stored on non-volatile storage resources 103 and/or the storage medium 140.

Figure 1B:
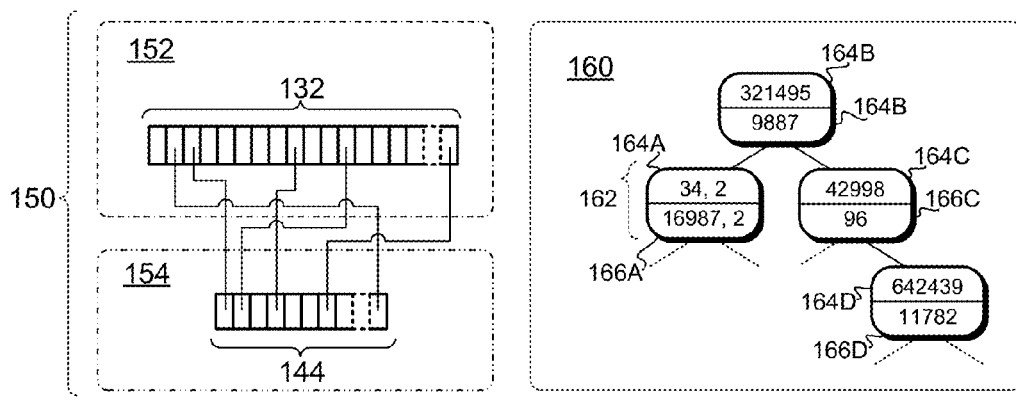
FIG. 1B depicts embodiments of storage metadata.

FIG. 1B depicts one embodiment of any-to-any mappings 150 between LIDs of the logical address space 132 and back-end identifiers (e.g., storage addresses) within the storage address space 144. The any-to-any mappings 150 may be maintained in one or more data structures of the storage metadata 135. As illustrated in FIG. 1B, the translation module 134 may be configured to map any storage resource identifier (any LID) to any back-end storage location. As further illustrated, the logical address space 132 may be sized differently than the underlying storage address space 144. In the FIG. 1B embodiment, the logical address space 132 may be thinly provisioned, and, as such, may comprise a larger range of LIDs than the range of storage addresses in the storage address space 144.

As disclosed above, storage clients 106 may reference storage resources through the LIDs of the logical address space 132. Accordingly, the logical address space 132 may correspond to a logical interface 152 of the storage resources, and the mappings to particular storage addresses within the storage address space 144 may correspond to a back-end interface 154 of the storage resources.

The storage layer 130 may be configured to maintain the any-to-any mappings 150 between the logical interface 152 and back-end interface 154 in a forward map 160. The forward map 160 may comprise any suitable data structure, including, but not limited to, an index, a map, a hash map, a hash table, a tree, a range-encoded tree, a b-tree, and/or the like. The forward map 160 may comprise entries 162 corresponding to LIDs that have been allocated for use to reference data stored on the storage medium 140. The entries 162 of the forward map 160 may associate LIDs 164A-D with respective storage addresses 166A-D within the storage address space 144. The forward map 160 may be sparsely populated, and as such, may omit entries corresponding to LIDs that are not currently allocated by a storage client 106 and/or are not currently in use to reference valid data stored on the storage medium 140. In some embodiments, the forward map 160 comprises a range-encoded data structure, such that one or more of the entries 162 may correspond to a plurality of LIDs (e.g., a range, extent, and/or set of LIDs). In the FIG. 1B embodiment, the forward map 160 includes an entry 162 corresponding to a range of LIDs 164A mapped to a corresponding range of storage addresses 166A. The entries 162 may be indexed by LIDs. In the FIG. 1B embodiment, the entries 162 are arranged into a tree data structure by respective links. The disclosure is not limited in this regard, however, and could be adapted to use any suitable data structure and/or indexing mechanism.

Figure 1C:
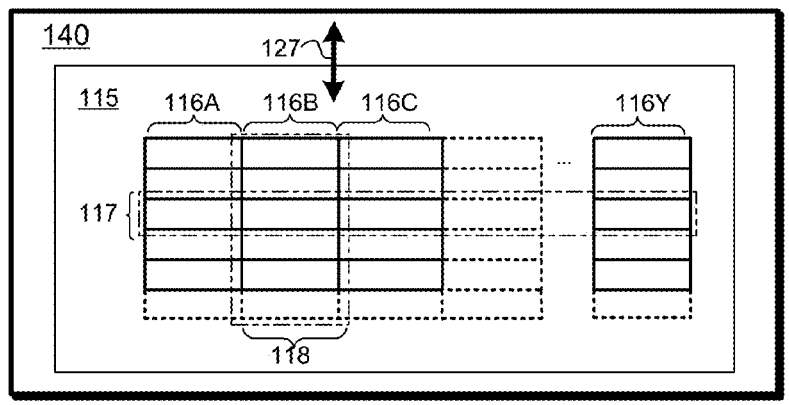
FIG. 1C is a block diagram depicting one embodiment of a storage array.

Referring to FIG. 1C, in some embodiments, the storage medium 140 may comprise a solid-state storage array 115 comprising a plurality of solid-state storage elements 116A-Y. As used herein, a solid-state storage array (or storage array) 115 refers to a set of two or more independent columns 118. A column 118 may comprise one or more solid-state storage elements 116A-Y that are communicatively coupled to the storage layer 130 in parallel using, inter alia, the interconnect 127. Rows 117 of the array 115 may comprise physical storage units of the respective columns 118 (solid-state storage elements 116A-Y). As used herein, a solid-state storage element 116A-Y includes, but is not limited to, solid-state storage resources embodied as a package, chip, die, plane, printed circuit board, and/or the like. The solid-state storage elements 116A-Y comprising the array 115 may be capable of independent operation. Accordingly, a first one of the solid-state storage elements 116A may be capable of performing a first storage operation while a second solid-state storage element 116B performs a different storage operation. For example, the solid-state storage element 116A may be configured to read data at a first physical address, while another solid-state storage element 116B reads data at a different physical address.

A solid-state storage array 115 may also be referred to as a logical storage element (LSE). As disclosed in further detail herein, the solid-state storage array 115 may comprise logical storage units (rows 117). As used herein, a "logical storage unit" or row 117 refers to combination of two or more physical storage units, each physical storage unit on a respective column 118 of the array 115. A logical erase block refers to a set of two or more physical erase blocks, a logical page refers to a set of two or more pages, and so on. In some embodiments, a logical erase block may comprise erase blocks within respective logical storage elements 115 and/or banks. Alternatively, a logical erase block may comprise erase blocks within a plurality of different arrays 115 and/or may span multiple banks of solid-state storage elements.

Referring back to FIG. 1A, the storage layer 130 may further comprise a log storage module 136 configured to store data on the storage medium 140 in a log structured storage configuration (e.g., in a storage log). As used herein, a "storage log" or "log structure" refers to an ordered arrangement of data within the storage address space 144 of the storage medium 140. Data in the storage log may comprise and/or be associated with persistent metadata. Accordingly, the storage layer 130 may be configured to store data in a contextual, self-describing format. As used herein, a contextual or self-describing format refers to a data format in which data is stored in association with persistent metadata. In some embodiments, the persistent metadata may be configured to identify the data, and as such, may comprise and/or reference the logical interface of the data (e.g., may comprise the LID(s) associated with the data). The persistent metadata may include other information, including, but not limited to, information pertaining to the owner of the data, access controls, data type, relative position or offset of the data, information pertaining to storage operation(s) associated with the data (e.g., atomic storage operations, transactions, and/or the like), log sequence information, data storage parameters (e.g., compression algorithm, encryption, etc.), and/or the like.

Figure 1D:
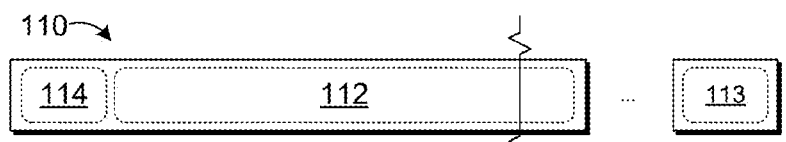
FIG. 1D depicts one embodiment of a data packet format.

FIG. 1D illustrates one embodiment of a contextual data format. The packet format 110 of FIG. 1D comprises a data segment 112 and persistent metadata 114. The data segment 112 may be of any arbitrary length and/or size. The persistent metadata 114 may be embodied as one or more header fields of the data packet 110. As disclosed above, the persistent metadata 114 may comprise the logical interface of the data segment 112, and as such, may include the LID(s) associated with the data segment 112. Although FIG. 1D depicts a packet format 110, the disclosure is not limited in this regard and could associate data (e.g., data segment 112) with contextual metadata in other ways including, but not limited to, an index on the storage medium 140, a storage division index, and/or the like. Data packets 110 may be associated with sequence information 113. The sequence information may be used to determine the relative order of the data packets within the storage log. In some embodiments, data packets are appended sequentially within storage divisions of the storage medium 140. The storage divisions may correspond to erase blocks, logical erase blocks, or the like. Each storage division may be capable of storing a large number of data packets 110. The relative position of the data packets 110 within a storage division may determine the order of the packets within the storage log. The order of the storage divisions may be determined, inter alia, by storage division sequence information 113. Storage divisions may be assigned respective sequence information 113 at the time the storage division is initialized for use (e.g., erased), programmed, closed, or the like. The storage division sequence information 113 may determine an ordered sequence of storage divisions within the storage address space 144. Accordingly, the relative order of a data packet 110 within the storage log may be determined by: a) the relative position of the data packet 110 within a particular storage division and b) the order of the storage division relative to other storage divisions in the storage address space 144.

In some embodiments, the storage layer 130 may be configured to manage an asymmetric, write-once storage medium 140, such as a solid-state storage medium, flash storage medium, or the like. As used herein, a "write once" storage medium refers to a storage medium that is reinitialized (e.g., erased) each time new data is written or programmed thereon. As used herein, an "asymmetric" storage medium refers to a storage medium that has different latencies for different types of storage operations. In some embodiments, for example, read operations may be faster than write/program operations, and write/program operations may be much faster than erase operations (e.g., reading the media may be hundreds of times faster than erasing, and tens of times faster than programming the storage medium). The storage medium 140 may be partitioned into storage divisions that can be erased as a group (e.g., erase blocks). As such, modifying a single data segment "in-place" may require erasing the entire erase block comprising the data and rewriting the modified data to the erase block, along with the original, unchanged data. This may result in inefficient "write amplification," which may excessively wear the media. In some embodiments, therefore, the storage layer 130 may be configured to write data "out-of-place." As used herein, writing data "out-of-place" refers to updating and/or overwriting data at different storage location(s) rather than overwriting the data "in-place" (e.g., overwriting the original physical storage location of the data). Updating and/or overwriting data out-of-place may avoid write amplification, since existing, valid data on the erase block with the data to be modified need not be erased and recopied. Moreover, writing data out-of-place may remove erasure from the latency path of many storage operations, such that erasure latency is not part of the "critical path" of write operations.

Figure 1E:
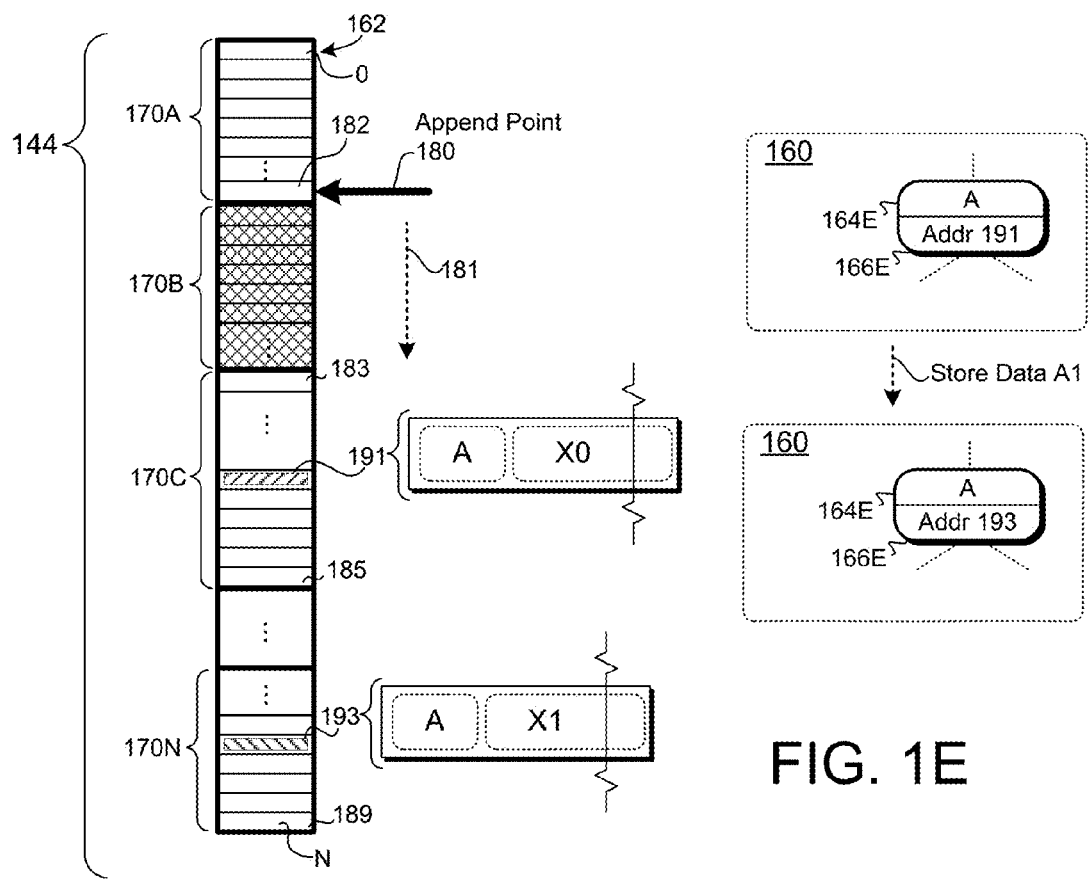
FIG. 1E depicts one embodiment of a storage log.

The storage layer 130 may be configured to perform storage operations out-of-place by use of, inter alia, the log storage module 136. The log storage module 136 may be configured to append data at a current append point within the storage address space 144 in a manner that maintains the relative order of storage operations performed by the storage layer 130, forming a "storage log" on the storage medium 140. FIG. 1E depicts one embodiment of append-only storage operations performed within the storage address space 144 of the storage medium 140. As disclosed above, the storage address space 144 comprises a plurality of storage divisions 170A-N (e.g., erase blocks, logical erase blocks, or the like), each of which can be initialized for use in storing data (e.g., erased). The storage divisions 170A-N may comprise respective storage locations, which may correspond to pages, logical pages, and/or the like, as disclosed herein. The storage locations may be assigned respective storage addresses (e.g., storage address 0 to storage address N).

The log storage module 136 may be configured to store data sequentially from an append point 180 within the physical address space 144. In the FIG. 1E embodiment, data may be appended at the append point 180 within storage location 182 of storage division 170A and, when the storage location 182 is filled, the append point 180 may advance 181 to a next available storage location. As used herein, an "available" storage location refers to a storage location that has been initialized and has not yet been programmed (e.g., has been erased). As disclosed above, some types of storage media can only be reliably programmed once after erasure. Accordingly, an available storage location may refer to a storage location within a storage division 170A-N that is in an initialized (or erased) state.

In the FIG. 1E embodiment, the logical erase block 170B may be unavailable for storage due to, inter alia, not being in an erased state (e.g., comprising valid data), being out-of-service due to high error rates, or the like. Therefore, after filling the storage location 182, the log storage module 136 may skip the unavailable storage division 170B, and advance the append point 180 to the next available storage division 170C. The log storage module 136 may be configured to continue appending data to storage locations 183-185, at which point the append point 180 continues at a next available storage division 170A-N, as disclosed above.

After storing data on the "last" storage location within the storage address space 144 (e.g., storage location N 189 of storage division 170N), the log storage module 136 may advance the append point 180 by wrapping back to the first storage division 170A (or the next available storage division, if storage division 170A is unavailable). Accordingly, the log storage module 136 may treat the storage address space 144 as a loop or cycle.

As disclosed above, sequentially appending data within the storage address space 144 may generate a storage log on the storage medium 140. In the FIG. 1E embodiment, the storage log may comprise the ordered sequence of storage operations performed by sequentially storing data packets (and/or other data structures) from the append point 180 within the storage address space 144. The append-only storage format may be used to modify and/or overwrite data out-of-place, as disclosed above. Performing storage operations out-of-place may avoid write amplification, since existing valid data on the storage divisions 170A-N comprising the data that is being modified and/or overwritten need not be erased and/or recopied. Moreover, writing data out-of-place may remove erasure from the latency path of many storage operations (the erasure latency is no longer part of the "critical path" of a write operation).

In the FIG. 1E embodiment, a data segment X0 corresponding to LID A may be stored at storage location 191. The data segment X0 may be stored in the self-describing packet format 110, disclosed above. The data segment 112 of the packet 110 may comprise the data segment X0, and the persistent metadata 114 may comprise the LID(s) associated with the data segment (e.g., the LID A). A storage client 106 may request an operation to modify and/or overwrite the data associated with the LID A, which may comprise replacing the data segment X0 with data segment X1. The storage layer 130 may perform this operation out-of-place by appending a new packet 110 comprising the data segment X1 at a different storage location 193 on the storage medium 144, rather than modifying the existing data packet 110, in place, at storage location 191. The storage operation may further comprise updating the storage metadata 135 to associate the LID A with the storage address of storage location 193 and/or to invalidate the obsolete data X0 at storage location 191. As illustrated in FIG. 1E, updating the storage metadata 135 may comprise updating an entry of the forward map 160 to associate the LID A 164E with the storage address of the modified data segment X1.

Performing storage operations out-of-place (e.g., appending data to the storage log) may result in obsolete or invalid data remaining on the storage medium 140 (e.g., data that has been erased, modified, and/or overwritten out-of-place). As illustrated in FIG. 1E, modifying the data of LID A by appending the data segment X1 to the storage log as opposed to overwriting and/or replacing the data segment X0 in place at storage location 191 results in keeping the obsolete version of the data segment X0 on the storage medium 140. The obsolete version of the data segment X0 may not be immediately removed from the storage medium 140 (e.g., erased), since, as disclosed above, erasing the data segment X0 may involve erasing an entire storage division 170A and/or relocating valid data on the storage division 170A, which is a time-consuming operation and may result in write amplification. Similarly, data that is no longer is use (e.g., deleted or subject to a TRIM operation) may not be immediately removed. As such, over time, the storage medium 140 may accumulate a significant amount of "invalid" data.

The storage layer 130 may identify invalid data, such as the data segment X0 at storage location 191, by use of the storage metadata 135 (e.g., the forward map 160). The storage layer 130 may determine that storage locations that are not associated with valid identifiers (LIDs) in the forward map 160 comprise data that does not need to be retained on the storage medium 140. Alternatively, or in addition, the storage layer 130 may maintain other storage metadata 135, such as validity bitmaps, reverse maps, and/or the like to efficiently identify data that has been deleted, has been TRIMed, is obsolete, and/or is otherwise invalid.

The storage layer 130 may be configured to reclaim storage resources occupied by invalid data. The storage layer 130 may be further configured to perform other media management operations including, but not limited to, refreshing data stored on the storage medium 140 (to prevent error conditions due to data degradation, write disturb, read disturb, and/or the like), monitoring media reliability conditions, and/or the like. As used herein, reclaiming a storage resource, such as a storage division 170A-N, refers to erasing the storage division 170A-N so that new data may be stored/programmed thereon. Reclaiming a storage division 170A-N may comprise relocating valid data on the storage division 170A-N to a new storage location. The storage layer 130 may identify storage divisions 170A-N for reclamation based upon one or more factors, which may include, but are not limited to, the amount of invalid data in the storage division 170A-N, the amount of valid data in the storage division 170A-N, wear levels (e.g., number of program/erase cycles), time since the storage division 170A-N was programmed or refreshed, and so on.

The storage layer 130 may be configured to reconstruct the storage metadata 135, including the forward map 160, by use of contents of the storage log on the storage medium 140. In the FIG. 1E embodiment, the current version of the data associated with LID A may be determined based on the relative log order of the data packets 110 at storage locations 191 and 193, respectively. Since the data packet at storage location 193 is ordered after the data packet at storage location 191 in the storage log, the storage layer 130 may determine that storage location 193 comprises the most recent, up-to-date version of the data corresponding to LID A. The storage layer 130 may reconstruct the forward map 160 to associate the LID A with the data packet at storage location 193 (rather than the obsolete data at storage location 191).

Figure 2:
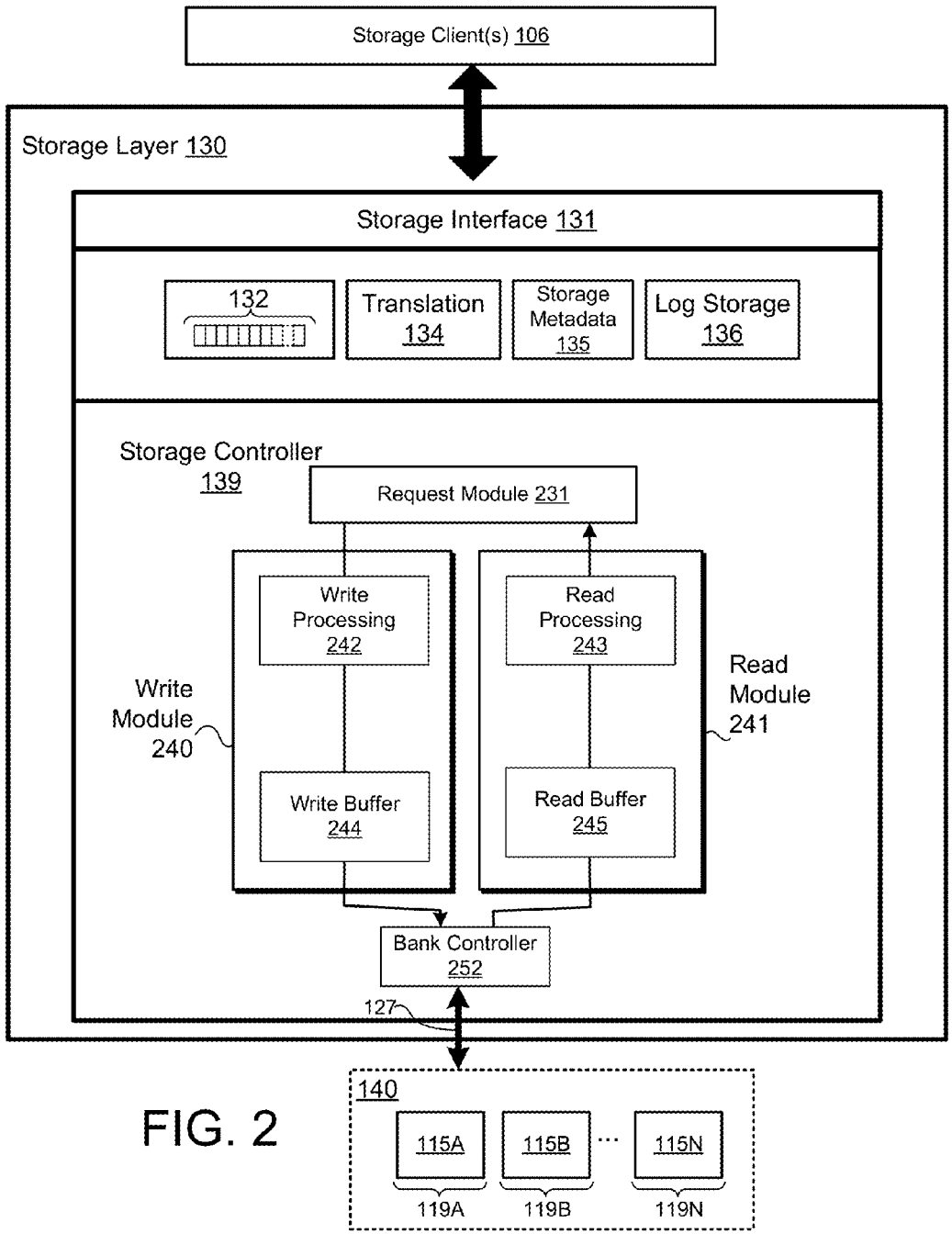
FIG. 2 is a block diagram of another embodiment of a system for storage collision management.

FIG. 2 depicts another embodiment of a system 200 comprising a storage layer 130. The storage medium 140 may comprise a plurality of independent banks 119A-N, each of which may comprise one or more storage arrays 115A-N. Each independent bank 119A-N may be coupled to the storage controller 139 via the interconnect 127.

The storage controller 139 may comprise a storage request receiver module 231 configured to receive storage requests from the storage layer 130 via a bus 127. The storage request receiver 231 may be further configured to transfer data to/from the storage layer 130 and/or storage clients 106. Accordingly, the storage request receiver module 231 may comprise one or more direct memory access (DMA) modules, remote DMA modules, bus controllers, bridges, buffers, and so on.

The storage controller 139 may comprise a write module 240 that is configured to store data on the storage medium 140 in response to requests received via the request module 231. The storage requests may comprise and/or reference the logical interface of the data pertaining to the requests. The write module 240 may be configured to store the data in a self-describing storage log, which, as disclosed above, may comprise appending data packets 110 sequentially within the storage address space 144 of the storage medium 140. The data packets 110 may comprise and/or reference the logical interface of the data (e.g., may comprise the LID(s) associated with the data). The write module 240 may comprise a write processing module 242 configured to process data for storage. Processing data for storage may comprise one or more of: a) compression processing, b) encryption processing, c) encapsulating data into respective data packets 110 (and/or other containers), d) performing error-correcting code (ECC) processing, and so on. The write buffer 244 may be configured to buffer data for storage on the storage medium 140. In some embodiments, the write buffer 244 may comprise one or more synchronization buffers configured to synchronize a clock domain of the storage controller 139 with a clock domain of the storage medium 140 (and/or interconnect 127).

The log storage module 136 may be configured to select storage location(s) for data storage operations and may provide addressing and/or control information to the storage arrays 115A-N of the independent banks 119A-N. As disclosed herein, the log storage module 136 may be configured to append data sequentially in a log format within the storage address space 144 of the storage medium 140.

Storage operations to write data may comprise: a) appending one or more data packets to the storage log on the storage medium 140 and b) updating storage metadata 135 to associate LID(s) of the data with the storage addresses of the one or more data packets. In some embodiments, the storage metadata 135 may be maintained on memory resources of the storage controller 139 (e.g., on dedicated volatile memory resources of the storage device 141 comprising the storage medium 140). Alternatively, or in addition, portions of the storage metadata 135 may be maintained within the storage layer 130 (e.g., on a volatile memory 112 of the computing device 110 of FIG. 1A). In some embodiments, the storage metadata 135 may be maintained in a volatile memory by the storage layer 130, and may be periodically stored on the storage medium 140.

The storage controller 139 may further comprise a data read module 241 configured to read data from the storage log on the storage medium 140 in response to requests received via the storage request receiver module 231. The requests may comprise LID(s) of the requested data, a storage address of the requested data, and/or the like. The read module 241 may be configured to: a) determine the storage address(es) of the data packet(s) 110 comprising the requested data by use of, inter alia, the forward map 160, b) read the data packet(s) 110 from the determined storage address(es) on the storage medium 140, and c) processing data for use by the requesting entity. Data read from the storage medium 140 may stream into the read module 241 via the read buffer 245. The read buffer 245 may comprise one or more read synchronization buffers for clock domain synchronization, as disclosed above. The read processing module 243 may be configured to processes data read from the storage medium 144, which may include, but is not limited to, one or more of: a) decompression processing, b) decryption processing, c) extracting data from one or more data packet(s) 110 (and/or other containers), d) performing ECC processing, and so on.

The storage controller 139 may further comprise a bank controller 252 configured to selectively route data and/or commands of the write module 240 and/or read module 241 to/from particular independent banks 119A-N. In some embodiments, the storage controller 139 is configured to interleave storage operations between the independent banks 119A-N. The storage controller 139 may, for example, read from the storage array 115A of bank 119A into the read module 241 while data from the write module 240 is being programmed to the storage array 115B of bank 119B. Further embodiments of multi-bank storage operations are disclosed in U.S. patent application Ser. No. 11/952,095, entitled, "Apparatus, System, and Method for Managing Commands for Solid-State Storage Using Bank Interleave," filed Dec. 12, 2006 for David Flynn et al., which is hereby incorporated by reference.

The write processing module 242 may be configured to encode data packets 110 into ECC codewords. As used herein, an ECC codeword refers to data and corresponding error detection and/or correction information. The write processing module 242 may be configured to implement any suitable ECC algorithm and/or generate ECC codewords of any suitable type, which may include, but are not limited to, data segments and corresponding ECC syndromes, ECC symbols, ECC chunks, and/or other structured and/or unstructured ECC information. ECC codewords may comprise any suitable error-correcting encoding, including, but not limited to, block ECC encoding, convolutional ECC encoding, Low-Density Parity-Check (LDPC) encoding, Gallager encoding, Reed-Solomon encoding, Hamming codes, Multidimensional parity encoding, cyclic error-correcting codes, BCH codes, and/or the like. The write processing module 242 may be configured to generate ECC codewords of a pre-determined size. Accordingly, a single packet may be encoded into a plurality of different ECC codewords and/or a single ECC codeword may comprise portions of two or more packets. Alternatively, the write processing module 242 may be configured to generate arbitrarily sized ECC codewords. Further embodiments of error-correcting code processing are disclosed in U.S. patent application Ser. No. 13/830,652, entitled, "Systems and Methods for Adaptive Error-Correction Coding," filed Mar. 14, 2013 for Jeremy Fillingim et al., which is hereby incorporated by reference.

In some embodiments, the storage layer 130 leverages the logical address space 132 to efficiently implement high-level storage operations. The storage layer 130 may be configured to implement "clone" or "logical copy" operations. As used herein, a "clone" or "logical copy" refers to operations to efficiently copy or replicate data managed by the storage layer 130. A clone operation may comprise creating a set of "cloned" LIDs that correspond to the same data as a set of "original" LIDs. A clone operation may, therefore, comprise referencing the same set of storage locations using two (or more) different logical interfaces (e.g., different sets of LIDs). A clone operation may, therefore, modify the logical interface of one or more data packets 110 stored on the storage medium 140. A "logical move" may refer to an operation to modify the logical interface of data managed by the storage layer 130. A logical move operation may comprise changing the LIDs used to reference data stored on the storage medium 140. A "merge" operation may comprise merging different portions of the logical address space 132. As disclosed in further detail herein, clone and/or move operations may be used to efficiently implement higher-level storage operations, such as deduplication, snapshots, logical copies, atomic operations, transactions, and/or the like.

Figure 3A:
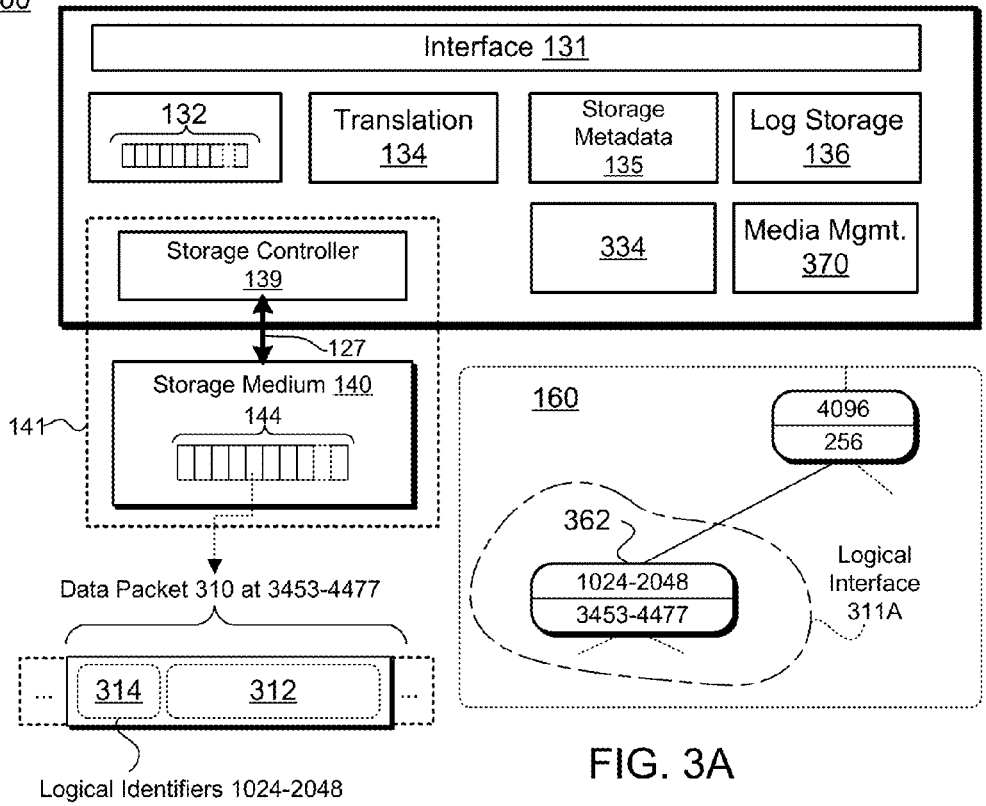
FIG. 3A is a block diagram of one embodiment of a system comprising a storage layer configured to efficiently implement range clone, move, merge, and other higher-level storage operations.

Referring to FIG. 3A, the storage layer 130 may comprise a logical interface management module 334 that is configured to manage logical interface operations pertaining to data managed by the storage layer 130, such as clone operations, move operations, merge operations, and so on. Cloning LIDs may comprise modifying the logical interface of data stored in the storage medium 140 in order to, inter alia, allow the data to be referenced by use of two or more different sets of LIDs. Accordingly, creating a clone may comprise: a) allocating a set of LIDs in the logical address space 132 (or dedicated portion thereof) and b) associating the allocated LIDs with the same storage location(s) as an "original" set of LIDs by use of, inter alia, the storage metadata 135. Creating a clone may, therefore, comprise adding one or more entries to a forward map 160 configured to associate the new set of cloned LIDs with a particular set of storage locations.

The logical interface management module 334 may be configured to implement clone operations according to a clone synchronization policy. A clone synchronization policy may be used to determine how operations performed in reference to a first one of a plurality of clones or copies is propagated to the other clones or copies. For example, clones may be synchronized with respect to allocation operations, such that a request to expand one of the clones comprises expanding the other clones and/or copies. As used herein, expanding a file (or other data segment) refers to increasing a size, range, and/or extent of the file, which may include adding one or more logical identifiers to the clone, modifying one or more of the logical identifiers allocated to the clone, and/or the like. The clone synchronization policy may comprise a merge policy, which may, inter alia, determine how differences between clones are managed when the clones are combined in a merge and/or fold operation (disclosed in additional detail below).

FIG. 3A depicts one embodiment of a range clone operation implemented by the storage layer 130. The range clone operation of FIG. 3A may be implemented in response to a request from a storage client 106. In some embodiments, the interface 131 of the storage layer 130 may be configured to provide interfaces and/or APIs for performing clone operations. Alternatively, or in addition, the range clone operation may be performed as part of a higher-level operation, such as an atomic operation, transaction, snapshot, logical copy, file management operation, and/or the like.

As illustrated in FIG. 3A, the forward map 160 of the storage layer 130 comprises an entry 362 configured to bind the LIDs 1024-2048 to media storage locations 3453-4477. Other entries are omitted from FIG. 3A to avoid obscuring the details of the depicted embodiment. As disclosed herein, the entry 362, and the bindings thereof, may define a logical interface 311A through which storage clients 106 may reference the corresponding data (e.g., data segment 312); storage clients 106 may access and/or reference the data segment 312 (and/or portions thereof) through the storage layer 130 by use of the LIDs 1024-2048. Accordingly, the LIDs 1024-2048 define, inter alia, the logical interface 311A of the data segment 312.

As disclosed herein, the storage layer 130 may be configured to store data in a contextual format on a storage medium 140 (e.g., packet format 110). In the FIG. 3A embodiment, the data packet 310 at storage locations 3453-4477 comprises a data segment 312. The data packet 310 further includes persistent metadata 314 that indicates the logical interface of the data segment 312 (e.g., associates the data segment 312 with LIDs 1024-2048). As disclosed above, storing data in association with descriptive, persistent metadata may enable the storage layer 130 to rebuild the forward map 160 (and/or other storage metadata 135) from the contents of the storage log. In the FIG. 3A embodiment, the entry 362 may be reconstructed by associating the data stored at storage addresses 3453-4477 with the LIDs 1024-2048 referenced by the persistent metadata 314 of the packet 310. Although FIG. 3A depicts a single packet 310, the disclosure is not limited in this regard. In some embodiments, the data of the entry 362 may be stored in multiple, different packets 310, each comprising respective persistent metadata 314 (e.g., a separate packet for each storage location, etc.).

Figure 3B:
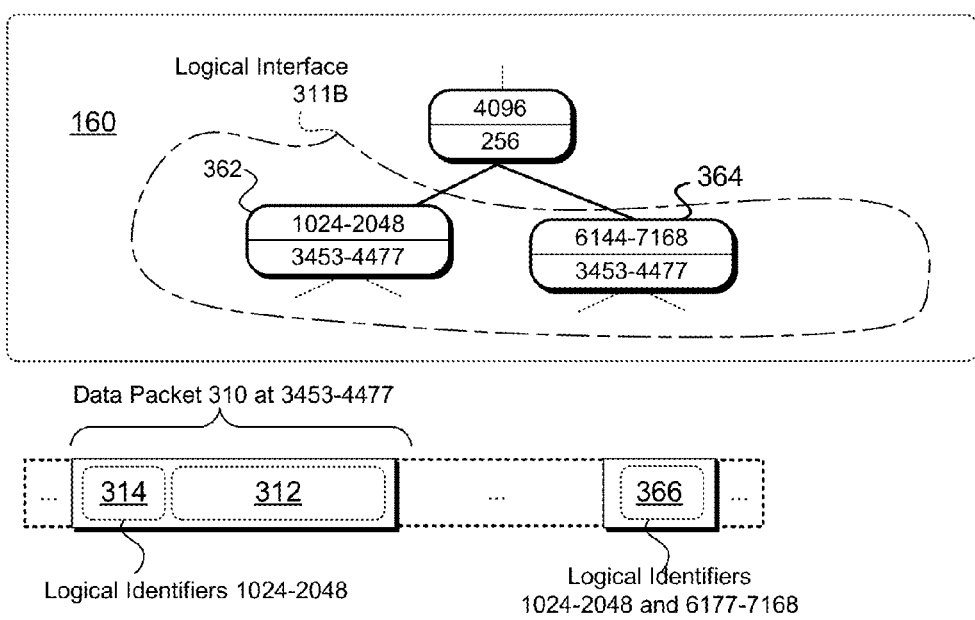
FIG. 3B depicts embodiments of range clone operations.

The logical interface management module 334 may be configured to clone the entry 362 by, inter alia, allocating a new set of LIDs corresponding to the original LIDs to be cloned and binding the new LIDs to the storage locations of the original, source LIDs. As illustrated in FIG. 3B, creating the clone of the LIDs 1024-2048 may comprise the logical interface management module 334 allocating an equivalent set of LIDs 6144-7168 and binding the cloned set of identifiers to the storage addresses 3453-4477. Creating the clone may, therefore, comprise modifying the storage metadata 135 to expand the logical interface 311B of the data segment 312 to include LIDs 6144-7168 without requiring the underlying data segment 312 to be copied and/or replicated on the storage media 140.

The modified logical interface 311B of the data segment 312 may be inconsistent with the contextual format of the corresponding data packet 310 stored at storage locations 3453-4477. As disclosed above, the persistent metadata 314 of the data packet 310 references LIDs 1024-2048, but does not include and/or reference the cloned LIDs 6144-7168. The contextual format of the data segment 312 may be updated to be consistent with the modified logical interface 311B (e.g., updated to associate the data with LIDs 1024-2048 and 6144-7168, as opposed to only LIDs 1024-2048), which may comprise rewriting the data segment in a packet format that associates the data segment with both sets of LIDs. If the storage device 141 is a random-access, write-in-place storage device, the persistent metadata 314 may be updated in place. In other embodiments comprising a write-once, asymmetric storage medium 140, such in-place updates may be inefficient. Therefore, the storage layer 130 may be configured to maintain the data in the inconsistent contextual format until the data is relocated in a media management operation, such as storage recovery, relocation, and/or the like (by the media management module 370). Updating the contextual format of the data segment 312 may comprise relocating and/or rewriting the data segment 312 on the storage medium 140, which may be a time-consuming process and may be particularly inefficient if the data segment 312 is large and/or the clone comprises a large number of LIDs. Therefore, in some embodiments, the storage layer 130 may defer updating the contextual format of cloned data segment 312 and/or may update the contextual format in one or more background operations. In the meantime, the storage layer 130 may be configured to provide access to the data segment 312 while stored in the inconsistent contextual format (data packet 310).

The storage layer 130 may be configured to acknowledge completion of clone operations before the contextual format of the corresponding data segment 312 is updated. The data may be subsequently rewritten (e.g., relocated) in the updated contextual format on the storage medium 140. The update may occur outside of the "critical path" of the clone operation and/or other foreground storage operations. In some embodiments, the data segment 312 is relocated by the media management module 370 as part of one or more of a storage recovery process, data refresh operation, and/or the like. Accordingly, storage clients 106 may be able to access the data segment 312 through the modified logical interface 311B (e.g., in reference to LIDs 1024-2048 and/or 6144-7168) without waiting for the contextual format of the data segment 312 to be updated in accordance with the modified logical interface 311B.

Until the contextual format of the data segment 312 is updated on the storage medium 140, the modified logical interface 311B of the data segment 312 may exist only in the storage metadata 135 (e.g., map 160). Therefore, if the forward map 160 is lost due to, inter alia, power failure or data corruption, the clone operation may not be reflected in the reconstructed storage metadata 135 (the clone operation may not be persistent and/or crash safe). As used herein, metadata that is "persistent" and/or "crash safe" refers to metadata that retains its state (or having a state that can be reconstructed from other, persistent data) regardless of restart events (e.g., despite loss and/or corruption of volatile memory resources 102). A restart event, as used herein, comprises an intentional or unintentional loss of power to at least a portion of the host computing device and/or a non-volatile storage device. A restart event may comprise a system reboot, reset, or shutdown event; a power fault, power loss, or power failure event; or another interruption or reduction of power. As illustrated above, the persistent metadata 314 of the data packet 310 indicates that the data segment 312 is associated only with LIDs 1024-2048, not 6144-7168. Therefore, only entry 362 will be reconstructed (as in FIG. 3A), and entry 364 will be omitted; as a result, subsequent attempts to access the data segment 312 through the modified logical interface 311B (e.g., through 6144-7168) may fail.

In some embodiments, the clone operation may further comprise storing a persistent note on the storage medium 140 to make a clone operation persistent and/or crash safe. As used herein, a "persistent note" refers to metadata stored on the storage medium 140. Persistent notes 366 may correspond to a log order and/or may be stored in a packet format, as disclosed herein. The persistent note 366 may comprise an indication of the modified logical interface 311B of the data segment 312. In the FIG. 3B embodiment, the persistent note 366 corresponding to the depicted clone operation may be configured to associate the data stored at storage addresses 3453-4477 with both ranges of LIDs 1024-2048 and 6144-7168. During reconstruction of the forward map 160 from the contents of the storage medium 140, the persistent note 366 may be used to reconstruct both entries 362 and 364, to associate the data segment 312 with both LID ranges of the updated logical interface 311B. In some embodiments, the storage layer 130 may acknowledge completion of the clone operation in response to updating the storage metadata 135 (e.g., creating the entry 364) and storing the persistent note 366 on the storage medium 140. The persistent note 366 may be invalidated and/or marked for removal from the storage medium 140 in response, updating the contextual format of the data segment 312 to be consistent with the updated logical interface 311B (e.g., relocating and/or rewriting the data segment 312, as disclosed above).

Figure 3C:
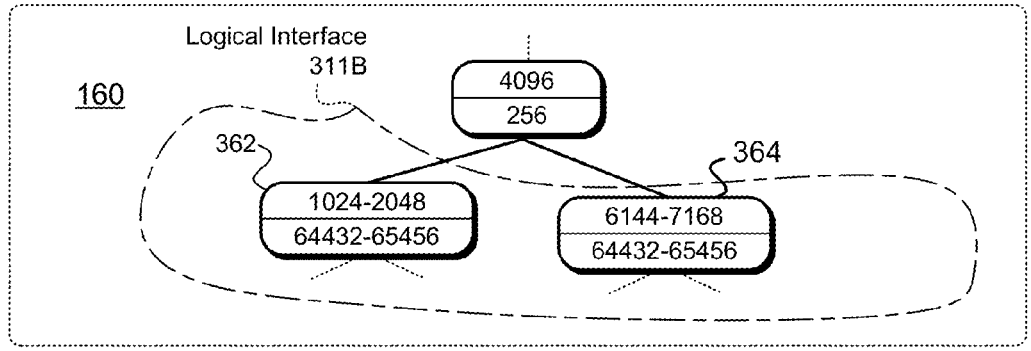
FIG. 3C depicts further embodiments of range clone operations.
Figure 3C:
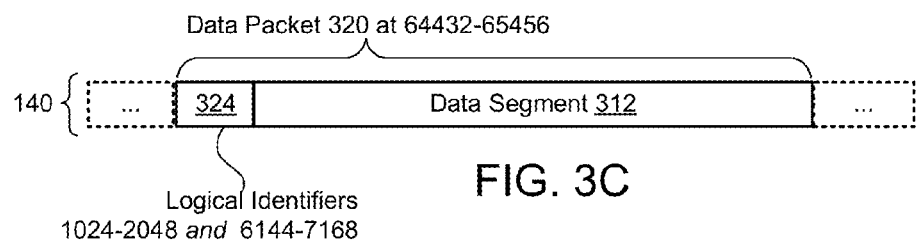

In some embodiments, the updated contextual format of the data segment 312 may comprise associating the data segment 312 with both LID ranges 1024-2048 and 6144-7168. FIG. 3C depicts one embodiment of an updated contextual format (data packet 320) for the data segment 312. As illustrated in FIG. 3C, the persistent metadata 324 of the data packet 320 associates the data segment 312 with both LID ranges 1024-2048 and 6144-7168 of the updated logical interface 311B. The data packet 320 may be written out-of-place, at different storage addresses (64432-65456) than the original data packet 310, which may be reflected in updated entries 362 and 364 of the forward map 160. In response to appending the data packet 320 to the storage log, the corresponding persistent note 366 (if any) may be invalidated (removed and/or marked for subsequent removal from the storage medium 140). In some embodiments, removing the persistent note 366 may comprise issuing one or more TRIM messages indicating that the persistent note 366 no longer needs to be retained on the storage medium 140. Alternatively, or in addition, portions of the forward map 160 may be stored in a persistent, crash safe storage location (e.g., non-transitory storage resources 103 and/or the storage medium 140). In response to persisting the forward map 160 (e.g., the entries 362 and 364), the persistent note 366 may be invalidated, as disclosed above, even if the data segment 312 has not yet been rewritten in an updated contextual format.

Figure 3D:
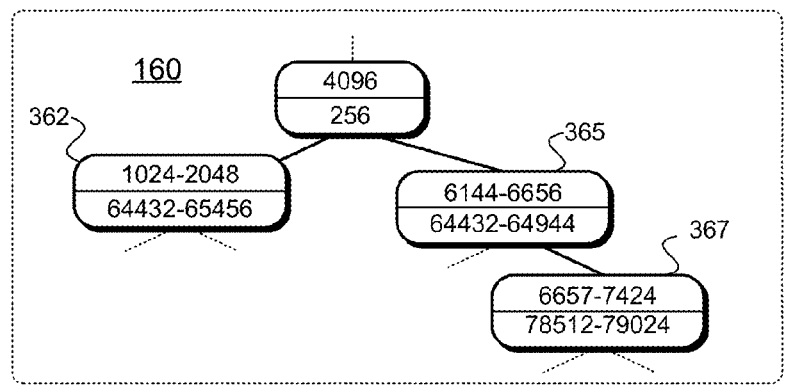
FIG. 3D depicts further embodiments of range clone operations.
Figure 3D:
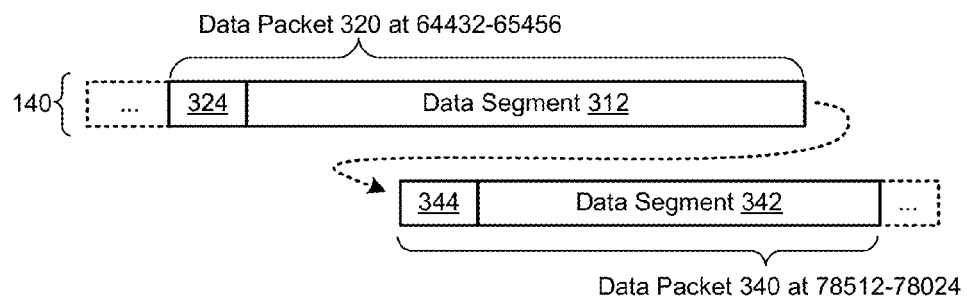

The logical interface management module 334 may be configured to implement clone operations according to one or more different modes, including a "copy-on-write mode." FIG. 3D depicts one embodiment of a storage operation performed within a cloned range in a copy-on-write mode. In a copy-on-write mode, storage operations that occur after creating a clone may cause the clones to diverge from one another (e.g., the entries 362 and 364 may refer to different storage addresses, ranges, and/or extents). In the FIG. 3D embodiment, the storage layer 130 has written the data segment 312 in the updated contextual data format (packet 320) that is configured to associate the data segment 312 with both LID ranges 1024-2048 and 6144-7168 (as depicted in FIG. 3C). A storage client 106 may then issue one or more storage requests to modify and/or overwrite data corresponding to the LIDs 6657-7168. In the FIG. 3D embodiment, the storage request comprises modifying and/or overwriting data of the LIDs 6657-7168. In response, the storage layer 130 may store the new and/or modified data on the storage medium 130, which may comprise appending a new data packet 340 to the storage log, as disclosed above. The data packet 340 may associate the data segment 342 with the LIDs 6657-7424 (e.g., by use of persistent metadata 344 of the packet 340). The forward map 160 may be updated to associate the LIDs 6657-7424 with the data segment 342, which may comprise splitting the entry 364 into an entry 365 configured to continue to reference the unmodified portion of the data in the data segment 312 and an entry 367 that references the new data segment 342 stored at storage addresses 78512-79024. In the copy-on-write mode depicted in FIG. 3D, the entry 362 corresponding to the LIDs 1024-2048 may be unchanged, and continue to reference the data segment 312 at storage addresses 64432-65456. Although not depicted in FIG. 3D, modifications within the range 1024-2048 may result in similar diverging changes affecting the entry 362. Moreover, the storage request(s) are not limited to modifying and/or overwriting data. Other operations may comprise expanding the set of LIDs (appending data), removing LIDs (deleting, truncating, and/or trimming data), and/or the like.

In some embodiments, the storage layer 130 may support other clone modes, such as a "synchronized clone" mode. In a synchronized clone mode, changes made within a cloned range of LIDs may be reflected in one or more other, corresponding ranges. In the FIG. 3D embodiment, implementing the described storage operation in a "synchronized clone" mode may comprise updating the entry 362 to reference the new data segment 342, as disclosed herein, which may comprise, inter alia, splitting the entry 362 into an entry configured to associate LIDs 1024-1536 with portions of the original data segment 312 and adding an entry configured to associate the LIDs 1537-2048 with the new data segment 342.

Referring back to the copy-on-write embodiment of FIG. 3D, the logical interface management module 334 may be further configured to manage clone merge operations. As used herein, a "merge" or "clone merge" refers to an operation to combine two or more different sets and/or ranges of LIDs. In the FIG. 3D embodiment, a range merge operation may comprise merging the entry 362 with the corresponding cloned entries 365 and 367. The logical interface management module 334 may be configured to implement range merge operations according to a merge policy, such as: a write-order policy in which more recent changes override earlier changes; a priority-based policy based on the relative priority of storage operations (e.g., based on properties of the storage client(s) 106, applications, and/or users associated with the storage operations); a completion indicator (e.g., completion of an atomic storage operation, failure of an atomic storage operation, or the like); fadvise parameters; ioctrl parameters; and/or the like.

Figure 3E:
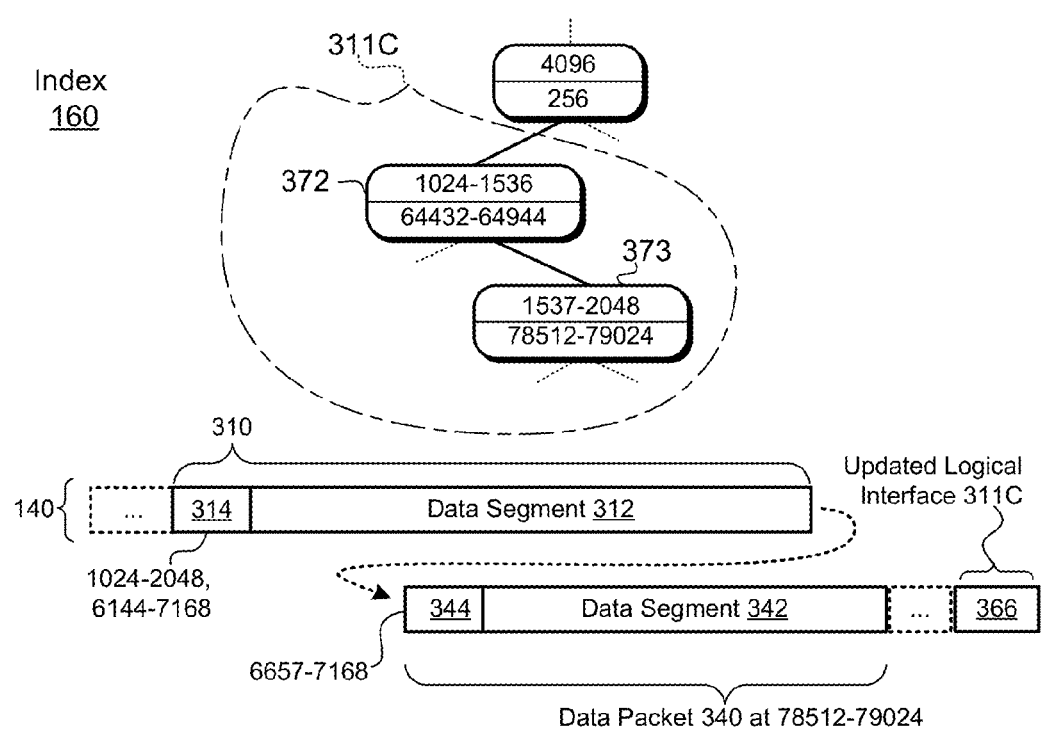
FIG. 3E depicts further embodiments of range clone operations.

FIG. 3E depicts one embodiment of a range merge operation. The range merge operation of FIG. 3E may comprise merging the range 6144-6656 into the range 1024-2048. Accordingly, the range merge operation may comprise selectively applying changes made within the LID range 6144-6656 to the LID range 1024-2048 in accordance with the merge policy. The range merge operation may, therefore, comprise updating the LID range 1024-2048 to associate LIDs 1537-2048 with the storage addresses 78512-79024 comprising the new/modified data segment 342. The update may comprise splitting the entry 362 in the forward map 160; the entry 372 may be configured to associate the LIDs 1024-1536 with portions of the original data segment 312, and entry 373 may be configured to associate LIDs 1537-2048 with the new data segment 342. Portions of the data segment 312 that are no longer referenced by the LIDs 1537-2048 may be invalidated, as disclosed herein. The LID range 6144-7168 that was merged into the original, source range may be deallocated and/or removed from the forward map 160.

The range merge operation illustrated in FIG. 3E may result in modifying the logical interface 311C to portions of the data. The contextual format of the data segment 342 (the data packet 340) may associate the data segment 342 with LIDs 6657-7168, rather than the merged LIDs 1537-2048. As disclosed above, the storage layer 130 may provide access to the data segment 342 stored in the inconsistent contextual format. The storage layer 130 may be configured to store the data segment 342 in an updated contextual format, in which the data segment 342 is associated with the LIDs 1537-2048 in one or more background operations (e.g., storage recovery operations). In some embodiments, the range merge operation may further comprise storing a persistent note 366 on the storage medium 140 to associate the data segment 342 with the updated logical interface 311C (e.g., associate the data segment 342 at storage addresses 78512-79024 with the LIDs 1537-2048). As disclosed above, the persistent note 366 may be used to ensure that the range merge operation is persistent and crash safe. The persistent note 366 may be removed in response to relocating the data segment 342 in a contextual format that is consistent with the logical interface 311C (e.g., associates the data segment 342 with the LIDs 1537-2048), persisting the forward map 160, and/or the like.

The clone operations disclosed in conjunction with FIGS. 3A-E may be used to implement other logical operations, such as a range move operation. Referring back to FIGS. 3A-C, a clone operation to replicate entry 362 of the forward map 160 may comprise modifying the logical interface associated with the data segment 312 to associate the data segment 312 with both the original set of LIDs 1024-2048 and a new set of cloned LIDs 6144-7168 (of entry 364). The clone operation may further include storing a persistent note 366 indicating the updated logical interface 311B of the data segment 312 and/or rewriting the data segment 312 in accordance with the updated logical interface 311B in one or more background storage operations.

The logical interface management module 334 may be further configured to implement "range move" operations. As used herein, a "range move" operation refers to modifying the logical interface of one or more data segments to associate the data segments with different sets of LIDs. A range move operation may, therefore, comprise updating storage metadata 135 (e.g., the forward map 160) to associate the one or more data segments with the updated logical interface, storing a persistent note 366 on the storage medium 140 indicating the updated logical interface of the data segments, and rewriting the data segments in a contextual format (packet format 310) that is consistent with the updated logical interface, as disclosed herein. Accordingly, the storage layer 130 may implement range move operations using the same mechanisms and/or processing steps as those disclosed above in conjunction with FIGS. 3A-E.

The clone and/or range move operations disclosed in FIGS. 3A-E may impose certain limitations on the storage layer 130. As disclosed above, storing data in a contextual format may comprise associating the data with each LID that references the data. In the FIG. 3C embodiment, the persistent metadata 324 comprises references to both LID ranges 1024-2048 and 6144-7168. Increasing the number references to a data segment may, therefore, impose a corresponding increase in the overhead of the contextual data format (e.g., increase the size of the persistent metadata 324). In some embodiments, the size of the persistent metadata 314 may be limited, which may limit the number of references and/or clones that can reference a particular data segment 312. Moreover, inclusion of multiple references to different LID(s) may complicate storage recovery operations. The number of forward map entries that need to be updated when a data segment 312 is relocated may vary in accordance with the number of LIDs that reference the data segment 312. Referring back to FIG. 3C, relocating the data segment 312 in a grooming and/or storage recovery operation may comprise updating two separate entries 362 and 364. Relocating a data segment referenced by N different LIDs (e.g., N different clones) may comprise updating N different entries in the forward map 160. Similarly, storing the data segment may comprise writing N entries into the persistent metadata 314. This variable overhead may reduce the performance of background storage recovery operations and may limit the number of concurrent clones and/or references that can be supported.

In some embodiments, the logical interface management module 334 may comprise and/or leverage an intermediate mapping layer to reduce the overhead imposed by clone operations. The intermediate mapping layer may comprise "reference entries" configured to facilitate efficient cloning operations (as well as other operations, as disclosed in further detail herein). As used herein, a "reference entry" refers to an entry of a mapping data structure that is used to reference other entries within the forward map 160 (and/or other storage metadata 135). A reference entry may only exist while it is referenced by one or more other entries within the logical address space 132. In some embodiments, reference entries may not be accessible to the storage clients 106 and/or may be immutable. The storage layer 130 may leverage reference entries to allow storage clients to reference the same set of data through multiple, different logical interfaces via a single reference entry interface. The contextual format of data on the storage medium 140 (data that is referenced by multiple LIDs) may be simplified to associate the data with the reference entries which, in turn, are associated with N other logical interface(s) through other persistent metadata (e.g., persistent notes 366). Relocating cloned data may, therefore, comprise updating a single mapping between the reference entry and the new storage address of the data segment.

Figure 4A:
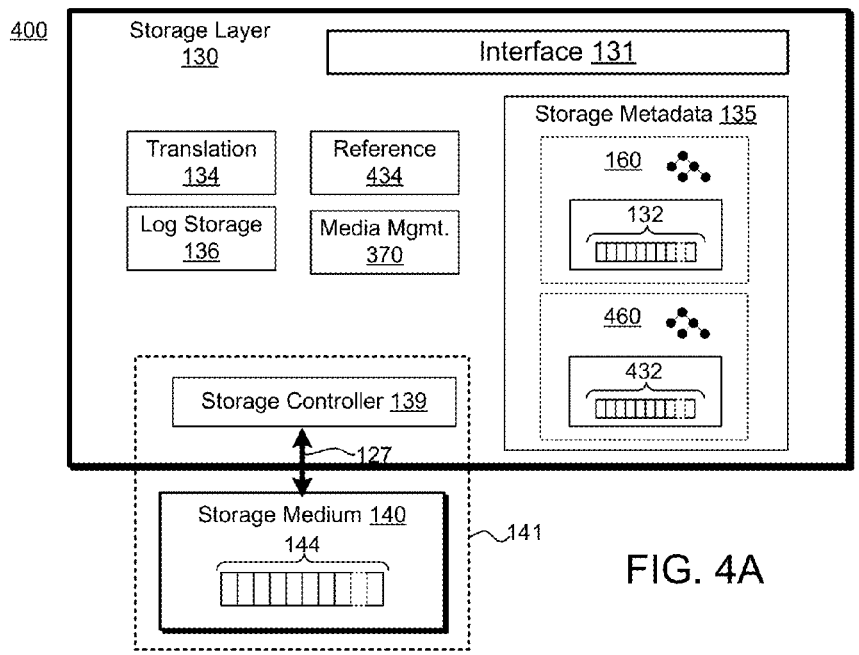
FIG. 4A is a block diagram of another embodiment of a system for open-to-close consistency.

FIG. 4A is a block diagram of another embodiment of a system 400 for efficient open-to-close consistency. The system 400 includes a storage layer 130 that is configured to implement range clone operations by use of an intermediate mapping layer. The storage metadata 135 may comprise a forward map 160 pertaining to the logical address space 132. The forward map 160 (and/or other storage metadata 135) may include information pertaining to allocations of the logical address space by the storage clients 106, bindings between LIDs and storage addresses within the storage address space 144, and so on, as disclosed above.

In the FIG. 4A embodiment, the logical interface management module 334 may comprise a reference module 434 configured to manage clone operations by use of a reference map 460. The reference map 460 may comprise reference entries that correspond to data that is being referenced by one or more logical interfaces of the logical address space 132 (e.g., one or more sets of LIDs). The reference module 434 may be configured to remove reference entries that are no longer being used to reference valid data and/or are no longer being referenced by entries within the forward map 160. As illustrated in FIG. 4A, reference entries may be maintained separately from the forward map 160 (e.g., in a separate reference map 460). The reference entries may be identified by use of reference identifiers, which may be maintained in a separate namespace than the logical address space 132. Accordingly, the reference entries may be part of an intermediate, "virtual" or "reference" address space 432 that is separate and distinct from the logical address space 132 that is directly accessible to the storage clients 106 through the storage layer interface 131. Alternatively, in some embodiments, reference entries may be assigned LIDs selected from pre-determined ranges and/or portions of the logical address space 132 that are not directly accessible by the storage clients 106.

The logical interface management module 334 may be configured to implement clone operations by linking one or more LID entries in the forward map 160 to reference entries in the reference map 460. The reference entries may be bound to the storage address(es) of the cloned data. Accordingly, LIDs that are associated with cloned data may reference the underlying data indirectly through the reference map 460 (e.g., the LID(s) may map to reference entries which, in turn, map to storage addresses). Accordingly, entries in the forward map 160 corresponding to cloned data may be referred to as "indirect entries." As used herein, an "indirect entry" refers to an entry in the forward map 160 that references and/or is linked to a reference entry in the reference map 460. Indirect entries may be assigned a LID within the logical address space 132, and may be accessible to the storage clients 106.

As disclosed above, after cloning a particular set of LIDs, the storage clients 106 may perform storage operations within one or more of the cloned ranges, which may cause the clones to diverge from one another (in accordance with the clone mode). In a "copy-on-write" mode, changes made to a particular clone may not be reflected in the other cloned ranges. In the FIG. 4A embodiment, changes made to a clone may be reflected in "local" entries associated with an indirect entry. As used herein, a "local entry" refers to a portion of an indirect entry that is directly mapped to one or more storage addresses of the storage medium 140. Accordingly, local entries may be configured to reference data that has been changed in a particular clone and/or differs from the contents of other clones. Local entries may, therefore, correspond to data that is unique to a particular clone.

The translation module 134 may be configured to access data associated with cloned data by use of, inter alia, the reference map 460 and/or reference module 434. The translation module 134 may implement a cascade lookup, which may comprise traversing local entries first and, if the target front-identifier(s) are not found within local entries, continuing the traversal within the reference entries to which the indirect entry is linked.

The log storage module 136 and media management module 370 may be configured to manage the contextual format of cloned data. In the FIG. 4A embodiment, cloned data (data that is referenced by two or more LID ranges within the forward map 160) may be stored in a contextual format that associates the data with one or more reference entries of the reference map 460. The persistent metadata stored with such cloned data segments may correspond to a single reference entry, as opposed to identifying each LID associated with the data segment. Creating a clone may, therefore, comprise updating the contextual format of the cloned data in one or more background operations by use of, inter alia, the media management module 370, as disclosed above.

Figure 4B:
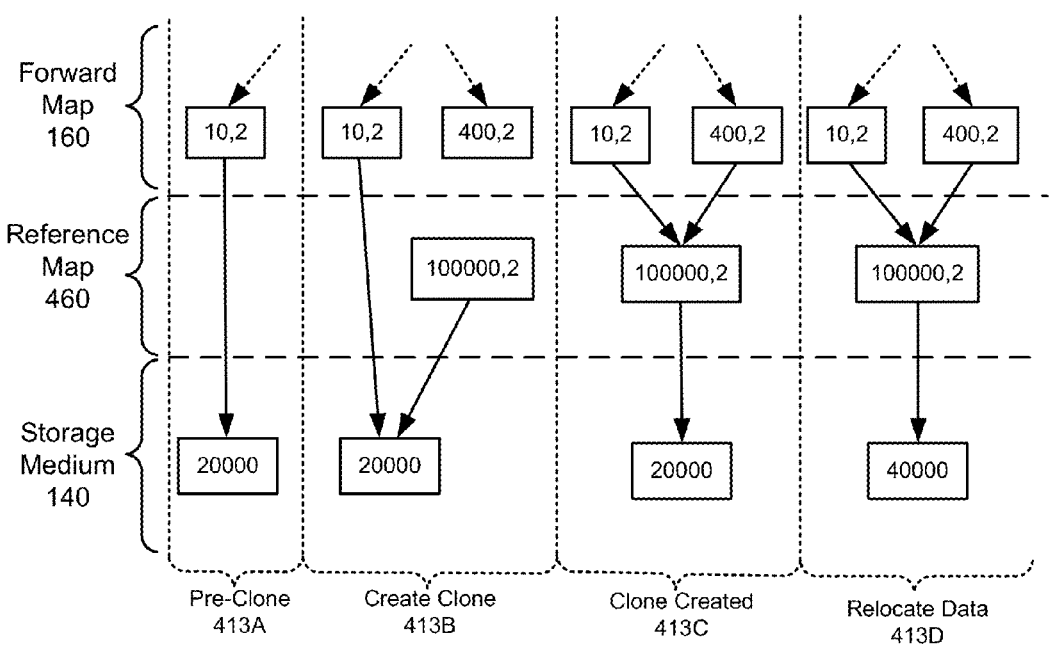
FIG. 4B depicts embodiments of range clone operations implemented by use of a reference map.

FIG. 4B depicts one embodiment of a clone operation using a reference map 460. In state 413A, an entry corresponding to LID 10 extent 2 in the logical address space 132 (denoted 10,2 in FIG. 4B) may directly reference data at storage address 20000 on the storage medium 140. Other entries are omitted from FIG. 4B to avoid obscuring the details of the disclosed embodiment. In state 413B, the storage layer 130 implements an operation to clone the range 10,2. Cloning the range 10,2 may comprise: a) allocating a new range of LIDs (denoted 400,2 in FIG. 4B) in the logical address space and b) allocating reference entries in the reference map 460 through which the entries 10,2 and 400,2 may reference the cloned data at storage address 20000 (denoted 100000,2 in FIG. 4B). The clone operation may further comprise associating the entries 10,2 and 400,2 with the reference entry 100000,2 as illustrated at state 413C. As disclosed above, associating the entries 10,2 and 400,2 with the reference entry 100000,2 may comprise indicating that the entries 10,2 and 400,2 are indirect entries. State 413C may further comprise storing a persistent note 366 on the storage medium 140 to associate the data at storage address 20000 with the reference entry 100000,2 and/or to associate the entries 10,2 and 400,2 with the reference entry 100000,2 in the reference map 460.

The storage layer 130 may provide access to the data segment at storage address 20000 through either LID 10 or 400 (through the reference entry 100000,2). In response to a request pertaining to LID 10 or 400, the translation module 134 may determine that the corresponding entry in the forward map 160 is an indirect entry that is associated with an entry in the reference map 460. In response, the reference module 434 performs a cascade to determine the storage address by use of local entries within the forward map 160 (if any) and the corresponding reference entries in the reference map 460 (e.g., reference entry 100000,2).

Creating the clone at step 413C may comprise modifying the logical interface of the data segment stored at step 20000 to associate the data with both LID ranges 10,2 and 400,2. The contextual format of the data, however, may only associate the data with LIDs 10,2. As disclosed above, creating the clone may further comprise storing a persistent note 366 on the storage medium 140 to associate the data segment with the LIDs 10,2 and 400,2 through the reference entry 100000,2. The data segment may be rewritten in an updated contextual format in one or more background operations performed by the media management module 370. The data may be stored with persistent metadata 314 that associates the data segment with the reference entry 100000,2 as opposed to the separate LID ranges 10,2 and 400,2. Therefore, relocating the data segment (as shown in state 413D) may only require updating a single entry in the reference map 460 as opposed to multiple entries corresponding to each LID range that references the data (e.g., multiple entries 10,2 and 400,2). Moreover, any number of LID ranges in the forward map 160 may reference the data segment, without increasing the size of the persistent metadata 314 associated with the data on the storage medium 140 and/or complicating the operation of the media management module 370.

Figure 4C:
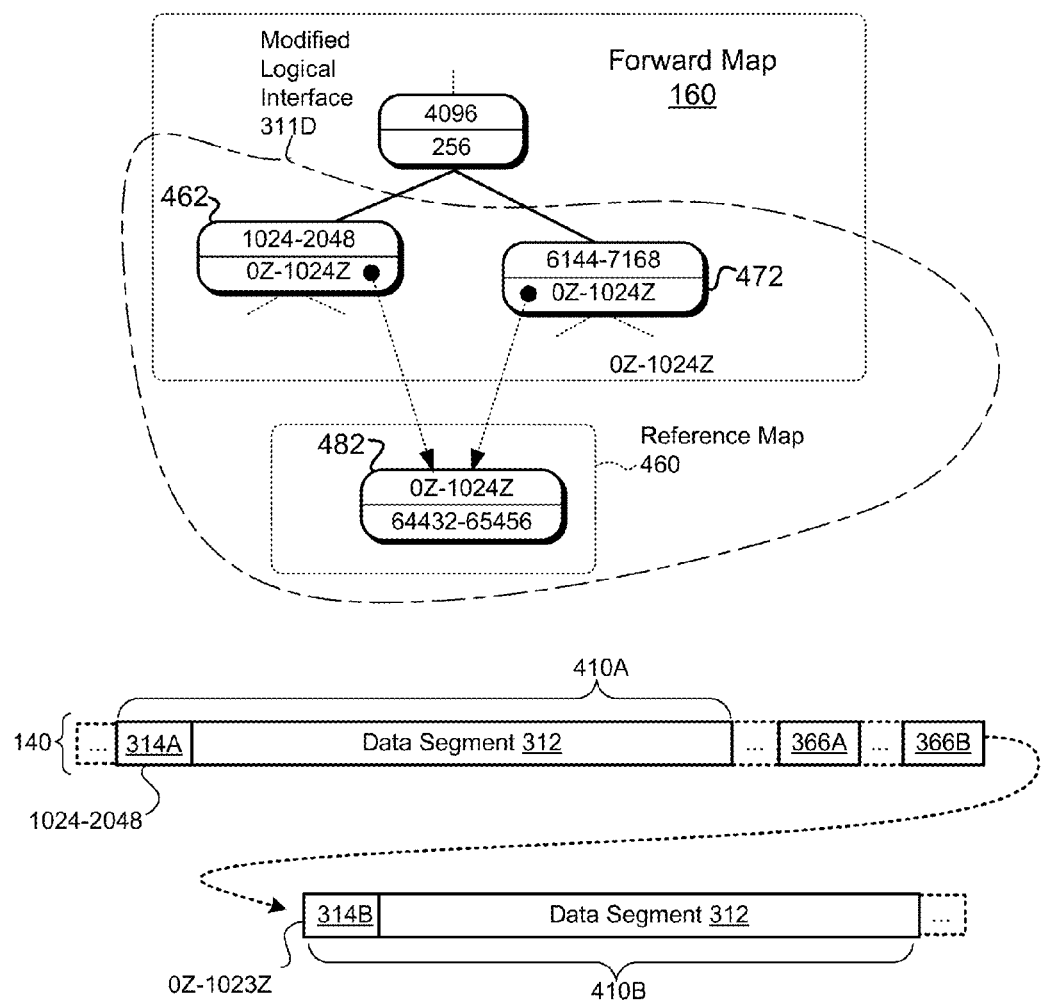
FIG. 4C depicts further embodiments of range clone operations implemented by use of a reference map.

FIG. 4C depicts another embodiment of a clone operation implemented using reference entries. In response to a request to create a clone of the LIDs 1024-2048 and/or data segment 312, the logical interface management module 334 may be configured to allocate a reference entry 482 in the reference map 460 to represent the data segment 312. Any number of LID(s) in the forward map 160 may reference the data through the reference entry 482, without increasing the overhead of the persistent metadata associated with the data segment 312 and/or complicating the operation of the media management module 370. As depicted in FIG. 4C, the reference entry 482 may be bound to the storage addresses of the data segment 312 (storage addresses 64432-65456). The entries 462 and 472 in the forward map 160 may reference the storage addresses indirectly, through the reference entry 482 (e.g., may be linked to the reference entry 482 as illustrated in FIG. 4C).

In the FIG. 4C embodiment, the reference entry 482 is assigned identifiers 0Z-1024Z. The identifier(s) of the reference entry 482 may correspond to a particular portion of the logical address space 132 or may correspond to a different, separate namespace. The storage layer 130 may link the entries 462 and 472 to the reference entry 482 by use of, inter alia, metadata associated with the entries 462 and/or 472. Alternatively, or in addition, the indirect entries 462 and/or 472 may replace storage address metadata with references and/or links to the reference entry 482. The reference entry 482 may not be directly accessible by storage clients 106 via the storage layer 130.

The clone operation may further comprise modifying the logical interface 311D of the data segment 312; the modified logical interface 311D may allow the data segment 312 to be referenced through the LIDs 1024-2048 of the indirect entry 462 and/or 6144-7168 of the indirect entry 472. Although the reference entry 482 may not be accessible to the storage clients 106, the reference entry 482 may be used to access the data by the translation module 134 (through the indirect entries 462 and 472), and as such, may be considered to be part of the modified logical interface 311B of the data segment 312.

The clone operation may further comprise storing a persistent note 366A on the storage medium 140. As disclosed above, storage of the persistent note(s) 366A and/or 366B may ensure that the clone operation is persistent and crash safe. The persistent note 366A may be configured to identify the reference entry 482 associated with the data segment 312. Accordingly, the persistent note 366A may associate the storage addresses 64432-65456 with the reference entry identifier(s) 0Z-1024Z. The clone operation may further comprise storing another persistent note 366B configured to associate the LIDs of the entries 462 and/or 472 with the reference entry 482. Alternatively, metadata pertaining to the association between entries 462, 472, and 482 may be included in a single persistent note. The persistent notes 366A and/or 366B may be retained on the storage medium 140 until the data segment 312 is relocated in an updated contextual format and/or the forward map 160 (and/or reference map 460) is persisted.

The modified logical interface 311D of the data segment 312 may be inconsistent with the contextual format original data packet 410A; the persistent metadata 314A may reference LIDs 1024-2048 rather than the reference entry 482 and/or the cloned entry 472. The storage layer 130 may be configured to store the data segment 312 in an updated contextual format (packet 410B) that is consistent with the modified logical interface 311D; the persistent metadata 314B may associate the data segment 312 with the reference entry 482, as opposed to separately identifying the LID(s) within each cloned range (e.g., entries 462 and 472). Accordingly, the use of the indirect entry 482 allows the logical interface 311D of the data segment 312 to comprise any number of LIDs, independent of size limitations of the persistent metadata 314A-B. Moreover, additional clones of the reference entry 482 may be made without updating the contextual format of the data segment 312; such updates may be made by associating the new LID ranges with the reference entry 482 in the forward map 160 and/or by use of, inter alia, persistent notes 366.

As disclosed above, the indirect entries 462 and/or 472 may initially reference the data segment 312 through the reference entry 482. Storage operations performed subsequent to the clone operation may be reflected by use of local entries within the forward map 160. After completion of the clone operation, the storage layer 130 may modify data associated with one or more of the cloned LID(s). In the FIG. 4D embodiment, a storage client 106 modifies and/or overwrites data corresponding to LIDs 1024-1052 of the indirect entry 462, which may comprise appending a new data segment 412 to the storage log (in data packet 420 at storage addresses 7823-7851).

The data segment 412 may be stored in a contextual format (data packet 420) comprising persistent metadata 414A configured to associate the data segment 412 with LIDs 1024-1052. The storage layer 130 may be configured to associate the data segment 412 with the LIDs 1024-1052 in a local entry 465. The local entry 465 may reference the updated data directly, as opposed to referencing the data through the indirect entry 462 and/or reference entry 482.

In response to a request pertaining to data 1024-1052 (or subset thereof), the logical interface management module 334 may search for references to the requested LIDs in a cascade lookup operation, which may comprise searching for references to local entries (if available) followed by the reference entries. In the FIG. 4D embodiment, the local entry 465 may be used to satisfy requests pertaining to the LID range 1024-1052 (storage addresses 7823-7851) rather than 64432-64460 per the reference entry 462. Requests for LIDs that are not found in a local entry (e.g., LIDs 1053-2048) may continue to be serviced through the reference entry 482. The logical interface 311E of the data pertaining to the range 1024-2048 may, therefore, comprise one or more local entries 465, one or more indirect entries 462, and/or one or more reference entries 482.

Figure 4D:
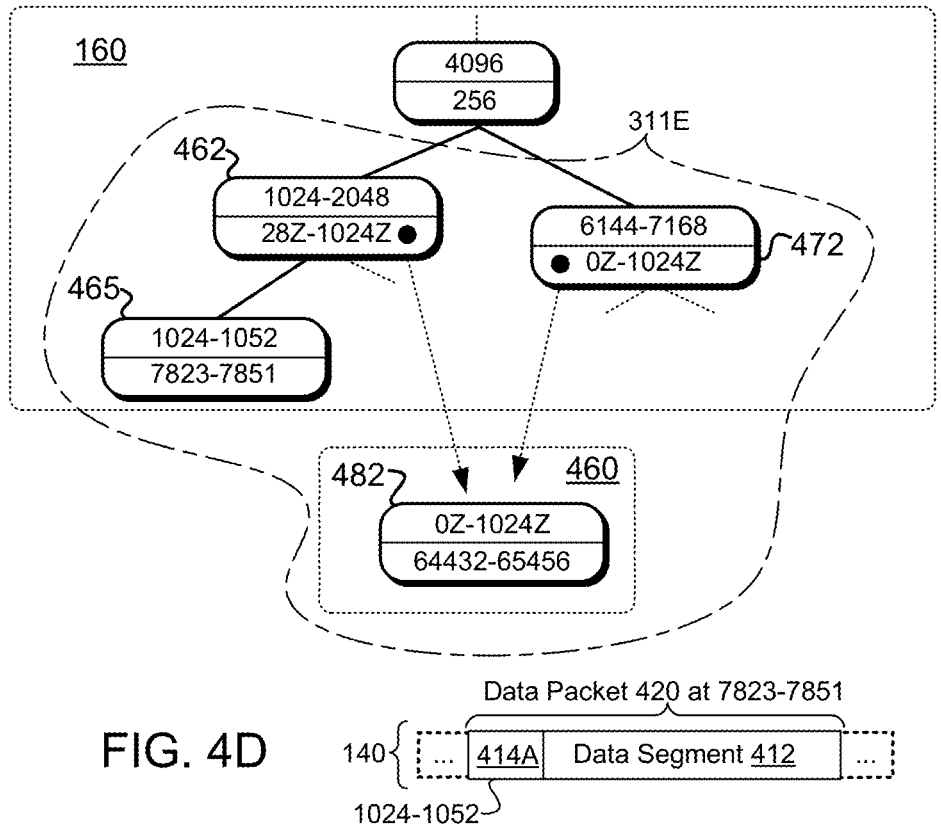
FIG. 4D depicts further embodiments of range clone operations implemented by use of a reference map.
Figure 4E:
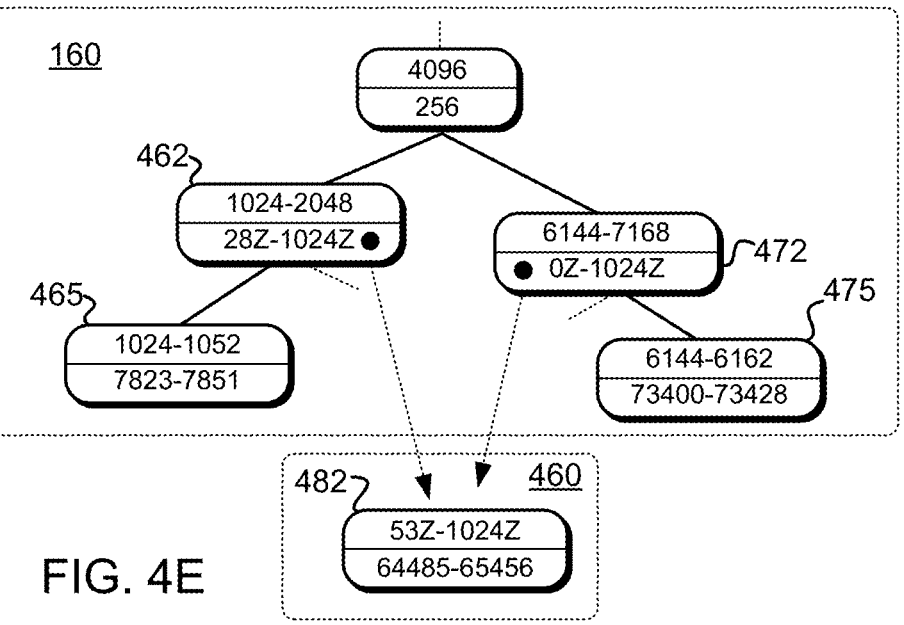
FIG. 4E depicts further embodiments of range clone operations implemented by use of a reference map.

In a further embodiment, illustrated in FIG. 4E, a storage layer 130 may modify data of the clone through another one of the LIDs of the logical interface 311E (e.g., LIDs 6144-6162); the logical interface delimiters are not shown in FIG. 4E to avoid obscuring the details of the illustrated embodiment. The modified data may be referenced using a local entry 475, as disclosed above. In the FIG. 4E embodiment, each of the ranges 462 and 472 has its own, respective local version of the data formerly referenced through identifiers 0Z-52Z of the reference entry 482. As such, neither entry 462 nor 472 includes a reference to the range 0Z-52Z. The reference module 434 may determine that the corresponding data (and reference identifiers) is no longer being referenced, and as such, may be marked for removal from the storage medium 140 (e.g., invalidated). As depicted in FIG. 4E, invalidating the data may comprise removing references to the data from the reference map 460 by, inter alia, modifying the reference entry 482 to remove the range 0Z-52Z. Invalidating the data may further comprise updating other storage metadata 135, such as a reverse map, validity bitmaps, and/or the like (e.g., to indicate that the data stored at storage addresses 64432-64484 does not need to be retained). The ranges of entries 462 and 472 may continue to diverge, until neither references any portion of the reference entry 482, at which point the reference entry 482 may be removed and the data referenced thereby may be invalidated, as disclosed above.

Although FIGS. 4D and 4E depict local entries 465 and 475 that comprise overlapping LID ranges with the corresponding indirect entries 462 and 472, the disclosure is not limited in this regard. In some embodiments, the storage operation of FIG. 4D may be reflected by creating the local entry 465 and modifying the indirect entry 462 to reference only the LIDs 1053-2048. Similarly, the operation of FIG. 4E may comprise creating the local entry 475 and modifying the indirect entry 472 to reference a truncated LID range 6163-7168.

Referring back to FIG. 4A, the reference module 434 may be configured to manage or "groom" the reference map 460. In some embodiments, each entry in the reference map 460 comprises metadata that includes a reference count. The reference count may be incremented as new references or links to the reference entry are added, and may be decremented in response to removing references to the entry. In some embodiments, reference counts may be maintained for each reference identifier in the reference map 460. Alternatively, reference counts may be maintained for reference entries as a whole. When the reference count of a reference entry reaches 0, the reference entry (and/or a portion thereof) may be removed from the reference map 460. Removing a reference entry (or portion of a reference entry) may comprise invalidating the corresponding data on the storage medium 140, as disclosed herein (indicating that the data no longer needs to be retained).

In another embodiment, the reference module 434 may remove reference entries using a "mark-and-sweep" approach. The reference module 434 (or other process, such as the translation module 134) may periodically check references to entries in the reference map 460 by, inter alia, following links to the reference entries from indirect entries (or other types of entries) in the forward map 160. Reference entries that are not accessed during the mark-and-sweep may be removed, as disclosed above. The mark-and-sweep may operate as a background process, and may periodically perform a mark-and-sweep operation to identify and remove reference entries that are no longer in use.

In some embodiments, the reference map 460 disclosed herein may be created on demand (e.g., in response to creation of a clone, or other indirect data reference). In other embodiments, all data storage operations may be performed through intermediate mappings. In such embodiments, storage clients 106 may allocate indirect, virtual identifiers (VIDs) of a virtual address space (VAS), which may be linked to and/or reference storage addresses through an intermediate mapping layer, such as the logical address space 132. The VAS may add an intermediate mapping layer between storage clients 106 and the storage medium 140. Storage clients 106 may reference data using VIDs of a virtualized address space that map to logical identifiers of the logical address space 132, and which, in turn, are associated with storage addresses on respective storage device(s) 141 and/or storage medium 140. As used herein, a VAS may include, but is not limited to, a Logical Unit Number (LUN) address space, a virtual LUN (vLUN) address space, and/or the like.

Figure 5A:
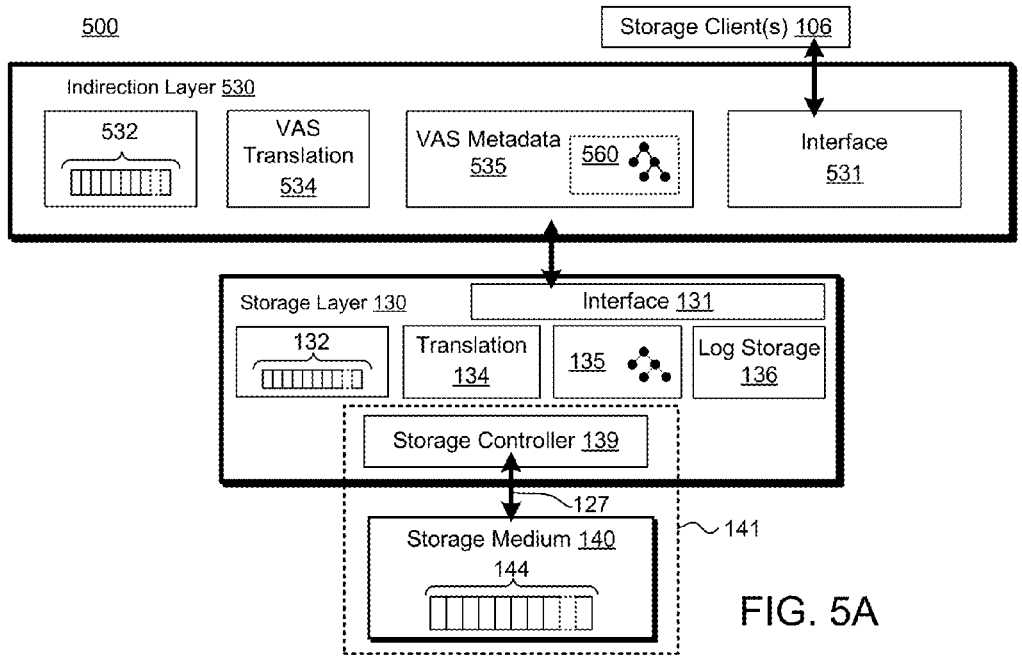
FIG. 5A is a block diagram of one embodiment of a system comprising an aggregation layer.

FIG. 5A depicts one embodiment of an aggregation layer 530 configured to implement, inter alia, efficient range clone operations using a virtualized address space 532. The aggregation layer 530 may be configured to present a VAS 532 to the storage clients 106 through an interface 531. Like the interface 131 disclosed herein, the interface 531 may comprise one or more of a block device interface, virtual storage interface, cache interface, and/or the like. Storage clients 106 may perform storage operations pertaining to storage resources managed by the aggregation layer 530 by reference to VIDs of the VAS 532 through the interface 531.

The aggregation layer 530 may further comprise a VAS translation module 534 configured to map VIDs to storage resources through one or more intermediary storage layers (e.g., storage layer 130). Accordingly, the VAS metadata 535 of the aggregation layer 530 may include a VAS forward map 560 comprising any-to-any mappings between VIDs of the VAS 532 and LIDs of the VAS 532. Although not depicted in FIG. 5A, the VAS translation module 534 and/or VAS forward map 560 may be configured to aggregate a plurality of logical address spaces 132 of a plurality of different storage layers 130 into a single VAS 532. Accordingly, in some embodiments, a VAS 532 may correspond to a plurality of different logical address spaces 132, each comprising a separate set of LIDs, and each corresponding to a respective storage layer 130, storage device 141, and/or storage medium 140.

Although FIG. 5A depicts the aggregation layer 530 separately from the storage layer 130, the disclosure is not limited in this regard. In some embodiments, VAS 532, VAS forward map 560, VAS translation module 534, and/or other modules of the aggregation layer 530 may be implemented as part of the storage layer 130.

The aggregation layer 530 may be configured to leverage the intermediary virtual address space provided by the VAS 532 to, inter alia, implement efficient range clone, move, merge, and/or other high-level operations. Alternatively, or in addition, the intermediary mapping layer(s) may be leveraged to enable efficient clone operations on random access, write-in-place storage devices, such as hard disks and/or the like.

Storage clients 106 may perform storage operations in reference to VIDs of the VAS 532. Accordingly, storage operations may comprise two (or more) translation layers. The VAS forward map 560 may comprise a first translation layer between VIDs of the VAS 532 and identifiers of the logical address space 132 of the storage layer 130. The forward map 160 of the storage layer 130 may implement a second translation layer between LIDs and storage address(es) on the storage medium 140.

The aggregation layer 530 may be configured to manage allocations within the VAS 532 by use of, inter alia, the VAS metadata 535, VAS forward map 560, and/or VAS translation module 534. In some embodiments, allocating a VID in the VAS 532 may comprise allocating one or more corresponding LIDs in the logical address space 132 (and/or identifiers of one or more other storage layers). Accordingly, each VID allocated in the VAS 532 may correspond to one or more LIDs of the logical address space 132. The any-to-any mappings between the VIDs of the aggregation layer 530 and the logical address space 132 may be sparse and/or any-to-any, as disclosed herein. Moreover, in some embodiments, the aggregation layer 530 may be configured to maintain any-to-any and/or range managed mappings between VIDs and a plurality of different logical address spaces 132. Accordingly, the aggregation layer 530 may aggregate and/or combine the logical address spaces of a plurality of different storage devices 141 managed by different respective storage layers 130 into a single, aggregate VAS 532.

In the FIG. 5A embodiment, the logical address space 132 may not be directly accessible, and as such, storage clients 106 may reference storage resources using VIDs through the interface 531. Therefore, performing a storage operation through the aggregation layer 530 in reference to one or more VIDs may comprise: a) identifying the storage layer 130 corresponding to the VIDs, b) determining the LID(s) of the storage layer 130 that are mapped to the VIDs by use of the VAS translation module 534 and/or VAS forward map 560; and c) implementing the storage operation by use of the storage layer 130 in reference to the determined LID(s).

Figure 5B:
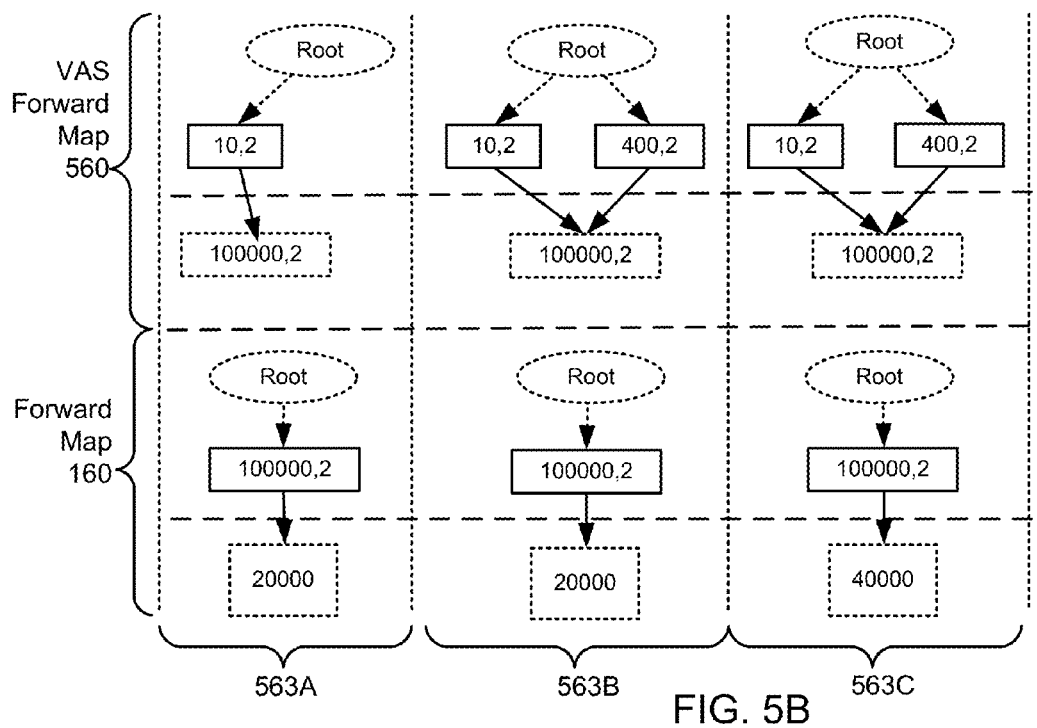
FIG. 5B depicts embodiments of range clone operations implemented by use of an aggregation layer.

FIG. 5B depicts one embodiment of a clone operation implemented by use of the aggregation layer 530. As disclosed above, the VAS forward map 560 may correspond to a VAS 532 that is indirectly mapped to storage addresses through a logical address space 132 of a storage layer 130. FIG. 5B illustrates the addressing layers used to implement storage operations through the aggregation layer 530. The VIDs of the VAS 532 may comprise the top-level addressing layer that is accessible to storage clients 106 through, inter alia, the interface 531 of the aggregation layer 530. The logical address space 132 of the storage layer 130 may comprise an intermediary addressing layer. The VAS forward map 560 may comprise any-to-any mappings between VIDs and LIDs. The LIDs may be mapped to storage addresses within the storage address space 144 by use of the forward map 160. Accordingly, VIDs may be mapped to the storage address space 144 through the intermediate logical address space of the storage layer 130.

As illustrated in FIG. 5B, in state 563A, the VAS forward map 560 may comprise an entry 10,2 that represents two VIDs (10 and 11) in the VAS 532. The VAS forward map 560 associates the VID entry 10,2 with LIDs of the logical address space 132. In the FIG. 5B embodiment, the VAS forward map 560 binds the VID entry 10,2 to LIDs 100000 and 100001 (entry 100000,2). The entry 10,2 may be allocated to a particular storage client 106, which may perform storage operations in reference to the VIDs. In state 563A, the storage layer 130 may be configured to map the entry 100000,2 to one or more storage addresses on the storage medium 140 (storage address 20000).

In state 536B, the aggregation layer 530 may implement a clone operation to clone the VID entry 10,2. The clone operation may comprise: a) allocating a new VID entry 400,2 and b) associating the new VID entry 400,2 with the corresponding entry 100000,2 in the VAS forward map 560. The corresponding entry 100000,2 in the forward map 160 may remain unchanged. Alternatively, a reference count (or other indicator) of the entry 100000,2 in the forward map 160 may be updated to indicate that the entry is being referenced by multiple VID ranges. The contextual format of the data stored at storage address 20000 may be left unchanged (e.g., continue to associate the data with the logical interface 100000,2). The clone operation may further comprise storing a persistent note 366 on the storage medium 140 to indicate the association between the VID entry 400,2 and the entry 100000,2 in the forward map 160. Alternatively, or in addition, the clone operation may be made persistent and/or crash safe by persisting the VAS forward map 560 (and/or portions thereof).

In state 536C, the data at storage address 20000 may be relocated to storage address 40000. The relocation may occur in a standard storage media maintenance operation, and not to update the contextual format of the cloned data. Relocating the data may comprise updating a single entry in the forward map 160. The VAS forward map 560 may remain unchanged. Modifications to the different versions of the VID ranges 10,2 and 400,2 may be managed through the intermediary, logical address space. A modification to VID 10 may comprise: a) allocating a new LID in the logical address space 132, b) storing the modified data in association with the new LID, and c) mapping the new LID to VID 10 in the VAS forward map 560.

The embodiments for implementing range clone, move, and/or merge operations disclosed herein may be used to efficiently implement other, higher-level storage operations, such as snapshots, deduplication, atomic operations, transactions, file-system management functionality, and/or the like. Referring back to FIG. 4A, the storage layer 130 may comprise a deduplication module 374 configured to identify duplicate data on the storage medium 140. Duplicate data may be identified using any suitable mechanism. In some embodiments, duplicate data is identified by: a) scanning the contents of the storage medium 140, b) generating signature values for various data segments, and c) comparing data signature values to identify duplicate data. The signature values may include, but are not limited to, cryptographic signatures, hash codes, cyclic codes, and/or the like. Signature information may be stored within storage metadata 135, such as the forward map 160 (e.g., in metadata associated with the entries), and/or may be maintained and/or indexed in one or more separate datastructures of the storage metadata 135. The deduplication module 374 may compare data signatures and, upon detecting a signature match, may perform one or more deduplication operations. The deduplication operations may comprise verifying the signature match (e.g., performing a byte-by-byte data comparison) and performing one or more range clone operations to reference the duplicate data through two or more LID ranges.

Figure 6:
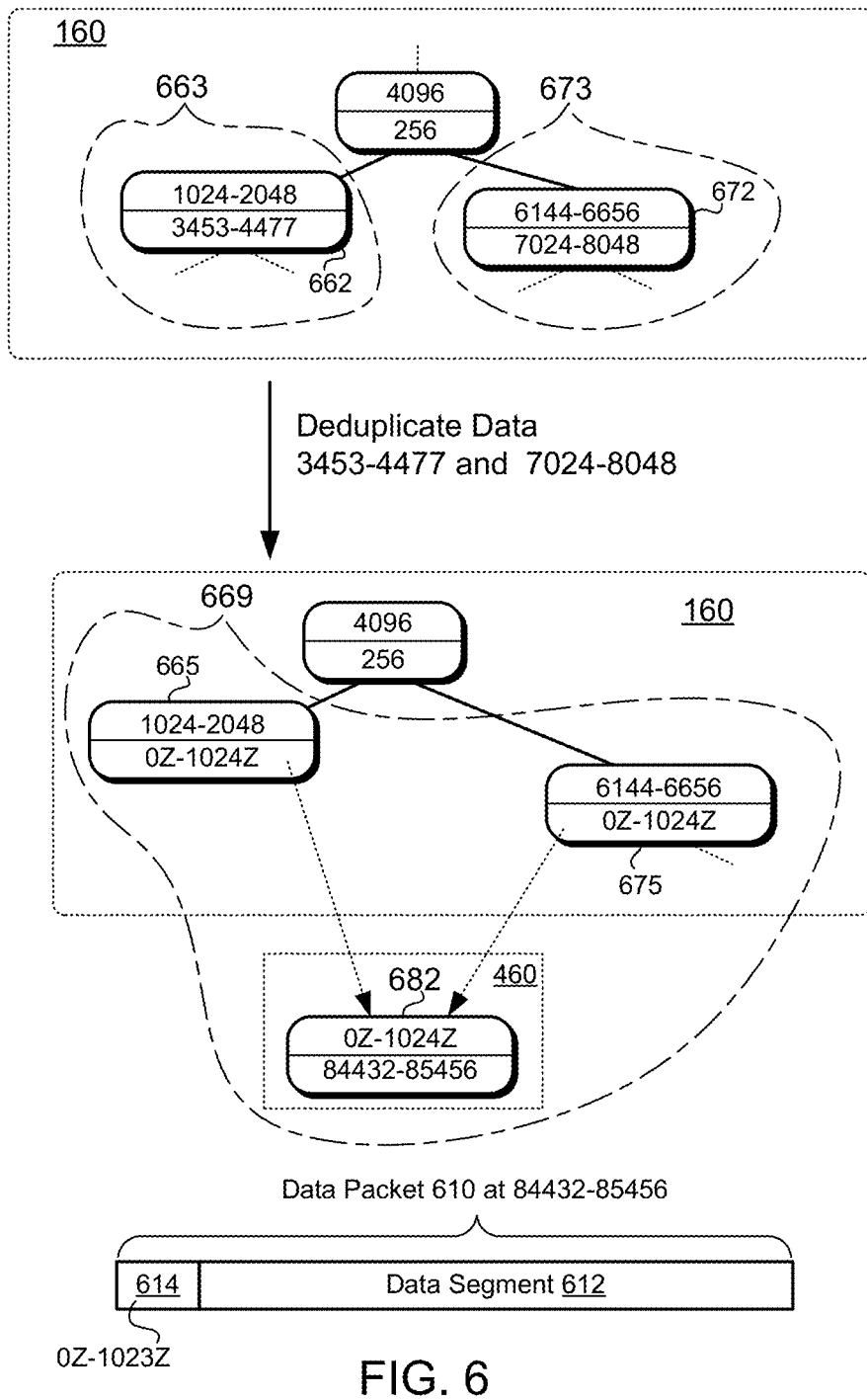
FIG. 6 depicts embodiments of deduplication operations.

FIG. 6 depicts one embodiment of a deduplication operation. The forward map 160 may comprise entries 662 and 672, which may reference duplicated data stored at different respective storage addresses 3453-4477 and 7024-8048. The entries 662 and 672 may correspond to different, respective logical interfaces 663 and 673 corresponding to LIDs 1024-2048 and 6144-6656, respectively. The duplicated data segment (data segment 612) may be identified and/or verified by the deduplication module 374, as disclosed above. Alternatively, the duplicated data may be identified as data is received for storage at the storage layer 130. Accordingly, the data may be deduplicated before an additional copy of the data is stored on the storage medium 140.

In response to identifying and/or verifying that the entries 662 and 672 reference duplicate data, the storage layer 130 may be configured to deduplicate the data, which may comprise creating one or more range clones to reference a single copy of the duplicate data through two different sets of LIDs. As disclosed above, creating a range clone may comprise modifying the logical interface(s) 663 and 673 of a data segment. In the FIG. 6 embodiment, the duplicated data is stored as a data segment 612 within a packet 610 at storage locations 3453-4477 and 7024-8048, respectively. The clone operation may comprise modifying the logical interface of one of the data segments (or a new version and/or copy of the data segment), such that the data segment can be referenced by both entries 663 and 673.

The range clone operation may be implemented using any of the clone embodiments disclosed herein including the range clone embodiments of FIGS. 3A-E, the reference entry embodiments of FIGS. 4A-E, and/or the intermediate mapping embodiments of FIGS. 5A-B. In the de-deduplication embodiment of FIG. 6, both LID ranges 1024-2048 and 6144-7168 may be modified to reference a single version of the data segment 612 (the other data segment may be invalidated) through a reference entry 682. As such, the deduplication operation may comprise creating a reference entry 682 to represent the deduplicated data segment 612 (reference the packet 610). The deduplication operation may further comprise modifying and/or converting the entries 662 and 672 into respective indirect entries 665 and 675, which may be mapped to the data segment 612 through the reference entry 682, as disclosed above. The deduplication operations may further comprise modifying the logical interface 669 of the data segment 612 to associate the data segment 612 with both sets of LIDs 1024-2048 and 6144-7168 (as well as the reference entry 682). The deduplication operations may further comprise storing a persistent note 366 on the storage medium 140, as disclosed above.

The deduplication operation may further comprise updating the contextual format of the data segment 612 to be consistent with the modified logical interface 669, as disclosed above. Updating the contextual format may comprise appending the data segment 612 in an updated contextual format (data packet 610) to the storage log (e.g., at storage locations 84432-85456) in one or more background operations. The updated data packet 610 may comprise persistent metadata 614 that associates the data segment 612 with the updated logical interface 669 (e.g., LIDs 1024-2048 and 6144-6656 through reference identifiers 0Z-1023Z).

Although FIG. 6 illustrates cloning and/or deduplicating a single entry or range of LIDs, the disclosure is not limited in this regard. In some embodiments, a plurality of front-identifier ranges may be cloned in a single clone operation. This type of clone operation may be used to create a "snapshot" of an address range (or entire logical address space 132). As used herein, a snapshot refers to the state of a storage device (or set of LIDs) at a particular point in time. The snapshot may maintain an "original" state of a LID range regardless of changes that occur within the range after completing the snapshot operation.

Figure 7:
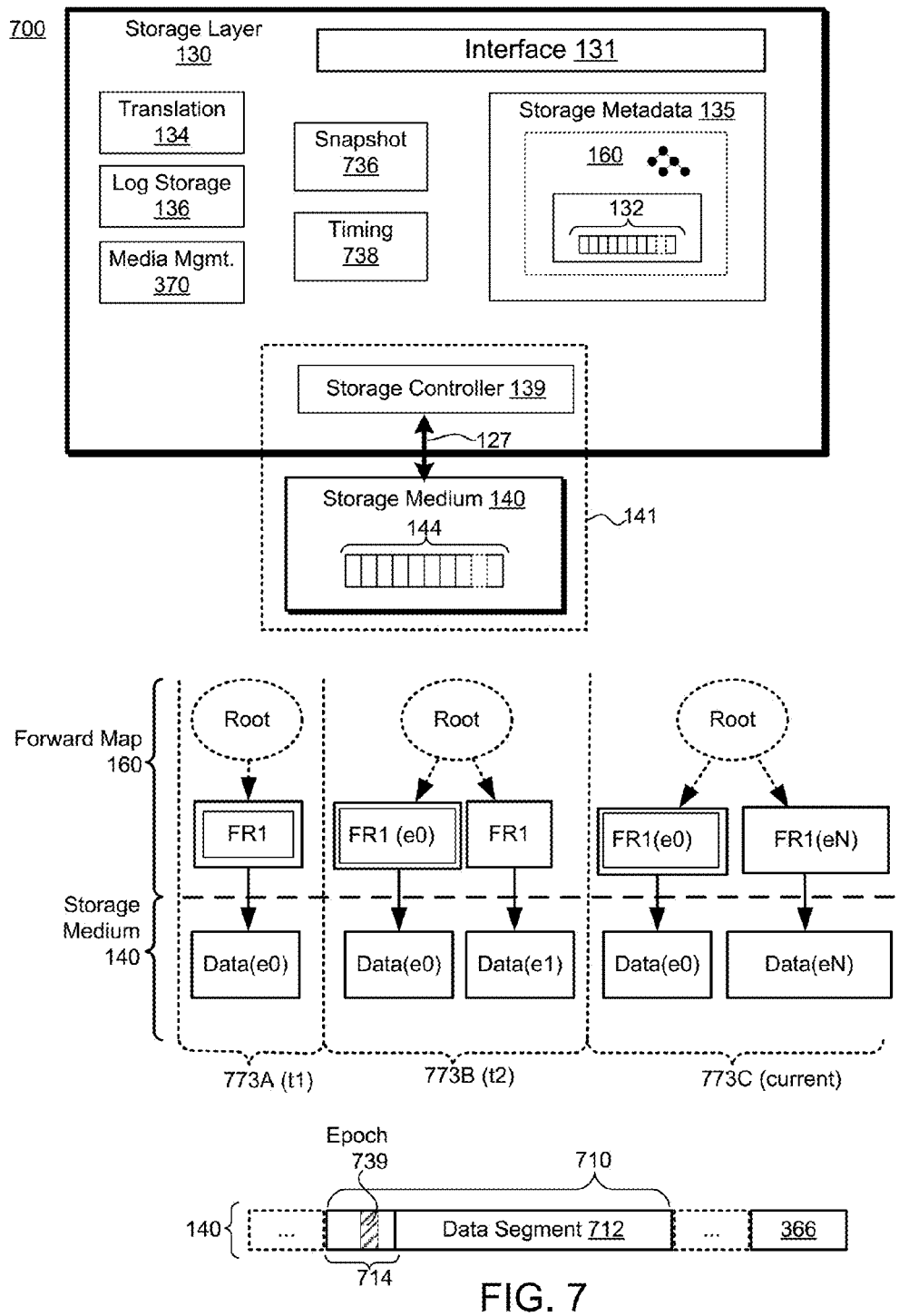
FIG. 7 is a block diagram depicting one embodiment of a system comprising a storage layer configured to efficiently implement snapshot operations.

FIG. 7 is a block diagram depicting one embodiment of a system 700 comprising a storage layer 130 configured to efficiently implement snapshot operations. The FIG. 7 embodiment pertains to an address range within a logical address space 132. The disclosure is not limited in this regard, however, and could be adapted for use with other types of address ranges, such as ranges and/or extents within a VAS 532, as disclosed above. The storage layer 130 may comprise a snapshot module 736 and timing module 738 configured to implement snapshot operations as disclosed herein.

In state 773A, the storage layer 130 may be configured to create a snapshot of a LID range FR1. Creating the snapshot may comprise preserving the state of the LID range FR1 at a particular time. The snapshot operation may further comprise preserving the LID range FR1 while allowing subsequent storage operations to be performed within the LID range.

As disclosed above, the storage layer 130 may be configured to store data in a storage log on the storage medium 140 by use of, inter alia, the log storage module 136. The log order of storage operations may be determined using sequence information associated with data packets, such as sequence indicators 113 on storage divisions 170A-N and/or sequential storage locations within the storage address space 144 of the storage medium 144 (as disclosed in conjunction with FIGS. 1D and 1E).

The storage layer 130 may be further configured to maintain other types of ordering and/or timing information, such as the relative time ordering of data in the log. However, in some embodiments, the log order of data may not accurately reflect timing information due to, inter alia, data being relocated within the storage device in media management operations. Relocating data may comprise reading the data from its original storage location on the storage medium 140 and appending the data at a current append point within the storage log. As such, older, relocated data may be stored with newer, current data in the storage log. Therefore, although the storage log may preserve the relative log order of data operations pertaining to particular LIDs, the storage log may not accurately reflect absolute timing information.

In some embodiments, the log storage module 136 is configured to associate data with timing information, which may be used to establish relative timing information of the storage operations performed on the storage medium 130. In some embodiments, the timing information may comprise respective timestamps (maintained by the timing module 738), which may be applied to each data packet stored on the storage medium 140. The timestamps may be stored within persistent metadata 314 of the data packets 310. Alternatively, or in addition, the timing module 738 may be configured to track timing information at a coarser level of granularity. In some embodiments, the timing module 738 maintains one or more global timing indicators (an epoch identifier). As used herein, an "epoch identifier" refers to an identifier used to determine relative timing of storage operations performed through the storage layer 130. The log storage module 136 may be configured to include an epoch indicator 739 in data packets 710. The epoch indicator 739 may correspond to the current epoch (e.g., global timing indicator) maintained by the timing module 738. The epoch indicator 739 may correspond to the epoch in which the corresponding data segment 712 was written to the storage log. The epoch indicator 739 may be stored within the persistent metadata 714 of the packet 710, and as such, may remain associated with the data packet 710 during relocation operations. The timing module 738 may be configured to increment the global epoch identifier in response to certain events, such as the creation of a new snapshot, a user request, and/or the like. The epoch indicator 739 of the data segment 712 may remain unchanged through relocation and/or other media maintenance operations. Accordingly, the epoch indicator 739 may correspond to the original storage time of the data segment 712 independent of the relative position of the data packet 710 in the storage log.

A snapshot operation may comprise preserving the state of a particular LID range (FR1) at a particular time. A snapshot operation may, therefore, comprise preserving data pertaining to FR1 on the storage medium 140. Preserving the data may comprise: a) identifying data pertaining to a particular timeframe (epoch) and b) preserving the identified data on the storage medium 140 (e.g., preventing the identified data being removed from the storage medium 140 in, inter alia, storage recovery operations). Data pertaining to a snapshot may be retained despite being invalidated by subsequent storage operations (e.g., operations that overwrite, modify, TRIM, and/or otherwise obviate the data). Data that needs to be preserved for a particular snapshot may be identified by use of the epoch indicators 739 disclosed above.

In state 773A (time t1, denoted by epoch indicator e0), the storage layer 130 may receive a request to implement a snapshot operation. In response to the request, the snapshot module 736 may determine the current value of the epoch identifier maintained by the timing module 738. The current value of the epoch identifier may be referred to as the current "snapshot epoch." In the FIG. 7 embodiment, the snapshot epoch is 0. The snapshot module 736 may be further configured to cause the timing module 738 to increment the current, global epoch indicator (e.g., increment the epoch identifier to 1). Creating the snapshot may further comprise storing a persistent note 366 on the storage medium configured to indicate the current, updated epoch indicator. The persistent note 366 may be further configured to indicate that data pertaining to the snapshot epoch is to be preserved (e.g., identify the particular range of LIDs FR1 to be preserved in the snapshot operation). The persistent note 366 may be used during metadata reconstruction operations to: a) determine the current epoch identifier and/or b) configure the snapshot module 736 and/or media management module 370 to preserve data associated with a particular snapshot epoch (e.g., epoch e0).

The snapshot module 736 may be further configured to instruct the media management module 370 to preserve data associated with the snapshot epoch. In response, the media management module 370 may be configured to: a) identify data to preserve for the snapshot (snapshot data), and b) prevent the identified data from being removed from the storage medium 140 in, inter alia, storage recovery operations. The media management module 370 may identify snapshot data by use of the epoch indicators 739 of the data packets 710. As disclosed in conjunction with FIG. 1E, data may be written out-of-place on the storage medium 140. The most current version of data associated with a particular LID may be determined based on the order of the corresponding data packets 710 within the log. The media management module 370 may be configured to identify the most current version of data within the snapshot epoch as data that needs to be preserved. Data that has been rendered obsolete by other data in the snapshot epoch may be removed. Referring to the FIG. 1E embodiment, if the data X0 and X1 (associated with the same LID A) were both marked with the snapshot epoch 0, the media management module 370 would identify the most current version of the data in epoch 0 as X1, and would mark the data X0 for removal. If, however, data X0 were marked with snapshot epoch 0 and X1 where marked with a later epoch (e.g., epoch 1, after the snapshot operation), the media management module 370 may preserve the data X0 on the storage medium 140 in order to preserve the data of the snapshot.

In state 773B, the snapshot module 738 may be configured to preserve data pertaining to the snapshot FR1 (data associated with epoch e0), while allowing storage operations to continue to be performed during subsequent epochs (e.g., epoch e1). Preserving FR1 may comprise cloning FR1 to preserve the original status of the LID range at epoch e0 (FR1 (e0)), while allowing storage operations to continue with reference to FR1. The clone operation may be implemented as disclosed above using one or more of duplicated entries, reference entries, and/or an intermediate mapping layer. The storage operations may comprise appending data to the storage log on the storage medium 140 in reference to the LIDs FR1. The cloned LIDs corresponding to the snapshot FR1 (e0) may be immutable. Accordingly, the snapshot of FR1 (e0) may be preserved despite changes to the LID range. Data stored in state 773B may be stored with an epoch indicator 739 of the current epoch (e1). The snapshot module 736 may be configured to preserve data that is rendered obsolete and/or invalidated by storage operations performed during epoch e1 (and subsequent epochs). Referring back to the FIG. 1E embodiment, the media management module 370 may identify data X0 as data to preserve for the snapshot FR1 (the data X1 may have been stored after the snapshot operation was performed). The snapshot module 738 and/or media management module 370 may be configured to preserve the data X0 even though the data was subsequently made obsolete by data X1 in epoch e1. The data X0 may be retained even if the LID A is deleted, TRIMed, or the like.

The snapshot of FR1 (e0), including the LID range FR1 (e0) and the data marked with epoch indicator e0, may be preserved until the corresponding snapshot is deleted. The snapshot may be deleted in response to a request received through the interface 131. As indicated in state 773C, the epoch 0 may be retained on the storage medium 140 even after other, intervening epochs (epochs e1-eN) have been created and/or deleted. Deleting the epoch e0 may comprise configuring the snapshot module 738 and/or media management module 370 to remove invalid/obsolete data associated with the epoch e0.

Storage operations performed after creating the snapshot at state 773A may modify the logical address space 132 and specifically the forward map 160. The modifications may comprise updating storage address bindings in response to appending data to the storage medium 140, adding and/or removing LIDs to FR1, and so on. In some embodiments, the snapshot module 736 is configured to preserve the snapshot range FR1 (e0) within separate storage metadata 135, such as a separate region of the logical address space 132, in a separate namespace, in a separate map, and/or the like. Alternatively, the snapshot module 736 may allow the changes to take place in the forward map 160 without preserving the original version of FR1 at time e0. The snapshot module 736 may be configured to reconstruct the forward map 160 for e0 (time t1) using the snapshot data preserved on the storage medium 140. The forward map 160 at time t1 may be reconstructed, as disclosed above, which may comprise sequentially accessing data stored on the storage medium 140 (in a log-order) and creating forward map entries based on persistent metadata 714 associated with the data packets 710. In the FIG. 7 embodiment, forward map 160 corresponding to epoch e0 may be reconstructed by referencing data packets 710 that are marked with the epoch indicator 739 e0 (or lower). Data associated with epoch indicators 739 greater than e0 may be ignored (since such data corresponds to operations after creation of the snapshot FR1 (e0) was created).

Figure 8A:
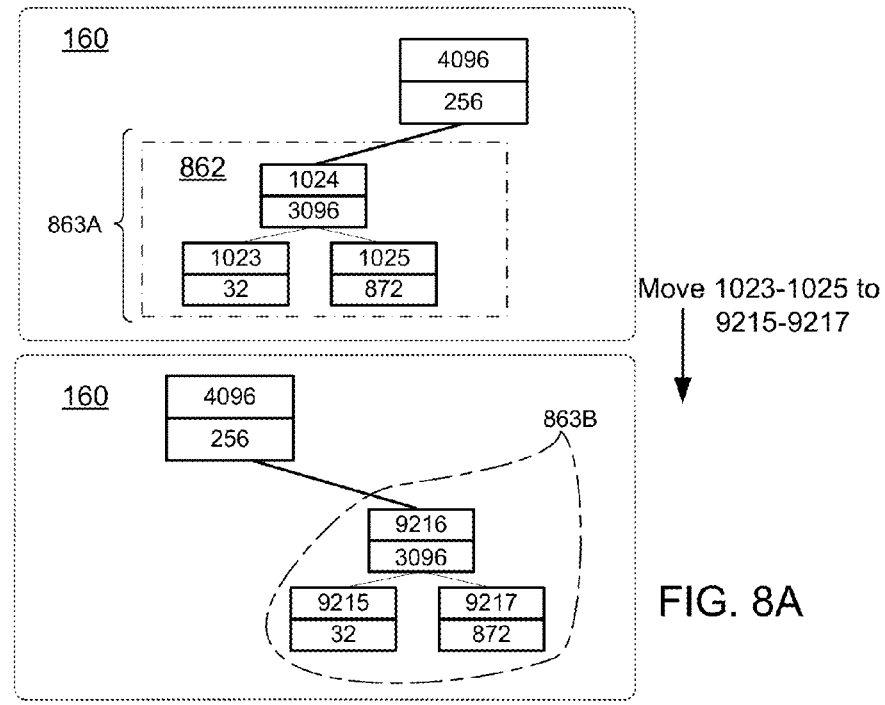
FIGS. 8A-E depict embodiments of range move operations.

The storage layer 130 disclosed herein may be further configured to implement efficient range move operations. FIG. 8A depicts one embodiment of a move operation implemented by the storage layer 130 disclosed herein. The forward map 160 includes entries 862 configured to bind LIDs 1023-1025 to respective data segments on the storage medium 140. The entries 862 are depicted separately to better illustrate details of the embodiment; however, the entries 862 could be included in a single entry comprising the full range of LIDs 1023-1025. The entries 862 may define a logical interface 863 of the data stored at storage addresses 32, 3096, and 872. As disclosed above, the data stored at storage addresses 32, 3096, and 872 may be stored in a contextual format that associates the data with the corresponding LID(s) 1023, 1024, and 1025.

The storage layer 130 may be configured to move the entries 862 to LIDs 9215-9217 by, inter alia, replacing the association between the LIDs 1023, 1024, and 1025 and the data at the respective media storage locations 32, 3096, and 872 with a new logical interface 863B corresponding to the new set of LIDs (e.g., 9215, 9216, and 9217). The move operation may be performed in response to a request received via the interface 131 and/or as part of a higher-level storage operation (e.g., a request to rename a file, operations to balance and/or defragment the forward map 160, or the like).

The move operation may be implemented in accordance with one or more of the cloning embodiments disclosed above. In some embodiments, the move operation may comprise associating the storage addresses mapped to LIDs 1023, 1024, and 1025 with the destination LIDs 9215, 9216, and 9217, which may result in modifying the logical interface 863A of the data in accordance with the move operation. The move operation may further comprise storing a persistent note 366 on the storage medium 140 to ensure that the move operation is persistent and crash safe. The data stored at storage addresses 32, 872, and 3096 may be rewritten in accordance with the updated logical interface 863B in one or more background operations, as disclosed above.

Figure 8B:
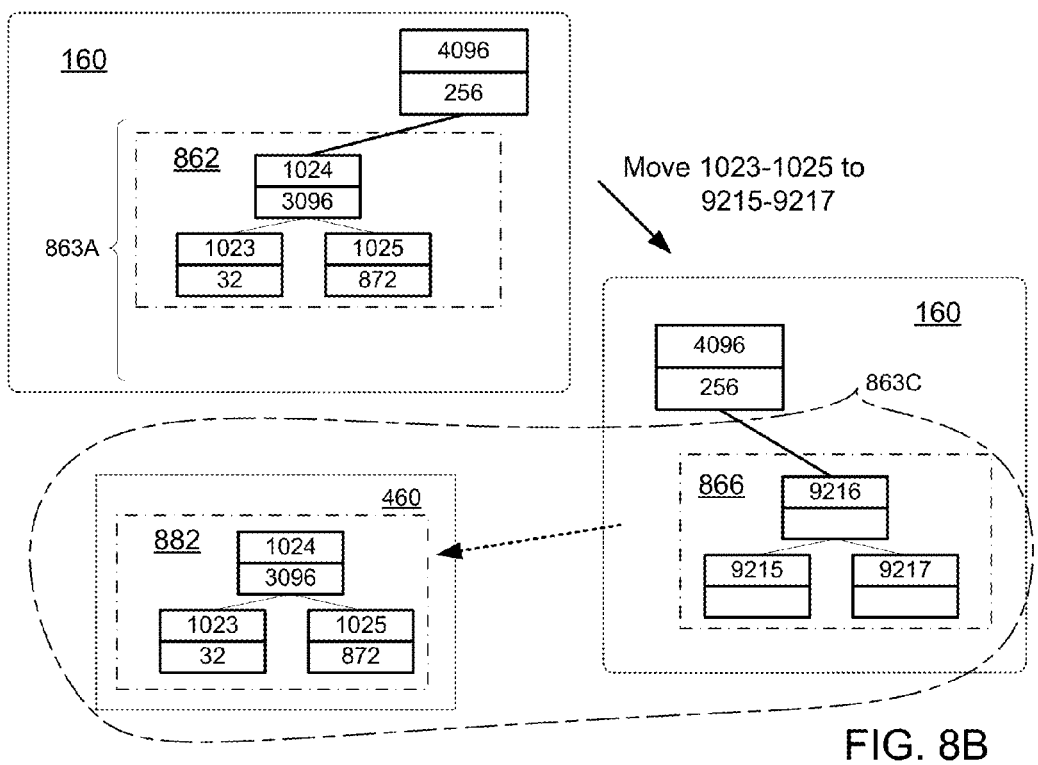

FIG. 8B depicts another embodiment of a move operation. As above, the move operation may comprise moving the data associated with LIDs 1023-1025 to LIDs 9215-9217. The move operation of FIG. 8B may utilize the reference entries as disclosed in conjunction with FIGS. 4A-E. Accordingly, the move operation may comprise creating reference entries 882 in a reference map 460 to represent the move operation. The move operation may further comprise allocating new indirect entries 866 to reference the data through the reference entries 882. reference entries 882 may comprise the pre-move LIDs 1023, 1024, and 1025, which may be associated with the addresses 32, 3096, and 872. The new logical interface 863C of the data may, therefore, comprise the indirect entries 866 and the corresponding reference entries 882. The move operation may further comprise storing a persistent note 366 on the storage medium to ensure that the move operation is persistent and crash safe, as disclosed above.

The contextual format of the data stored at storage addresses 32, 3096, and 872 may be inconsistent with the updated logical interface 863C; the contextual format of the data may associate the respective data segments with LIDs 1023, 1024, and 1025 as opposed to 9215, 9216, and 9217 (and/or the reference entries). The persistent note 366 may comprise the updated logical interface 863C of the data, so that the storage metadata 135 (e.g., forward map 160 and/or reference map 460) can be correctly reconstructed if necessary.

The storage layer 130 may provide access to the data in the inconsistent contextual format through the modified logical interface 863C (LIDs 9215, 9216, and 9217). The data may be rewritten and/or relocated in a contextual format that is consistent with the modified logical interface 863C subsequent to the move operation (outside of the path of the move operation and/or other storage operations). In some embodiments, the data at storage addresses 32, 3096, and/or 872 may be rewritten by a media management module 370 in one or more background operations, as disclosed above. Therefore, the move operation may complete (and/or return an acknowledgement) in response to updating the forward map 160 and/or storing the persistent note 366.

Figure 8C:
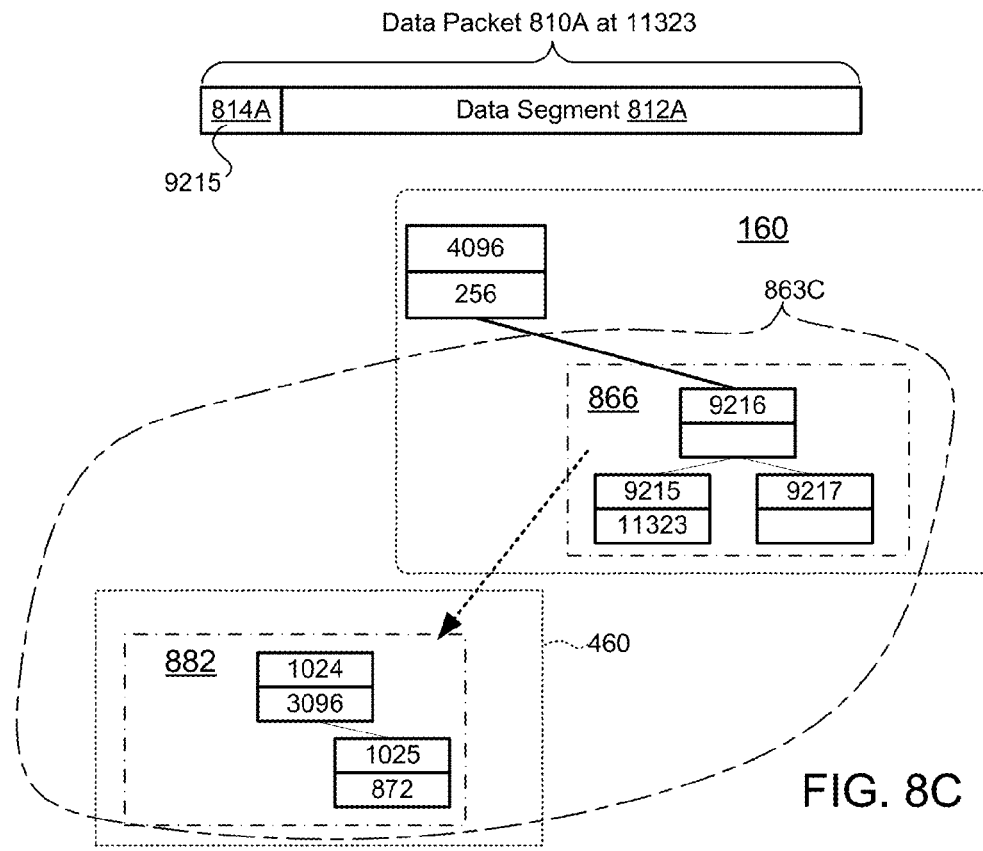

As illustrated in FIG. 8C, the forward map 160 and/or other storage metadata 135 may be updated in response to rewriting data of the move operation. In the FIG. 8C embodiment, the data segment 812A stored at media storage location 32 may be relocated in a storage recovery operation, which may comprise storing the data in a contextual format (data packet 810A) that is consistent with the modified logical interface 863C. The data packet 810A may comprise persistent metadata 814A that associates the data segment 812A with LID 9215. The forward map 160 may be updated to reference the data in the updated contextual format, which may comprise modifying the indirect entry of the LID 9215 to directly reference the data packet 810A rather than the reference entry. The entry corresponding to LID 9215 may revert from an indirect entry to a standard, local entry, and the reference entry for LID 1023 may be removed from the reference map 460.

Figure 8D:
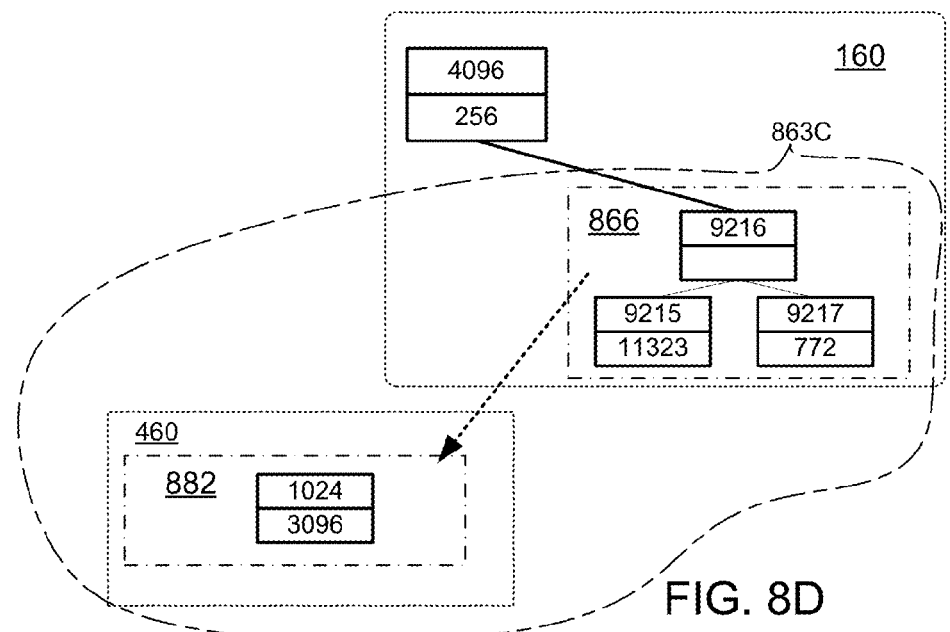

Referring to FIG. 8D, a storage client 106 may modify data associated with LID 9217, which may comprise storing a data segment out-of-place (e.g., at storage address 772). The data segment may be written in a contextual format that is consistent with the modified logical interface 863C (e.g., associates the data with LID 9217). In response, the forward map 160 may be updated to associate the entry for LID 9217 with the storage address of the data segment (e.g., storage address 772) and to remove the reference entry for LID 1025 from the reference map 460, as disclosed above.

Figure 8E:
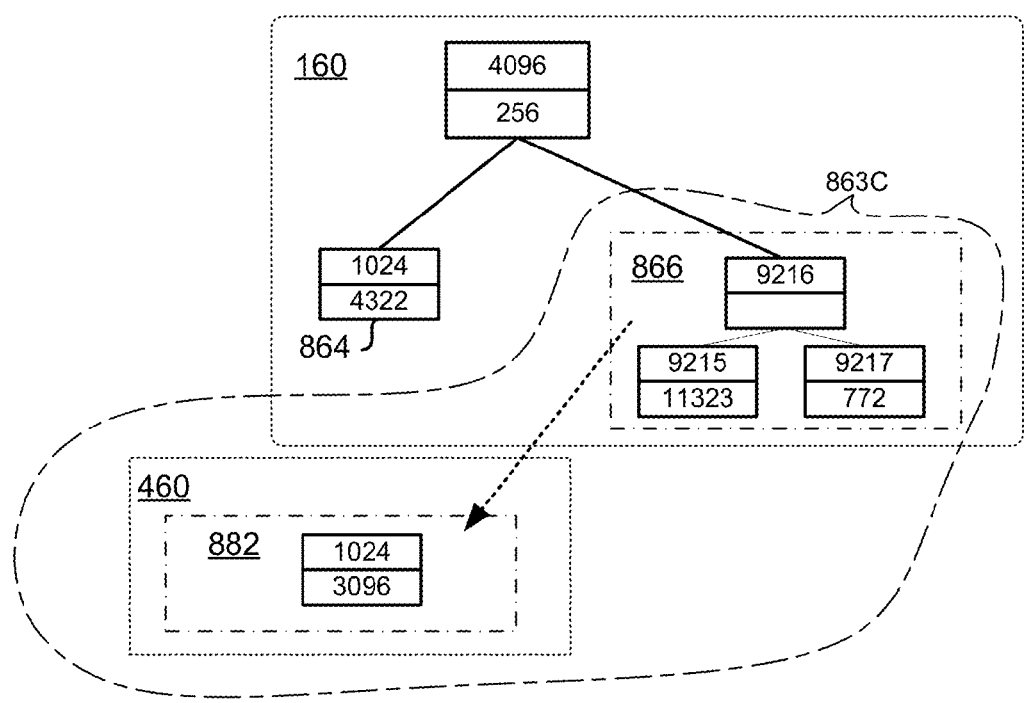

In some embodiments, the reference map 460 may be maintained separately from the forward map 160, such that the entries therein (e.g., entries 882) cannot be directly referenced by storage clients 106. This segregation may allow storage clients 106 to operate more efficiently. For example, rather than stalling operations until data is rewritten and/or relocated in the updated contextual format, data operations may proceed while the data is rewritten in one or more background processes. Referring to FIG. 8E, following the move operation disclosed above, a storage client 106 may store data in connection with the LID 1024. The reference entry 882 corresponding to the LID 1024 may be included in the reference map 460, due to, inter alia, the data at storage address 3096 not yet being rewritten in the updated contextual format. However, since the reference map 460 is maintained separately from the forward map 160, a name collision may not occur and the storage operation may complete. The forward map 160 may include a separate entry 864 comprising the logical interface for the data stored at media storage location 4322, while continuing to provide access to the data formerly bound to LID 1024 through the logical interface 863C (and reference map 460).

In the disclosed move operation, when the indirect entries are no longer linked to reference entries of the reference map 460 due to, inter alia, rewriting, relocating, modifying, deleting, and/or overwriting the corresponding data, the reference entries may be removed, and the indirect entries may revert to direct, local entries. In addition, the persistent note 366 associated with the move operation may be invalidated and/or removed from the storage medium 140, as disclosed above.

Referring back to FIG. 1A, the interface 131 of the storage layer 130 may be configured to provide APIs and/or interfaces for performing the storage operations disclosed herein. The APIs and/or interfaces may be exposed through one or more of the block interface, an extended storage interface, and/or the like. The block interface may be extended to include additional APIs and/or functionality by use of interface extensions, such as fadvise parameters, I/O control parameters, and the like. The interface 131 may provide APIs to perform range clone operations, range move operations, range merge operations, deduplication, snapshot, and other, higher-level operations disclosed herein. The interface 131 may allow storage clients 106 to apply attributes and/or metadata to LID ranges (e.g., freeze a range), manage range snapshots, and so on. As disclosed herein, a range clone operation comprises creating a logical copy of a set of one or more source LIDs. Range clone, move, and/or merge operations may be implemented using any of the embodiments disclosed herein including, but not limited to, the range clone embodiments depicted in FIGS. 3A-E, the reference entry embodiments of FIGS. 4A-E, and/or the intermediate mapping layer embodiments of FIGS. 5A-B.

The range clone, move, and/or merge operations disclosed herein may be used to implement higher-level operations, such as deduplication, snapshots, efficient file copy operations (logical file copies), file consistency management, address space management, mmap checkpoints, atomic writes, and the like. These higher-level operations may also be exposed through the interface 131 of the storage layer 130. The disclosed operations may be leveraged by various different storage clients 106, such as operations systems, file systems, data base services, and/or the like.

Figure 9A:
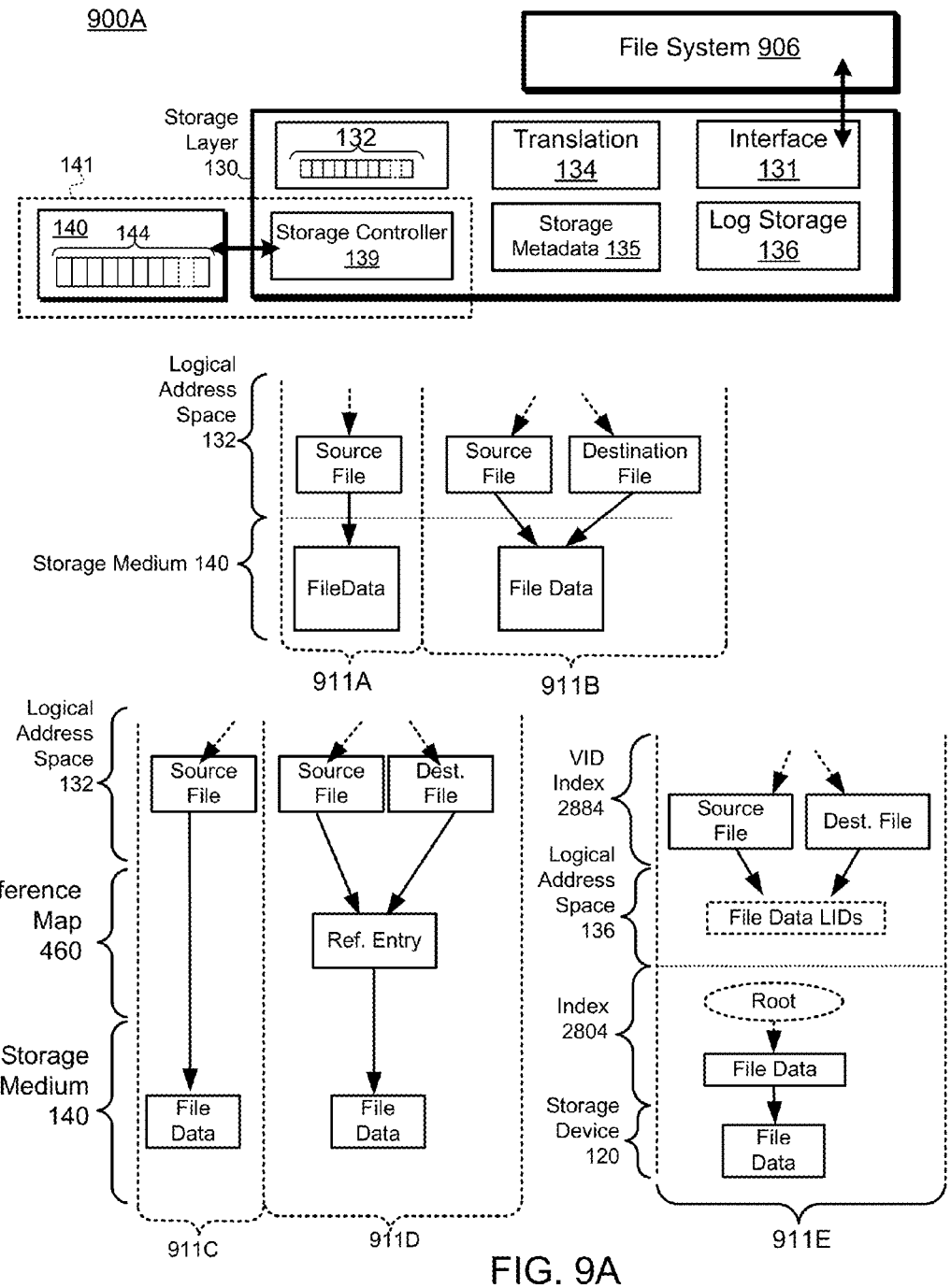
FIG. 9A is a block diagram of a system comprising a storage layer configured to implement efficient file management operations.

FIG. 9A depicts one embodiment of a system 900A comprising a storage layer 130 configured to implement file management operations. The system 900A may comprise a file system 906 that may be configured to leverage functionality of the storage layer 130 to reduce complexity, overhead, and the like. The file system 906 may be configured to leverage the range clone, move, move, snapshot, deduplication, and/or other functionality disclosed herein to implement efficient file-level snapshot and/or copy operations. The file system 906 may be configured to implement such operations in response to client requests (e.g., a copy command, a file snapshot ioctrl, or the like). The file system 906 may be configured to implement efficient file copy and/or file-level snapshot operations on a source file by, inter alia, a) flushing dirty pages of the source file (if any), b) creating a new destination file to represent the copied file and/or file-level snapshot, and c) instructing the storage module 130 to perform a range clone operation configured to clone the source file to the destination file.

FIG. 9A depicts various embodiments for implementing range clone operations for a file system 906. In some embodiments, and as depicted in state 911A, the storage layer 130 may be configured to maintain a logical address space 132 in which LIDs of the source file (the file to be cloned) are mapped to file data on the storage medium by use of the forward map 160. The corresponding range clone operation depicted in state 911B may comprise: a) allocating a set of LIDs for the destination file, and b) mapping the LIDs of the source file and the destination file to the file data on the storage medium 140. The range clone operation may further comprise storing a persistent note 366 on the storage medium 140 to indicate that the file data is associated with both the source file and destination file LIDs. The range clone operation may further comprise rewriting the file data in accordance with the updated contextual format, as disclosed herein.

In other embodiments, the storage layer 130 may leverage a reference map 460 to implement range clone operations (e.g., as disclosed in FIGS. 4A-E). Before the range clone operation, in state 911C, the LIDs of the source file may be directly mapped to the corresponding file data in the forward map 160. Creating the range clone in state 911D may comprise associating one or more reference entries in the reference map 460 with the file data, and linking indirect entries corresponding to the source file LIDs and the destination file LIDs to the reference entry. The range clone operation may further comprise storing a persistent note 366 on the storage medium 140 and/or updating the contextual format of the file data, as disclosed herein.

In some embodiments, the storage layer 130 may be configured to implement range clone operations using an intermediate layer mapping layer (e.g., as disclosed in FIGS. 5A-B). As indicated in state 911E, the source file may correspond to a set of VIDs of a VAS 532, which may be mapped to file data on the storage medium 140 through an intermediary address space (e.g., logical address space 132 of the storage layer 130). Performing the range clone operation may comprise: a) allocating VIDs in the VAS 532 for the destination file, and b) associating the VIS of the destination file with the LIDs of the intermediate mapping layer (e.g., the same set of LIDs mapped to the source file VIDs). The range clone operation may further comprise storing a persistent note 366 on the storage medium 140 indicating that the destination VIDs are associated with the file data LIDs. Since the file data is already bound to the intermediate identifiers, the contextual format of the file data may not need to be updated.

The file system 906 may be further configured to leverage the storage layer 130 to checkpoint mmap operations. As used herein, an "mmap" operation refers to an operation in which the contents of files are accessed as pages of memory through standard load and store operations rather than the standard read/write interfaces of the file system 906. An "msync" operation refers to an operation to flush the dirty pages of the file (if any) to the storage medium 140. The use of mmap operations may make file checkpointing difficult. File operations are performed in memory and an msync is issued when the state has to be saved. However, the state of the file after msync represents the current in-memory state and the last saved state may be lost. Therefore, if the file system 906 were to crash during an msync, the file could be left in an inconsistent state.

Figure 9B:
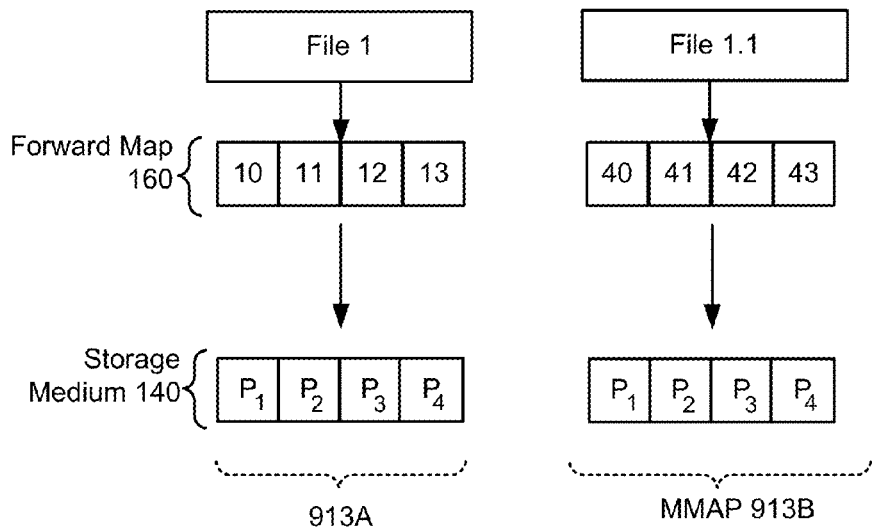
FIG. 9B depicts one embodiment of a storage layer configured to implement mmap checkpoints.
Figure 9B:
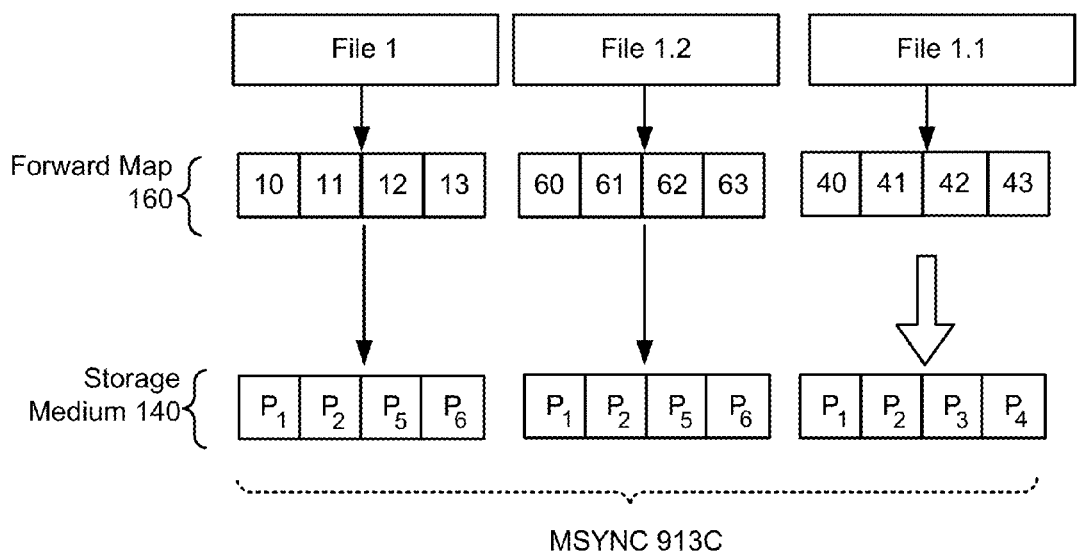

In some embodiments, the file system 906 is configured to checkpoint the state of an mmap-ed file during calls with msync. Checkpointing the file may comprise creating a file-level snapshot (and/or range clone), as disclosed above. The file-level snapshot may be configured to save the state of the file before the changes are applied. When the msync is issued, another clone may be created to reflect the changes applied in the msync operation. As depicted in FIG. 9B, in state 913A (prior to the mmap operation), file 1 may be associated with LIDs 10-13 and corresponding storage addresses P1-P4 on the storage medium 140. In response to the mmap operation, the file system 906 may perform a range clone operation through the interface 131 of the storage layer 130, which may comprise creating a clone of file 1 (denoted file 1.1). The file 1.1 may be associated with a different set of LIDs 40-43 that reference the same file data (e.g., the same storage addresses P1-P4). In other embodiments, file 1 may be cloned using a reference map 460 and/or an intermediate translation layer, as disclosed above.

In response to an msync call, the file system 906 may perform another range clone operation (by use of the storage layer 130). As illustrated in state 913C, the range clone operation associated with the msync operation may comprise updating the file 1 with the contents of one or more dirty pages (storage addresses P5 and P6) and cloning the updated file 1 as file 1.2. The file 1.1 may reflect the state of the file before the msync operation. Accordingly, in the event of a failure, the file system 906 may be capable of reconstructing the previous state of the file 1.

As disclosed above, storage layer 130 may be configured to implement range clone and range merge operations, which may be leveraged to implement higher-level operations such as file consistency (e.g., close-to-open file consistency, as disclosed in further detail herein), atomic operations, and the like. These operations may comprise: a) cloning a particular region of the logical address space 132, b) performing storage operations within the cloned region, and c) selectively merging and/or folding the cloned region into another portion of the logical address space 132. As used herein, merging and/or folding regions of the logical address space 132 refers to combining two or more LID ranges by, inter alia, incorporating changes implemented in one of the ranges into one or more other ranges. A merge operation may be implemented according to a merge policy, which may be configured to resolve conflicts between different LID ranges. The merge policy may include, but is not limited to, an "overwrite" mode, in which the contents of one of one LID range "overwrites" the contents of another LID range; an "OR" mode, in which the contents of the LID ranges are combined together (e.g., in a logical OR operation); a copy-on-conflict mode in which conflicts are resolved by creating separate independent copies of one or more LID ranges; and/or the like. In the overwrite mode, the LID range that overwrites the contents of the one or more other LID ranges may be determined based on any suitable criteria including, but not limited to, commit time (e.g., more recent operations overwrite earlier operations), priority, and/or the like.

Figure 9C:
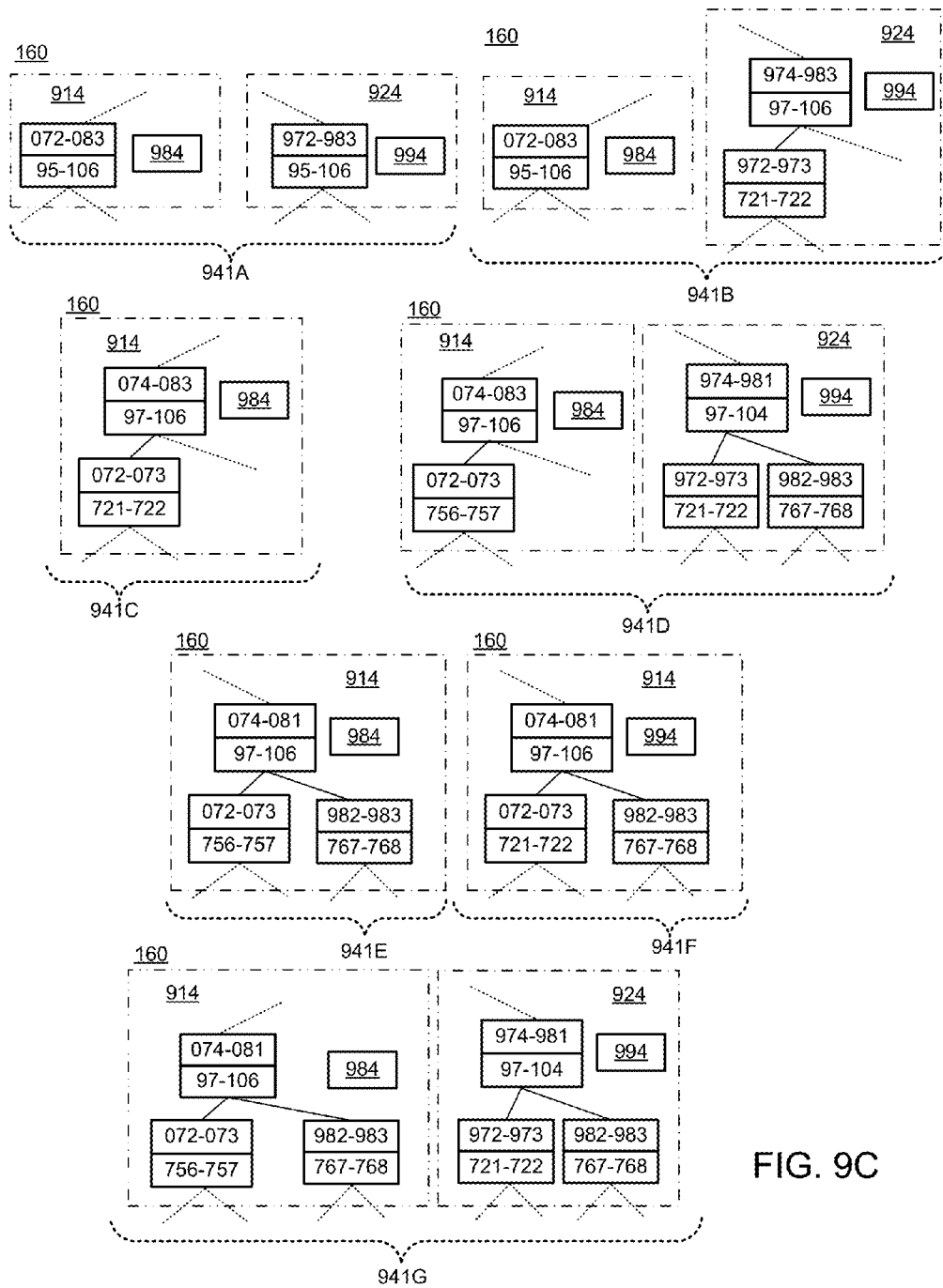
FIG. 9C depicts embodiments of range clone and range merge operations implemented by a storage layer.

FIG. 9C depicts embodiments of range merge operations implemented by use of the storage layer 130. In the FIG. 9C embodiment, the storage layer 130 may be configured to clone the identifier range 914, which may be represented by one or more entries within the forward map 160. The LIDs 072-083 within the range 914 may be bound to storage addresses 95-106. The range clone and/or merge operations disclosed herein may be implemented using any of the range clone and/or move embodiments of FIGS. 3A-E, the reference entry embodiments of FIGS. 4A-E, and/or the intermediate mapping layer embodiments of FIGS. 5A-B. Accordingly, in some embodiments, the LIDs 072-083 may be bound to the storage addresses 95-106 through one or more reference entries and/or intermediate mapping layers.

The storage layer 130 may be configured to clone the range 914, which, as illustrated at state 941A, may comprise binding a new range of LIDs 924 to the storage addresses 95-106. The ranges 914 and/or 924 may comprise respective metadata 984 and/or 994 configured to indicate that the ranges 914 and 924 are related (e.g., bound to the same set of storage addresses). The metadata 984 and/or 994 may be configured to link the LIDs 072-083 to 972-983 such that modifications pertaining to one of the LID ranges can be correlated to LIDs in the other range (e.g., data written in association with LID 972 can be associated with the corresponding LID 072, and so on). The metadata 984 and/or 994 may indicate a synchronization policy for the cloned LID ranges which, as disclosed above, may indicate whether allocation operations between clones are to be synchronized. The metadata 984 and/or 994 may further comprise and/or reference a merge policy, which may specify how merge conflicts are to be managed. The merge policy may be specified through the interface 131 of the storage layer 130, may be determined based on a global and/or default merge policy, may be specified through request parameters (e.g., fadvise, ioctrl, etc.), and/or the like. The clone operation may further comprise appending a persistent note 366 to the storage medium 140 that is configured to associate the data at storage addresses 95-106 with the LID range 972-983 (and/or rewriting the data in an updated contextual format), as disclosed above.

The storage layer 130 may perform storage operations within one or more of the ranges 914 and/or 924 in response to storage requests from one or more storage clients 106. As illustrated in state 941B, a storage operation may modify data associated with the LIDs 972-973, which may comprise associating the identifiers 972-973 with a new set of storage addresses 721-722. Following the storage operation(s) of state 941B, the storage layer 130 may perform a range merge operation to merge the LID range 972-983 with the range 072-083. The range merge operation may comprise incorporating the modifications made in reference to the LID range 924 into the LID range 914 in accordance with a merge policy. The merge policy may specify that modifications made in the cloned range 924 overwrite data within the source range 914. Accordingly, the result of the merge operation illustrated in state 941C may comprise binding LIDs 072-073 of the source range 914 to the modified data at storage addresses 721-722. The range merge operation may further comprise deallocating the cloned LID range 972-983, storing a persistent note 366 configured to associate the data at storage addresses 756-757 with LIDs 072-073, and/or rewriting the data at storage addresses 721-722 in an updated contextual format, as disclosed herein. Data stored at storage addresses 95-96 that has been obviated by the new data at 721-722 may be invalidated, as disclosed above.

Storage operations performed within the ranges 914 and/or 924 may result in conflicts. In some embodiments, the merge policy associated with the LID ranges may preempt conflicts. As disclosed in further detail herein, in an atomic storage operation, the storage layer 130 may lock one or more LID ranges while atomic storage operations are completed in one or more corresponding ranges. In other implementations, however, the storage layer 130 may allow storage operations to be performed concurrently within cloned ranges. In state 941D, the storage layer 130 may implement storage operation(s) configured to overwrite and/or modify data associated with the LIDs 972-973 and 982-983 in the range 924. The storage layer 130 may implement other storage operation(s) configured to overwrite and/or modify data associated with LIDs 072-073 of range 914. The storage operation(s) pertaining to the LIDs 072-073 and 972-973 may create a merge conflict between the ranges 914 and 924. The merge conflict may be resolved according to a merge policy, as disclosed above. In some embodiments, the merge policy may comprise applying the most recent modification, based on, inter alia, the relative order of the storage operations in the storage log. In other implementations, the merge policy may resolve conflicts based on relative priority of the storage clients 106 (processes, applications, and/or the like) that requested the respective storage operations. In another implementation, the merge policy may resolve conflicts by creating two (or more) versions of the ranges 914 and/or 924 to represent the different, conflicting versions.

State 941E depicts one embodiment of a result of a merge operation configured to incorporate the operations operation(s) associated with LIDs 072-073 instead of the conflicting modifications associated with LIDs 972-973. Therefore, in state 941E, the LIDs 072-073 are bound to the storage addresses 756-757 corresponding to the storage operation(s) performed in reference to the LIDs 072-073, rather than storage addresses 721-722 corresponding to the storage operation(s) performed in reference to the LIDs 972-973.

State 941F depicts one embodiment of a result of a merge operation configured to incorporate the modifications of the range 972-973 instead of the conflicting modifications made in reference to the LIDs 072-073. Accordingly, in state 941F, the identifiers 072-073 are bound to the storage addresses 721-722 corresponding to the storage operation(s) performed in reference to the LIDs 972-973, rather than the storage addresses 756-757 associated with the LIDs 072-073.

State 941G depicts one embodiment of a result of a merge operation configured to manage merge conflicts by creating separate range copies or versions. The range 914 may incorporate the non-conflicting modifications made in reference to identifiers 982-983 and may retain the result of the conflicting storage operations pertaining to identifiers 072-073 (rather than incorporating storage addresses 721-722). The other LID range 924 may retain the modifications of state 941D without incorporating the results of the conflicting storage operation(s) made in reference to identifiers 072-073. Although state 941G depicts the copies using the original cloned LID ranges 072-083 914 and 974-981 924, the disclosure is not limited in this regard and could be configured to create the range copies and/or versions within any region of the logical address space 132. The range merge operations disclosed in reference to states 941E-G may further comprise appending one or more persistent notes 366 to the storage medium 140 to associate the data stored at storage addresses 721-722, 756-757, and/or 767-768 with the corresponding LIDs and/or rewriting the data in one or more background storage operations, as disclosed herein.

In some embodiments, operations within one or more of the cloned LID ranges 914 and/or 924 may comprise modifying the LID ranges 914 and/or 924 by, inter alia, expanding the ranges 914 and/or 924, contracting the ranges 914 and/or 924, or the like. Extending one of the ranges 914 and/or 924 may comprise a corresponding extension to the other range, and, as such, allocation operations may be predicated on allocating additional LID(s) in both ranges 914 and 924.

Figure 9D:
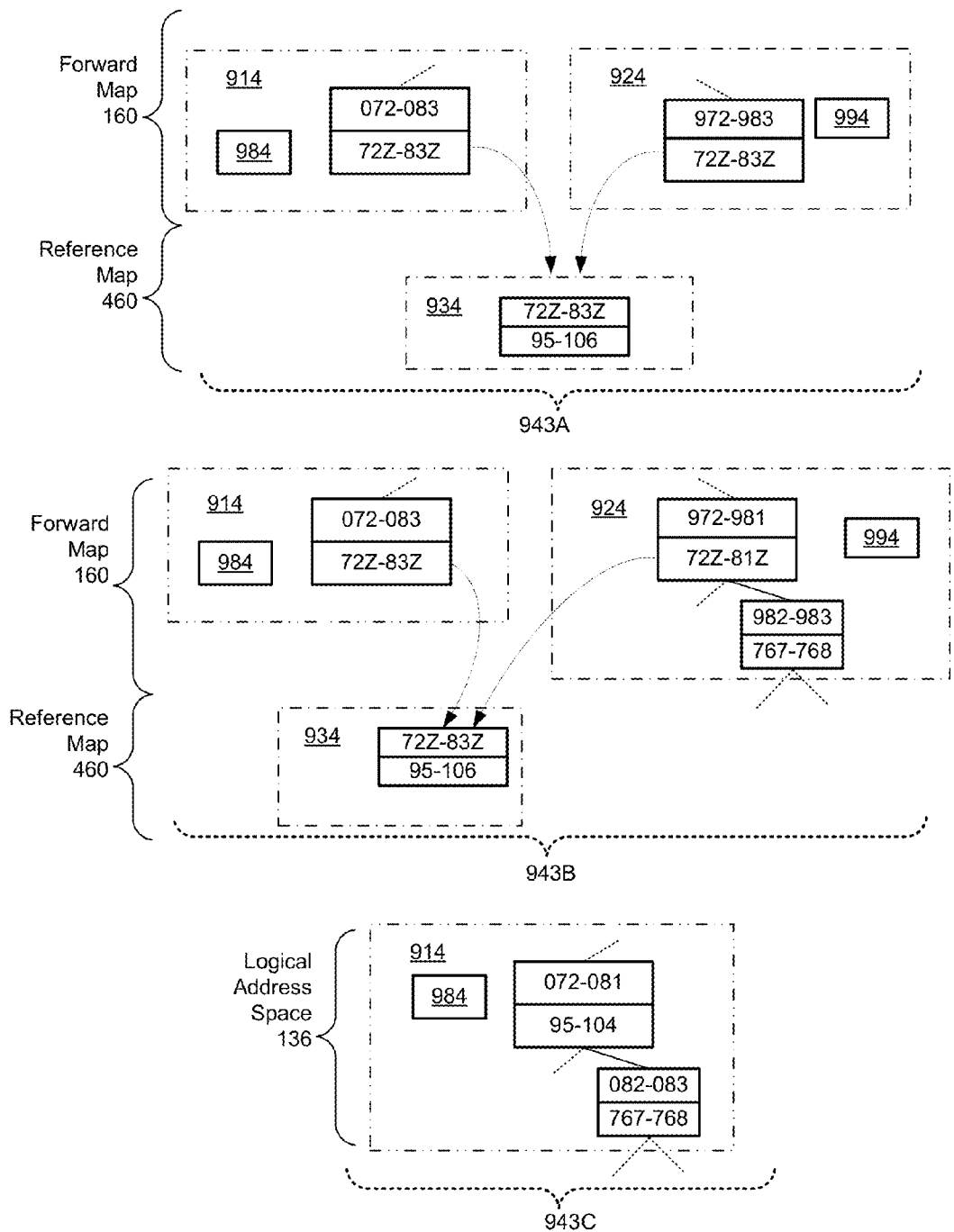
FIG. 9D depicts further embodiments of range clone and range merge operations.

The range merge operations disclosed herein may be implemented using any of the range clone and/or move embodiments of FIGS. 3A-E, the reference entry embodiments of FIGS. 4A-E, and/or the intermediate mapping embodiments of FIGS. 5A-B. FIG. 9D depicts an embodiment of a range merge operation using a reference map 460. As depicted in state 943A, cloning the range 914 may comprise allocating a LID range 924 in the logical address space 132, linking the ranges 914 and 924 (using, inter alia, metadata 984 and/or 994), and associating the ranges 914 and 924 with the reference identifiers 934 in the reference map 460. The range clone operation may further comprise storing a persistent note 366 on the storage medium 140 configured to associate the range 934 in the reference map 460 with the indirect ranges 914 and/or 924, as disclosed above. The range 934 within the reference map 460 may be bound to the storage addresses 95-106. Accordingly, both ranges 914 and 924 may indirectly reference the same data at the same storage addresses.

A storage operation within the range 924 configured to modify data corresponding to LIDs 982-983 may comprise allocating new LIDs within the range 924 and binding the new local entry 982-983 to the corresponding storage addresses 767-768, as depicted in state 943B. Merging the ranges 914 and 924 may comprise incorporating the modified data at storage addresses 767-768 into the range 914 in accordance with a merge policy, as disclosed above. In the FIG. 9D embodiment, the range merge operation of state 943C may comprise removing the reference entry 934 and updating the LIDs 081-083 of range 914 to reference the updated data at storage addresses 767-768. The merge operation may further comprise storing a persistent note 366 and/or rewriting the data at storage addresses 767-768 in an updated contextual format, as disclosed above.

Figure 9E:
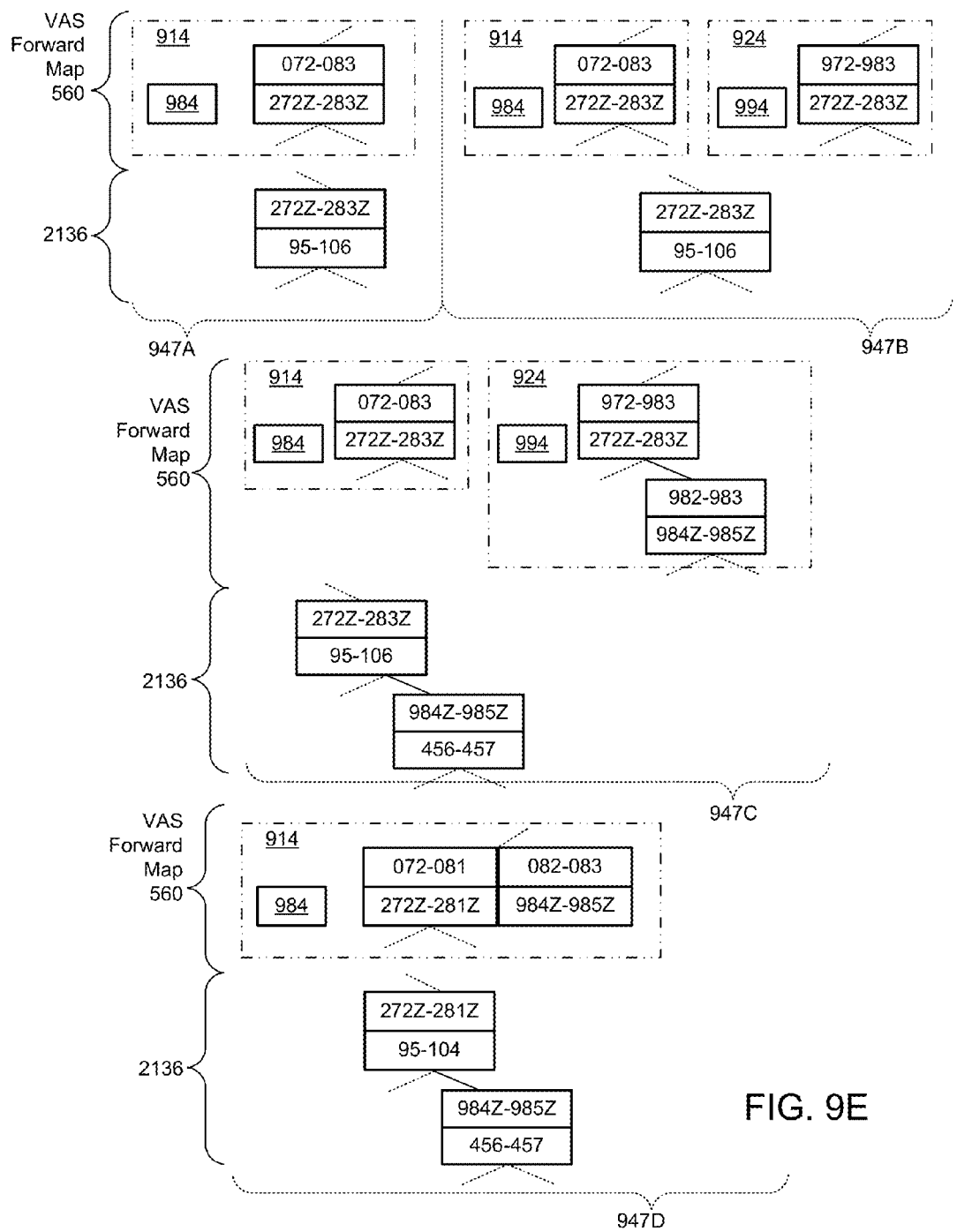
FIG. 9E depicts further embodiments of range clone and range merge operations.

FIG. 9E depicts further embodiments of range clone and range merge operations implemented by the storage layer 130. FIG. 9E illustrates range clone and range merge operations in embodiments comprising an intermediary address space, as disclosed in conjunction with FIGS. 5A-B. In state 947A, the VID range 914 comprising VIDs 072-083 are indirectly bound to storage addresses 95-106 through intermediary identifiers 272Z-283Z in the VAS forward map 560. The intermediary identifiers may be part of a separate, intermediate address space 2136 (e.g., the logical address space 132 of the storage layer 130).

As illustrated in state 947B, cloning the VID range 914 may comprise allocating a new VID range 924 comprising VIDs 972-983 and associating the range 924 with the intermediary identifiers 272Z-283Z in the VAS forward map 560. The clone operation may further comprise storing a persistent note 366 on the storage medium 140 that is configured to associate the VID range 924 with the intermediary addresses 272Z-283Z. Storage operations may be performed in reference to the VID ranges 914 and/or 924, as disclosed herein. Modifications to the VID ranges 914 and/or 924 may be reflected in updated mappings between the respective VID ranges 914 and/or 924 and the intermediate address space 2136. In state 947C, a storage operation modifying data of VIDs 982-983 is reflected in updated mappings between VIDs 982-983 and intermediate identifiers 984Z-985Z, and storage addresses 456-457. Merging the VID ranges 914 and 924 may comprise updating the VID mappings of range 914 to reference the updated data (through the intermediary addresses 984Z-985Z), as illustrated in state 947D. The merge operation may further comprise resolving merge conflicts (if any), as disclosed above. The merge operation may further comprise appending one or more persistent notes 366 to the storage medium 140 to associate the VIDs 082-083 with the intermediate addresses 984Z-985Z.

Figure 9F:
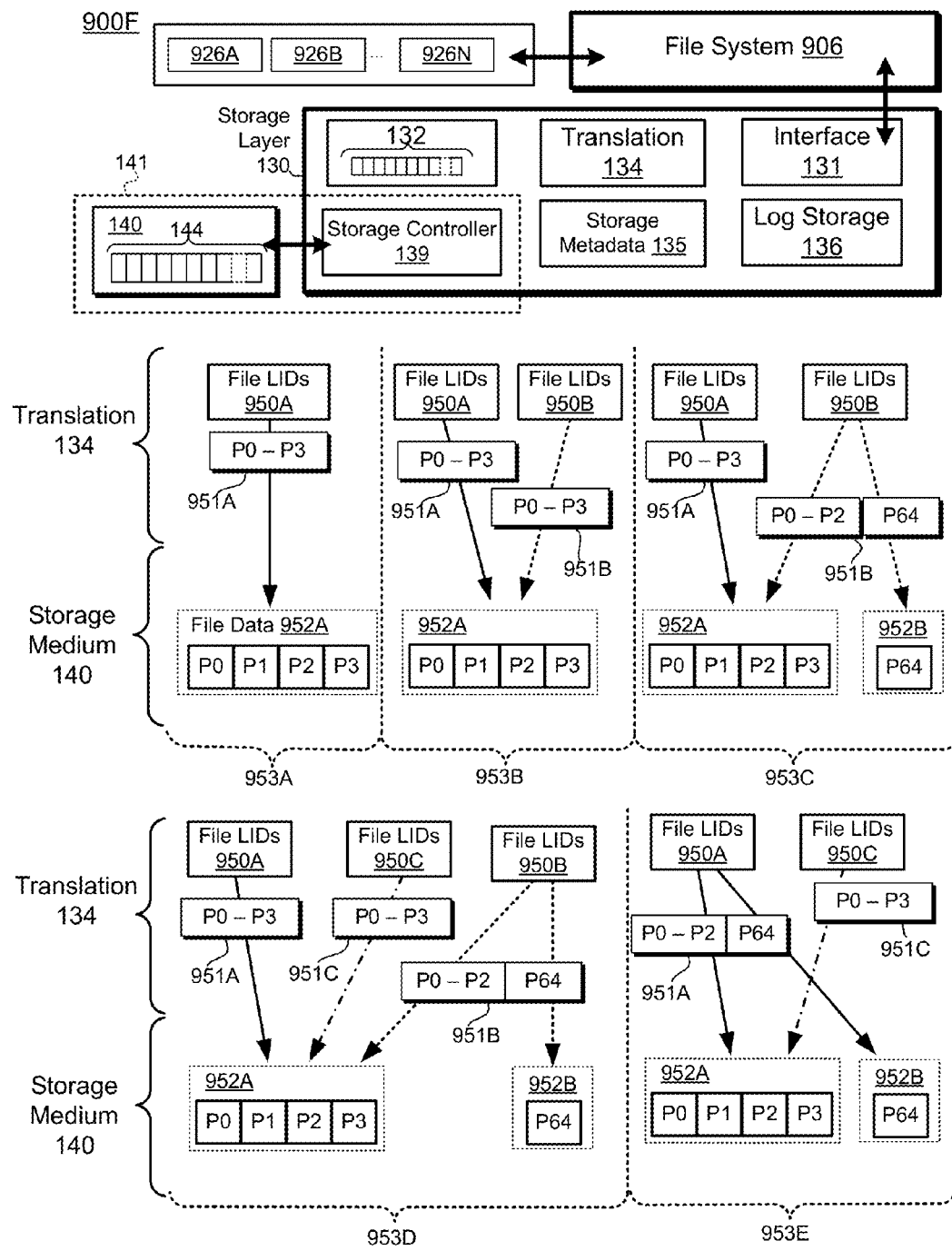
FIG. 9F is a block diagram of one embodiment of a system comprising a storage layer configured to implement efficient open-to-close file consistency.

In some embodiments, the storage layer 130 may leverage the range clone, move, and/or merge operations disclosed herein to provide file consistency functionality for storage clients 106, such as file systems, databases, and/or the like. Referring to FIG. 9F, a file system 906 may leverage the storage layer 130 to implement a close-to-open file consistency model per the Network File System (NFS) version 3 protocol and/or other file system implementations and/or protocols. The close-to-open file consistency model may be configured to allow multiple processes and/or applications (file system clients) to operate on the same file concurrently. File modifications are committed at the time the file is closed; other clients operating on the file in parallel do not see the changes until the next time the file is opened. Accordingly, the state of the file is set at the time the file is opened and changes implemented in parallel by other clients are not applied until the file is re-opened.

In some embodiments, the file system 906 may leverage the storage layer 130 to preserve the "original" data of the file (e.g., a consistent version of the file) while modifications are made within the working, cloned range. As used herein, preserving the "original" data of the file and/or a consistent version of the file refers to maintaining the file data in a state corresponding to the time the file was opened and/or keeping a log of file modifications from which the state of the file data in its original, unmodified state can be reconstructed.

FIG. 9F depicts one embodiment of a system 900F comprising storage layer 130 configured to implement a close-to-open file consistency model. The file system 906 (and/or other storage client(s) 106) may leverage the storage layer 130 to efficiently implement close-to-open file consistency. The storage layer 130 may be configured to: a) clone files in response to file open requests of the file system clients 926A-N, resulting in a "primary" or "consistent" version of the file and a "working" version of the file; b) perform storage operations in reference to the working version of the file; and c) merge the working version of the file into the primary version of the file in response to file closure. The storage layer 130 may be configured to clone the file data in one or more range clone operations, as disclosed herein (e.g., using the range clone embodiments of FIGS. 3A-E, 4A-E, 5A-B, and/or the like). The storage layer 130 may be further configured to merge the working version of the file and the primary or consistent version of the file using one or more range merge and/or fold operations, as disclosed herein. The working version of the file may represent the state of the file at the time the file was opened by a particular storage client 926A-N. The storage client 926A-N may have exclusive access to the working version of the file, and, as such, the working version of the file may be isolated from file modifications made by other clients 926A-N. The storage layer 130 may be configured to maintain the original, unmodified file data in reference to the "primary" or "consistent" logical interface of the file, which may comprise maintaining the associations between the file data and the consistent logical interface while storage operations are performed in reference to the working logical interface of the file. Conflicts between file modifications made by different storage clients 926A-N may be resolved according to conflict resolution policy or merge policy, such as last write (e.g., last write in time overwrites previous writes); copy on conflict (e.g., create separate versions of the file); priority based on client 926A-N, application, process, and/or the like; and so on.

In the FIG. 9F embodiment, at state 953A, the translation module 134 comprises mappings 951A between the LIDs of a file (file LIDs 950A) and data of the file 952A on the storage medium 140 at storage addresses P0-P3. The mappings 951A may be implemented using the forward map 160 disclosed herein and/or one or more intermediate mapping layers as disclosed in conjunction with FIGS. 5A-B.

In state 953B, the storage layer 130 may be configured to clone the file in response to a file open request of a storage client (storage client 926B). The request may be received through the interface 131 as an explicit request, a request parameter (e.g., fadvise, ioctrl, etc.), and/or the like. The clone operation may comprise one or more range clone operations, which, as disclosed herein, may comprise allocating a new set of "cloned" file LIDs 950B corresponding to the working version file and associating the set of cloned identifiers 950B with the same file data 952A as the LIDs 950A of the primary version of the file (the original, or consistent set of logical identifiers 950A). The range clone operation may further comprise storing a persistent note 366 on the storage medium 140 to associate the file data 952A with both the primary file LIDs 950A and the working version of the file LIDs 950B, as disclosed above.

In some embodiments, the storage layer 130 and/or file system 906 may be configured to direct file operations performed by the storage client 926B to the working version of the file (the working set of LIDs 950B). Accordingly, modifications made by the storage client 926B may be made in reference to the cloned file LIDs 950B. Such modifications may not affect the state of the original, primary version of the file LIDs 950A. Therefore, the storage client 926B may modify the working version of the file in reference to the LIDs 950B without changing the LIDs 950A of the original, primary version of the file.

In state 953C, the storage client 926B has performed a storage operation (through the storage layer 130) to modify data of the file stored at storage address P3; the modified data may be appended to the storage log at storage address P64. In response, the translation module 134 may update mappings 951B to bind the LIDs of the cloned, working version of the file 950B to the modified file data 952B at storage address P64. Other LID(s) not modified by the storage client 926B may continue to be bound to the original, unmodified file data 952A. The storage layer 130 is configured to preserve the original mappings 951A between the identifiers 950A of the primary version of the file and the unmodified file data 952A at storage addresses P0-3.

Another storage client 926N may issue a request to open the file before the storage client 926B has closed the file. In response, and as depicted in state 953D, the storage layer 130 may create another clone of the primary file (clone the primary file identifiers 950A). The cloned LIDs (FIDs 950C) may correspond to the original state of the file without the modifications made by storage client 926B in reference to the cloned identifier range 950B. Accordingly, the cloned LIDs 950C may be mapped 951C to the original, unmodified file data 952A at storage addresses P0-3. The storage client 926N may perform storage operations in reference to the new cloned file identifier range 950C in parallel with the storage client 926B. Changes made by the clients 926B and 926N may be isolated within their respective LID ranges 950B and 950C, and, as such, may not be applied to the primary version of the file (LIDs 950A and/or one another).

State 953E illustrates the result of the storage client 926B closing the file. In response to a request to close the file of storage client 926B, the storage layer 130 may be configured to merge the contents of the corresponding range (FIDs 950B) into the primary version of the file (LIDs 950A) in one or more range merge operations. The changes may not, however, be merged into the version of the file in use by storage client 926N (FIDs 950C); the storage client 926N may not have access to the modifications until the client 926N re-opens the file. Incorporating the modifications may comprise one or more range merge operations, as disclosed herein. The range merge operations may be configured to merge the modifications made in reference to the cloned LID range 950B into the LID range 950A of the primary version of the file. In the FIG. 9F embodiment, the range merge operation comprises updating the mappings 951A of the primary file LIDs 950A to reference the modified file data 952B at storage address P64. The data that was not modified by the client 924B may remain bound to the original, unmodified file data 952A at P0-3.

As disclosed herein, in some embodiments, the modified file data 952B may include persistent metadata configured to associate the modified file data 952B at storage address P64 with one or more of the LIDs 950B (as opposed to the LIDs 950A associated with the primary version of the file). The range merge operation may, therefore, further comprise appending a persistent note 366 to the storage medium 140 configured to associate one or more of the range of LIDs 950A with the modified file data 952B at storage address P64. The data at storage address P64 may be rewritten with updated persistent metadata in one or more background operations. Following the file close operation (and corresponding range merge operations), the translation module 134 may be configured to deallocate the LIDs of range 950B.

Figure 9G:
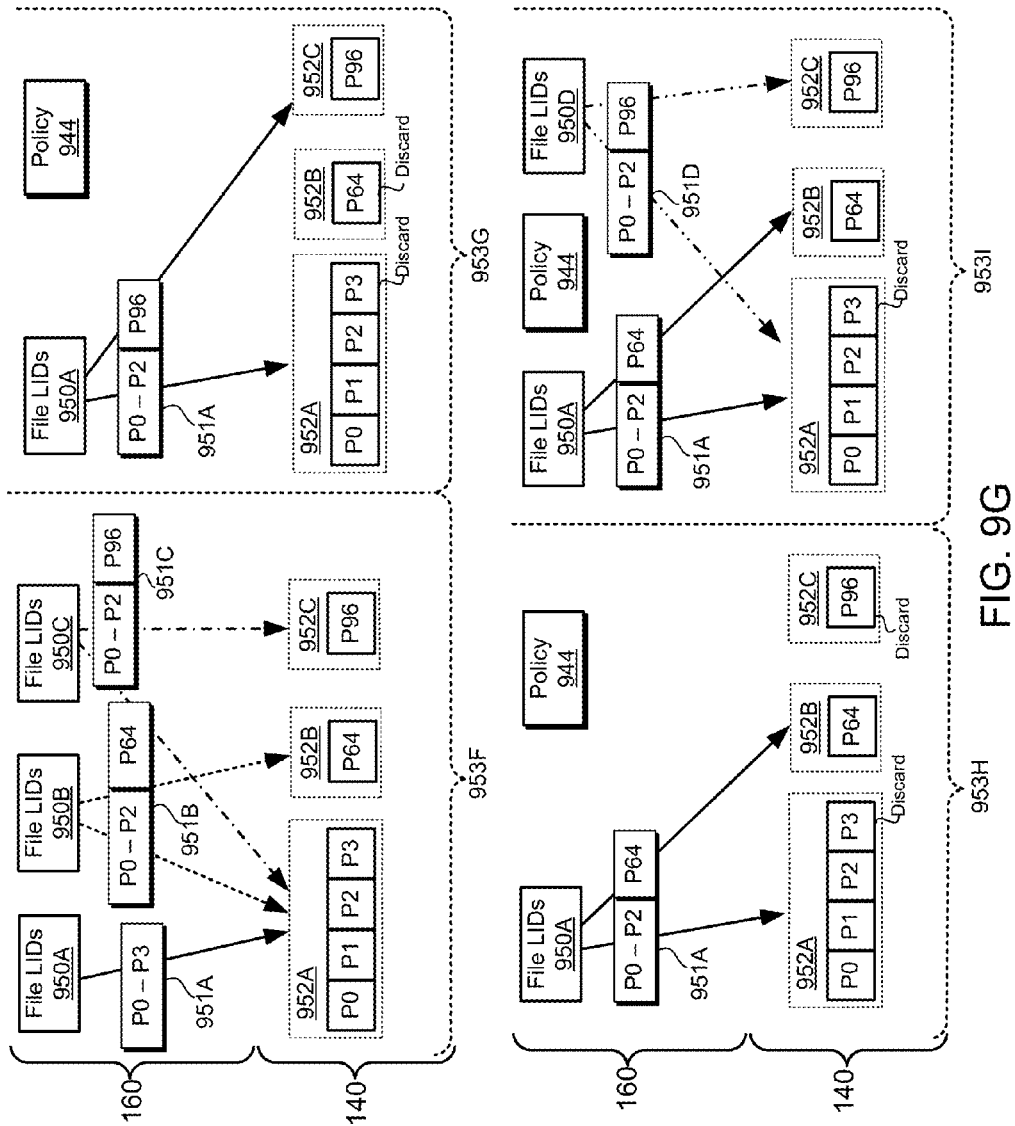
FIG. 9G depicts further embodiments of close-to-open file consistency.

The client 926N may modify the file in reference to the cloned file identifiers 950C. As depicted in state 953F of FIG. 9G, the storage client 926N may perform one or more operations that conflict with the modifications implemented by the client 926B. The modifications may occur before the client 950B has closed the file (before the modifications of client 926B have been applied to the LIDs 950A of the primary version of the file as in state 953E). As such, the LIDs 950A are mapped 951A to the original, unmodified file data 952A, one or more of the identifiers of the range 950B allocated to storage client 926B are mapped to modified file data 952B, and one or more of the identifiers of range 950C allocated to storage client 926N are mapped to conflicting file data 952C. The LIDs 950B and 950C that correspond to unmodified data may continue to reference the original, unmodified file data 952A.

The clients 926B and 926C may eventually close their respective files, which may comprise merging the modifications made in reference to the respective LID ranges 950B and 950C into the range 950A of the primary version of the file. The storage layer 130 may be configured to resolve conflicts between the ranges 950B and 950C according to a merge policy 944. In some embodiments, the merge policy 944 may be based on the order in which the storage clients 926B and 926C closed the files; the modifications of the last file closed may overwrite previously applied modifications (e.g., the modifications may be serialized). As illustrated in state 953G, the storage client 950B may issue the file close request before the storage client 950C. After the client 950B closes the file, the storage layer 130 may merge modifications made in reference to the range 950B into the range 950A of the primary version of the file (as illustrated, in state 953E of FIG. 9F). Closure of the file by client 926C may result in overwriting some of the modifications made by storage client 950B (modified data 952B) with data 952C, as illustrated in state 953G of FIG. 9G. The data at P3 and P64 may be marked for removal from the storage medium 140 since it is no longer referenced by the primary file or a current, working version of the file. As disclosed above, the storage layer 130 may be configured to implement other merge policies, such as a priority based merge policy 944. A priority based merge policy may resolve conflicts based on relative priorities of the storage clients 926B and/or 926C. In state 953H, the storage client 926C may close the file after the storage client 926B; however, the modifications of storage client 926B may be retained due to the merge policy 944 indicating that the modifications of storage client 926B have a higher priority than conflicting modifications of storage client 926C. Accordingly, the LIDs 950A of the primary version of the file may continue to reference the modified file data 952B of storage client 926B, and the conflicting file data of storage client 926C (data 952C at P96) may be marked for garbage collection along with the obsolete file data 952A at P3. In other embodiments, the merge policy 944 may comprise a copy-on-conflict policy that results in creating two primary versions of the file. In such embodiments, and as illustrated in state 953I, the storage layer 130 may be configured to incorporate the modifications of storage client 926B into the primary file (using primary file LIDs 950A), and may incorporate the conflicting modifications of storage client 926C into a new version of the file (file identifiers 950D).

Although particular embodiments of a merge policy 944 are disclosed herein, the disclosure is not limited in this regard and could implement and/or incorporate any suitable merge policy 944. The merge policy 944 may be implemented within the storage layer 130 and/or file system 906. In some embodiments, the merge policy 944 of the storage layer 130 and/or file system 906 may be configured through the interface 131 of the storage layer 130. The merge policy 944 may apply to all file operations performed through the storage layer 130. Alternatively, or in addition, the merge policy 944 may be set on a per-file and/or per-conflict basis through, inter alia, file system API calls, fadvise, ioctrl, and/or the like, as disclosed above.

The storage layer 130 may be further configured to provide key-value storage services. As used herein, "key-value storage services" refers to key-value based data storage and retrieval, in which particular data (values) are stored in association with respective keys. Key-value storage services may, therefore, refer to a schema-less, key-value based data paradigm for data storage and retrieval.

Figure 10A:
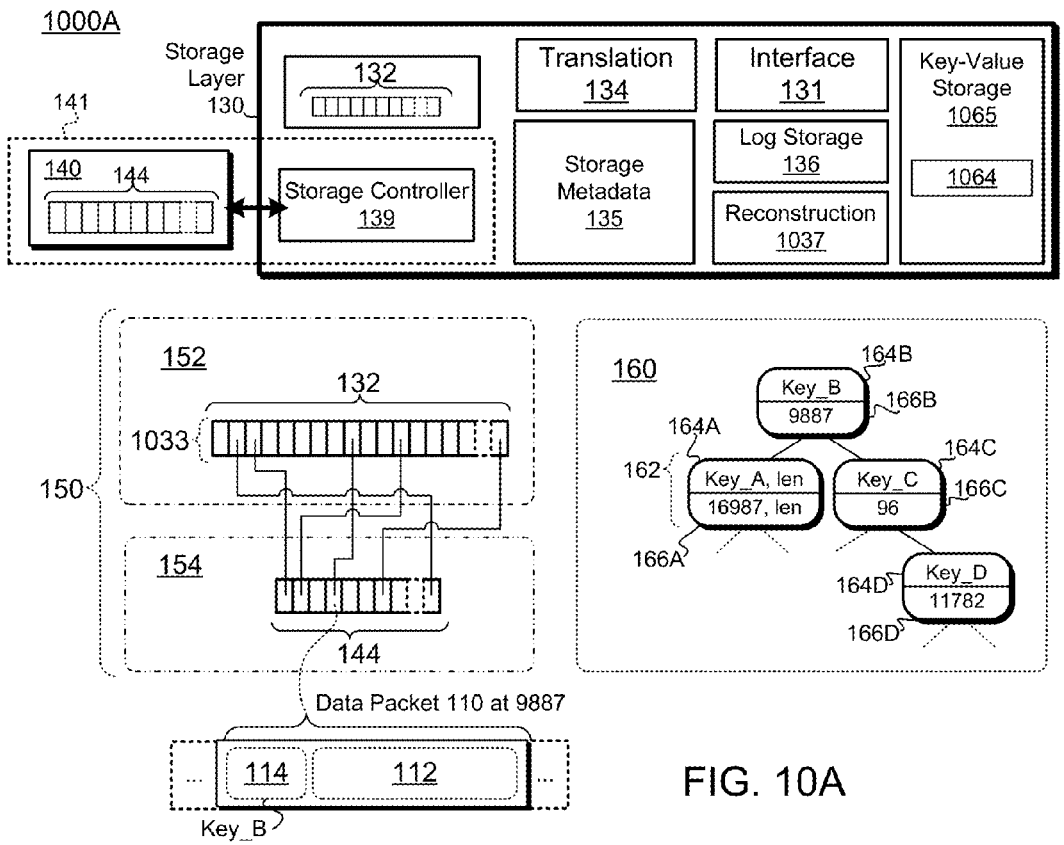
FIG. 10A depicts one embodiment of a system comprising a storage layer configured to manage key-value storage operations.

FIG. 10A is a block diagram of one embodiment of a system 1000A comprising a storage layer 130 configured to manage key-storage operations by use of, inter alia, a key-value storage module 1065. The key translation module 1064 is configured to map keys to data stored on the storage medium 140. In some embodiments, the key-value translation module 1064 implements key-value translations by use of the logical address space 132 and forward map 160. The identifiers of the logical address space 132 may be used as a "key namespace," in which the identifiers correspond to keys of the key-value pairs. The logical address space 132 may, therefore, comprise a collection of arbitrary key values. The forward map 160 may be configured to index keys of the logical address space 132 to storage locations within the storage address space 144, as disclosed herein. The log storage module 136 may be configured to store data with persistent metadata 114 corresponding to the key associated with the data. Accordingly, the storage layer 130 may be configured to maintain associations between keys and data; the storage layer 130 may be configured to map, bind, tie, assign, associate, connect, and/or link keys to data stored on the non-volatile storage medium 140.

As illustrated in FIG. 10A, the forward map 160 may comprise entries 162 configured to map identifiers (e.g., Key_A 164A, Key_B 164B, Key_C 164C, and Key_D 164D) to respective storage addresses within the storage log on the storage medium 140. The keys may be mapped to values (e.g., data segments) of any suitable size and/or length. The size and/or length of the value of a key-value pair may be maintained within the storage metadata 135 (e.g., the forward map 160, as illustrated in FIG. 10A).

The key-value storage module 1065 may be configured to manage key-value storage operations. In some embodiments, the key-value storage module 1065 comprises a key translation module 1064, which may be configured to generate identifiers for use in key-value storage operations. In some embodiments, the key translation module 1064 may generate keys derived from a name, a qualified name, a data segment, and/or the like. Keys may be generated using any suitable mechanism, including, but not limited to, a hashing function, a multi-level hashing function, a signature, a cryptographical signature, a naming function, a cyclic redundancy check (CRC) function and/or the like. Alternatively, or in addition, keys may be provided by an external entity, such as a storage client 106 (e.g., operating system, file system, database, application, user, etc.).

Implementing key-value pair storage operations may comprise: a) allocating keys within the logical address space 132; b) storing the corresponding data (values) on the storage medium 140; and c) binding keys to the corresponding data by use of, inter alia, the storage metadata 135 (e.g., forward map 160). As disclosed herein, data may be stored in a contextual format and/or in association with persistent metadata configured to, inter alia, define the logical interface of the data. The logical interface of the data may comprise and/or reference the keys bound to the data in a key-value pair. In the FIG. 10A embodiment, the value (data segment 112) corresponding to the Key_B may be stored in a data packet 110 at storage address 9887. The data packet 110 may include the data segment 112 (value) and persistent metadata 114, as disclosed above. The persistent metadata 114 may comprise and/or reference the logical interface of the data segment 112, which in the FIG. 10A embodiment is Key_B.

In some embodiments, the key-value storage module 1065 comprises a key translation module 1064, which may be configured to generate key values in response to requests from storage clients 106. The key values may be generated using any suitable mechanism, including, but not limited to, a hashing algorithm, a multi-level hashing algorithm (e.g., Cuckoo hashing), and/or the like. Alternatively, or in addition, key values may be generated by external entities, such as storage clients 106.

The key-value storage module 1065 may be configured to manage key collisions using, inter alia, range move functionality, as disclosed herein. As used herein, a "key collision" refers to a naming conflict in a front-end namespace, such as the logical address space 132. A key collision may occur in response to a request to store different values (e.g., different data segments) in association with the same key. A key collision may occur, for example, in hashing systems when different names and/or data resolve to the same key. The key-value storage module 1065 may detect key collisions in response to storage and/or allocation requests pertaining to keys that already exist (e.g., are already allocated) in the logical address space 132. Alternatively, or in addition, key collisions may be detected by the key translation module 1064 in response to generating a key that collides within an existing key in the logical address space 132.

In some embodiments, the key-value storage module 1065 may be configured to resolve key conflicts by moving key-value pairs. Moving a key-value pair may comprise modifying the logical interface of data stored on the storage medium 140, as disclosed herein. Accordingly, moving a key-value pair may comprise any of: the range move embodiments of FIGS. 3A-E; the reference entry embodiments of FIGS. 4A-E; and/or the intermediate mapping layer embodiments of FIGS. 5A-B. The key translation module 1064 may be further configured to resolve key conflicts by implementing a multi-level lookup. When a key-value pair is moved to a different, alternative key, the key translation module 1064 may be configured to link the different, alternative key to the original key. Accordingly, the key-value pair may be accessed through either the original key or the different, alternative key. Alternatively, the key translation module 1064 may associate the key-value pair with only the different, alternative key, such that the key-value pair can no longer be referenced through the original key. Modifying the logical interface of a key-value pair may further comprise re-indexing and/or re-mapping the key-value pair by use of the different, alternative key and/or informing one or more storage clients 106 (and/or other entities) of the change to the key-value pair (e.g., providing the storage clients 106 with the different, alternative key for the key-value pair). The modified logical interface of the key-value pair may be communicated using an API, callback function, publication interface, and/or the like.

Figure 10B:
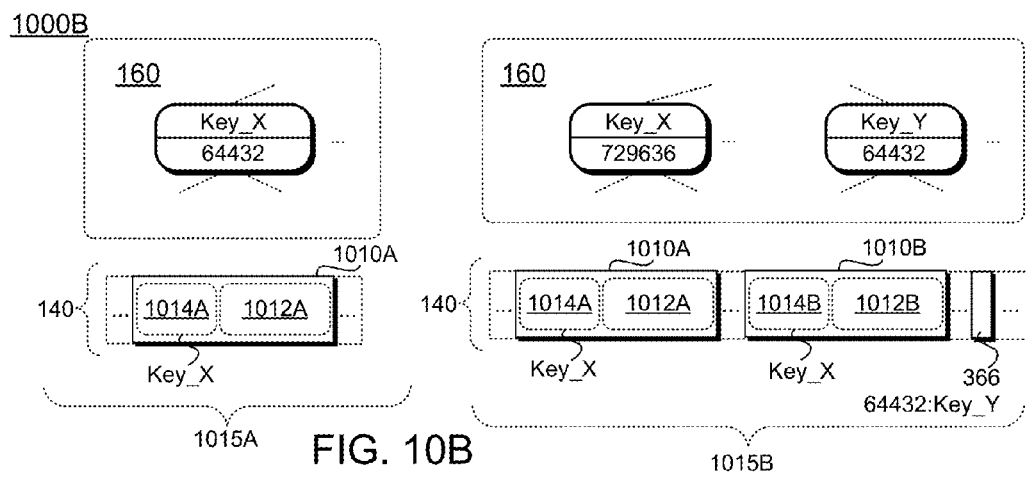
FIG. 10B depicts embodiments of key-value storage operations.

FIG. 10B depicts one embodiment of a key conflict management operation 1000B implemented by the storage layer 130. In state 1015A, the storage layer 130 may be configured to store a key-value pair on the storage medium 140 by use of, inter alia, the key-value storage module 1065. The key-value pair may comprise Key_X and data segment 1012A. The data segment 1012A may be stored on the storage medium 140 by use of, inter alia, the log storage module 136. The data segment 1012A may be appended to the storage log in a contextual format that is configured to associate persistent metadata 1014A with the data segment 1012A. The persistent metadata 1014A may include and/or reference the key corresponding to the data segment 1012A (Key_X). The key translation module 1064 may be configured to assign Key_X to the storage address of the data segment 1012A on the storage medium 140 by use of, inter alia, the translation module 134 and forward map 160. The logical interface of the data segment 1012A may, therefore, comprise the logical identifier, Key_X. The logical interface may be determined by the storage metadata 135 (e.g., forward index 160) and the contextual storage format of the data segment 1012A on the storage medium 140 (e.g., persistent metadata 1014A).

In state 1015B, the key-value storage module 1065 may detect a key collision. As disclosed above, the key-value storage module 1065 may detect key collisions by use of, inter alia, the key translation module 1064 and/or forward map 160. Key collisions may be detected in response to requests to store key-value pairs comprising keys that have already been allocated within the logical address space 132. In the FIG. 10B embodiment, the new key-value pair may be assigned Key_X, which may conflict with the key-value pair stored in state 1015A. The conflicting key may be assigned by a hashing algorithm, a naming algorithm, the key translation module 1064, a storage client 106, or the like.

In response to identifying the key conflict, the key-value storage module 1065 may be configured to modify the logical interface of one or more of the conflicting key-value pair(s) to resolve the conflict. Modifying the logical interface of a key-value pair may comprise one or more range move operations. State 1015B depicts the result of a range move operation to move the key-value pair corresponding to the stored data segment 1012A to a different key (Key_Y) so that the new key-value pair can be associated with Key_X. The range move operation may comprise updating the storage metadata 135 (e.g., forward map 160) to tie Key_Y to the storage location of data segment 1012A. The range move operation may further comprise storing persistent metadata on the storage medium 140 configured to associate the data segment 1012A with the modified logical interface (e.g., Key_Y). The persistent metadata may be embodied as a persistent note 366. The contextual format of the data packet 1010A comprising the data segment 1012A may be updated to associate the data segment 1012A with Key_Y in one or more background storage operations, as disclosed above.

State 1015B may further comprise storing the new key-value pair on the storage medium 140 by appending a data packet 1010B to the storage medium 140 comprising the data segment 1012B. The data segment 1012B may be associated with persistent metadata 1014B that defines the logical interface of the data segment 1012B (Key_X), as disclosed herein.

Figure 10C:
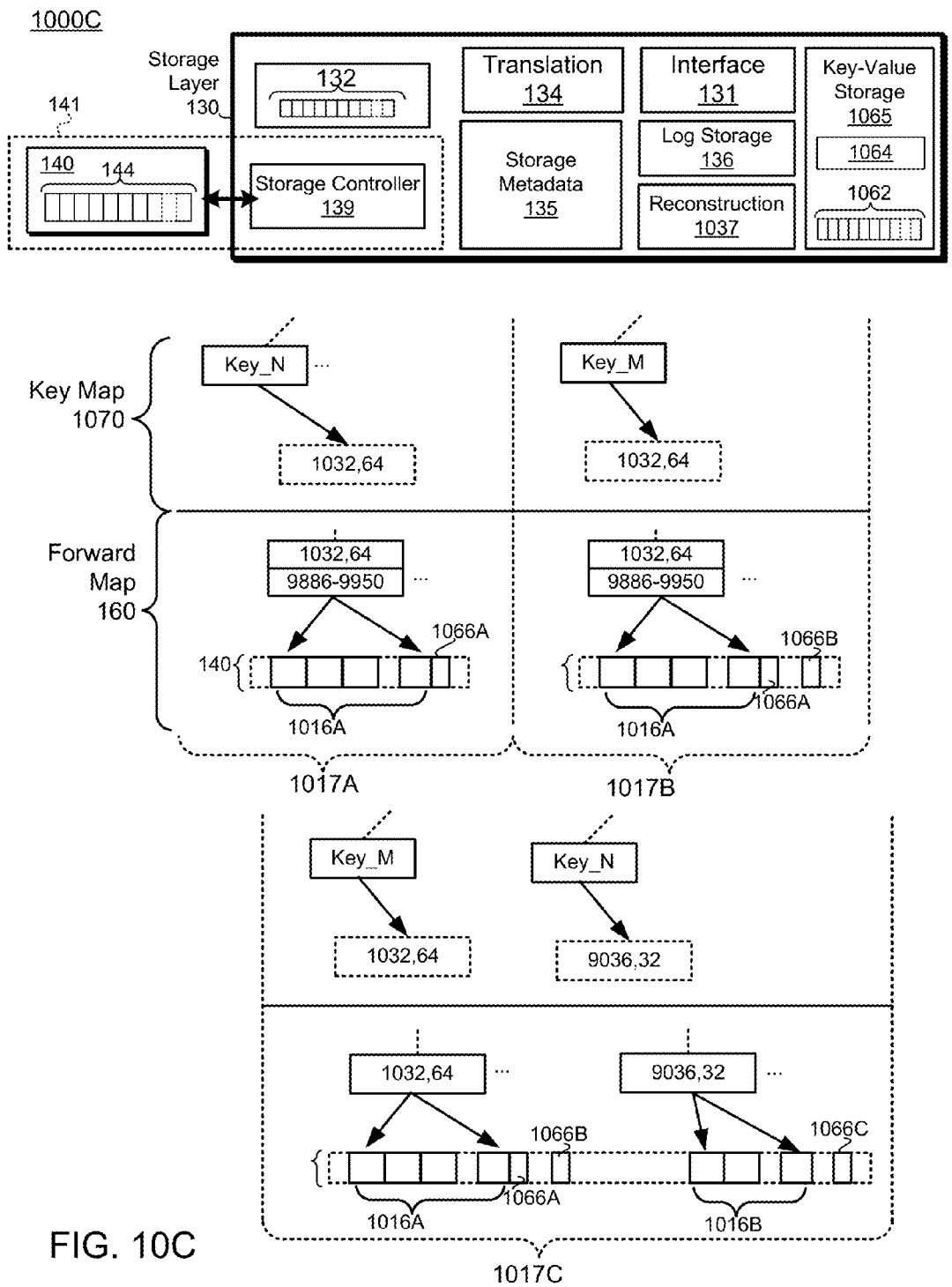
FIG. 10C depicts further embodiments of key-value storage operations.

FIG. 10C depicts another embodiment of a system 1000C comprising a storage layer 130 configured to manage key-value storage operations. In the FIG. 10C embodiment, the key translation module 1064 is configured to maintain a key address space 1062. The key address space 1062 may correspond to the key-value pairs stored on the storage medium 140. Accordingly, the key address space 1062 may comprise a plurality of keys (identifiers). In some embodiments, the key translation module 1064 may be configured to generate keys in response to requests from storage clients using, inter alia, a hashing technique, multi-level hashing technique (e.g., Cuckoo hashing), naming algorithm, and/or the like. Alternatively, keys may be provided by an external entity, such as a storage client 106 (e.g., operating system, file system, database, application, user, etc.).

The key translation module 1064 may be further configured to maintain a key map 1070 configured to translate between the keys of the key address space 1062 and an intermediate address space, such as the logical address space 132. The key map 1070 may comprise key entries configured to index keys to collections of one or more intermediate identifiers. The key map 1070 may be maintained within the storage metadata 135.

The storage layer 130 may be configured to implement key-value pair storage operations. Storing a key-value pair may comprise: a) the key translation module 1064 identifying logical identifiers of the logical address space 132 for the key-value pair; b) linking the key of the key-value pair to one or more of the identified logical identifiers; and c) storing data of the key-value pair on the storage medium 140. The data of the key-value pair may be stored in a contextual format that defines, inter alia, the logical interface of the data. As disclosed above, the logical interface of the data of a key-value pair may comprise the key bound to the data.

State 1017A illustrates storage of a key-value pair corresponding to Key_N on the storage medium 130. In response to a request to store the key-value pair, the key translation module 1064 may identify a set of logical identifiers in the logical address space 132 (e.g., logical identifiers 1032-1096). The logical identifiers may be allocated within the logical address space 132, as disclosed herein. The logical identifiers may be mapped to Key_N in the key map 1070.

Storing the key-value pair may comprise the log storage module 136 appending data of the key-value pair to the storage medium 140 and binding the appended data to the logical identifiers 1032,64, as disclosed herein. The data may be appended in a contextual format (e.g., as one or more data packets 1016A). The data packets 1016A may be stored with persistent metadata configured to bind the data to the intermediate identifiers (e.g., logical identifiers 1032,64). Storing the key-value pair may further comprise storing persistent data 1066A on the storage medium 140 configured to bind Key_N to the intermediate identifiers 1032,64. The persistent data 1066A may comprise a persistent note, persistent metadata, data packet, and/or the like.

As illustrated in state 1017A, the key translation module 1064 may reference the data of Key_N through the intermediate identifiers: the key translation module 1064 may identify the intermediate identifiers corresponding to Key_N by use of the key map 1070, and may determine the storage address of the corresponding data packets 1016A (9886-9950) by use of the forward map 160.

In state 1017B, the key-value storage module 1065 may be configured to resolve a naming conflict pertaining to Key_N. The naming conflict may arise due to a hash collision, name conflict, or the like. As disclosed above, the key-value storage module 1065 may be configured to resolve naming conflicts by modifying the logical interface of one or more key-value pairs. The logical interface of the key-value pairs may be modified without changing the corresponding data stored on the storage medium 140. In the FIG. 10C embodiment, the naming conflict may occur in response to a request to store a new key-value pair associated with Key_N. In response, the key-value storage module 1065 may be configured to modify the logical interface of the key-value pair stored in state 1017A (e.g., modify the logical interface of the existing key-value pair stored on the storage medium 140).

Modifying the logical interface of the stored key-value pair may comprise: a) identifying a different, alternative key for the key-value pair; and b) performing one or more range move operations to logically move the stored data to the identified key. The alternative key may be derived from the key-value pair itself. In some embodiments, the alternative key is selected using a multi-level hashing algorithm, such as a two-level Cuckoo hashing technique. Alternatively, or in addition, the alternative key may be provided by an external entity, as disclosed above.

The logical interface of the key-value pair may be modified without rewriting and/or changing the existing data of the key-value pair stored on the storage medium 140. As illustrated in state 1017B, modifying the logical interface of the key-value pair may comprise tying the alternative key (Key_M) to the intermediate identifiers 1032,64, which may comprise updating the key map 1070 and/or appending persistent data 1066B to the storage log on the storage medium 140. The persistent data 1066B may be configured to tie the alternative key (Key_M) to the intermediate, logical identifiers 1032,64, as disclosed above. The persistent metadata of the data packets 1016A may remain tied to the logical identifiers 1032,64. The storage layer 130 may provide access to the data of the key-value pair by reference to the modified logical interface (Key_M), as disclosed herein.

As depicted in state 1017C, in response to resolving the naming conflict, the key-value storage module 1065 may store the new key-value pair corresponding to Key_N. The new key-value pair may be stored as disclosed herein, which may comprise: a) identifying intermediate, logical identifiers for the key-value pair (e.g., logical identifies 9036,32), and b) storing data of the key-value pair (data packets 1016B) on the storage medium 140, bound to Key_N and the intermediate identifiers. Accordingly, the data packets 1016B may comprise persistent metadata comprising logical identifiers 9036,32. Storing the key-value pair may further comprise storing persistent data 1066C on the storage medium 140 configured to bind Key_N to the intermediate identifiers (e.g., logical identifiers 9036,32), as disclosed herein.

Figure 11:
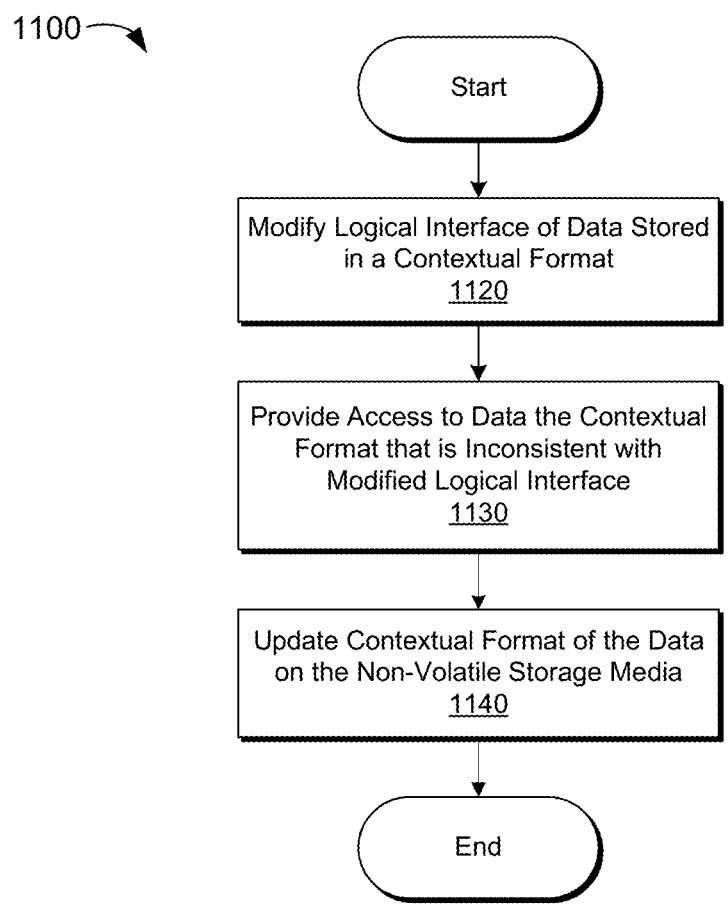
FIG. 11 is a flow diagram of one embodiment of a method for managing a logical interface of data storage in a contextual format on a non-volatile storage media.

FIG. 11 is a flow diagram of one embodiment of a method 1100 for managing a logical interface of data stored in a contextual format on a non-volatile storage medium.

Step 1120 may comprise modifying a logical interface of data stored in a contextual format on a non-volatile storage media. The logical interface may be modified at step 1120 in response to performing an operation on the data, which may include, but is not limited to, a clone operation, a deduplication operation, a move operation, or the like. The request may originate from a storage client 106, the storage layer 130 (e.g., deduplication module 374), or the like.

Modifying the logical interface may comprise modifying the LID(s) associated with the data, which may include, but is not limited to, referencing the data using one or more additional LIDs (e.g., clone, deduplication, etc.), changing the LID(s) associated with the data (e.g., a move), or the like. The modified logical interface may be inconsistent with the contextual format of the data on the storage medium 140, as disclosed above.

Step 1120 may further comprise storing a persistent note on the storage medium 140 that identifies the modification to the logical interface. The persistent note may be used to make the logical operation persistent and crash safe, such that the modified logical interface (e.g., storage metadata 135) of the data may be reconstructed from the contents of the storage medium 140 (if necessary). Step 1120 may further comprise acknowledging that the logical interface has been modified (e.g., returning from an API call, returning an explicit acknowledgement, or the like). The acknowledgement (and access through the modified logical interface at step 1130) occurs before the contextual format of the data is updated on the storage medium 140. Accordingly, the logical operation may not wait until the data is rewritten and/or relocated; as disclosed herein, updating the contextual format of the data may be deferred and/or implemented in a process that is outside of the "critical path" of the method 1100 and/or the path for servicing other storage operations and/or requests.

Step 1130 may comprise providing access to the data in the inconsistent contextual format through the modified logical interface of step 1120. As disclosed above, updating the contextual format of the data to be consistent with the modified contextual interface may comprise rewriting and/or relocating the data on the non-volatile storage media, which may impose additional latency on the operation of step 1120 and/or other storage operations pertaining to the modified logical interface. Therefore, the storage layer 130 may be configured to provide access to the data in the inconsistent contextual format while (or before) the contextual format of the data is updated. Providing access to the data at step 1130 may comprise referencing and/or linking to one or more reference entries corresponding to the data (via one or more indirect entries), as disclosed above.

Step 1140 may comprise updating the contextual format of the data on the storage medium 140 to be consistent with the modified logical interface of step 1120. Step 1140 may comprise rewriting and/or relocating the data to another media storage location on the storage medium 140. As disclosed above, step 1140 may be implemented using a process that is outside of the critical path of step 1120 and/or other storage requests performed by the storage layer 130; step 1140 may be implemented by another, autonomous module, such as media management module 370, deduplication module 374, or the like. Accordingly, the contextual format of the data may be updated independent of servicing other storage operations and/or requests. As such, step 1140 may comprise deferring an immediate update of the contextual format of the data and updating the contextual format of the data in one or more "background" processes, such as a media management process. Alternatively, or in addition, updating the contextual format of the data may occur in response to (e.g., along with) other storage operations. For example, a subsequent request to modify the data may cause the data to be rewritten out of place and in the updated contextual format.

Step 1140 may further comprise updating storage metadata 135 as the contextual format of the data is updated. As data is rewritten and/or relocated in the updated contextual format, the storage layer 130 may update the storage metadata 135 (e.g., forward map 160) accordingly. The updates may comprise removing one or more links to reference entries in a reference map 460 and/or replacing indirect entries with local entries, as disclosed above. Step 1140 may further comprise invalidating and/or removing a persistent note from the storage medium 140 in response to updating the contextual format of the data and/or persisting the storage metadata 135, as disclosed above.

Figure 12:
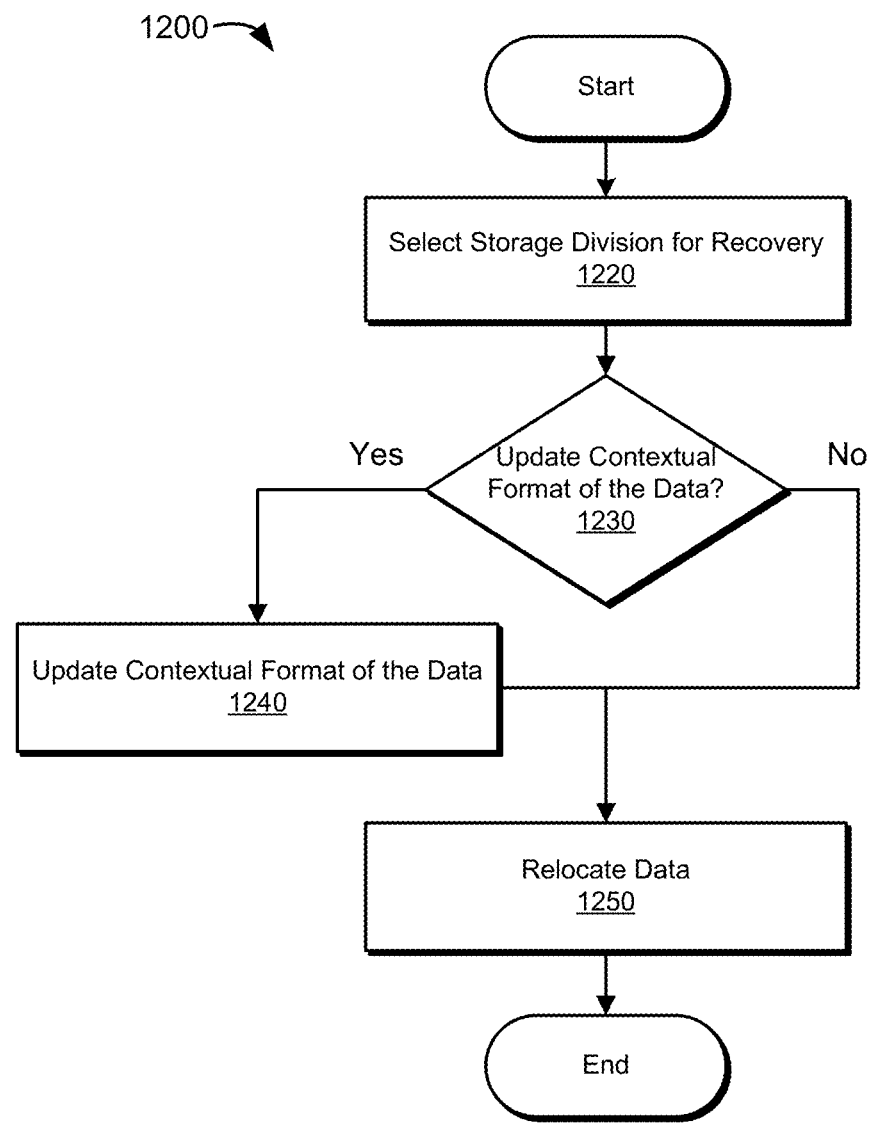
FIG. 12 is a flow diagram of one embodiment of a method for managing a logical interface of contextual data.

FIG. 12 is a flow diagram of another embodiment of a method 1200 for managing a logical interface of data stored in a contextual format on a non-volatile storage media. The method 1200 may be implemented by one or more modules and/or components of the storage layer 130, as disclosed herein.

Step 1220 comprises selecting a storage division for recovery, such as an erase block or logical erase block. As disclosed above, the selection of step 1220 may be based upon a number of different factors, such as a lack of available storage capacity, detecting a percentage of data marked as invalid within a particular logical erase block reaching a threshold, a consolidation of valid data, an error detection rate reaching a threshold, improving data distribution, data refresh, or the like. Alternatively, or in addition, the selection criteria of step 1220 may include whether the storage division comprises data in a contextual format that is inconsistent with a corresponding logical interface thereof, as disclosed above.

As disclosed above, recovering (or reclaiming) a storage division may comprise erasing the storage division and relocating valid data thereon (if any) to other storage locations on the non-volatile storage media. Step 1230 may comprise determining whether the contextual format of data to be relocated in a grooming operation should be updated (e.g., is inconsistent with the logical interface of the data). Step 1230 may comprise accessing storage metadata 135, such as the forward map 160, reference map 460, and/or intermediary address space, as disclosed above, to determine whether the persistent metadata (e.g., logical interface metadata) of the data is consistent with the storage metadata 135 of the data. If the persistent metadata is not consistent with the storage metadata 135 (e.g., associates the data with different LIDs, as disclosed above), the flow continues at step 1240; otherwise, the flow continues at step 1250.

Step 1240 may comprise updating the contextual format of the data to be consistent with the logical interface of the data. Step 1240 may comprise modifying the logical interface metadata to reference a different set of LIDs (and/or reference entries), as disclosed above.

Step 1250 comprises relocating the data to a different storage location in a log format that, as disclosed above, preserves an ordered sequence of storage operations performed on the non-volatile storage media. Accordingly, the relocated data (in the updated contextual format) may be identified as the valid and up-to-date version of the data when reconstructing the storage metadata 135 (if necessary). Step 1250 may further comprise updating the storage metadata 135 to bind the logical interface of the data to the new media storage locations of the data, remove indirect and/or reference entries to the data in the inconsistent contextual format, and so on, as disclosed herein.

Figure 13:
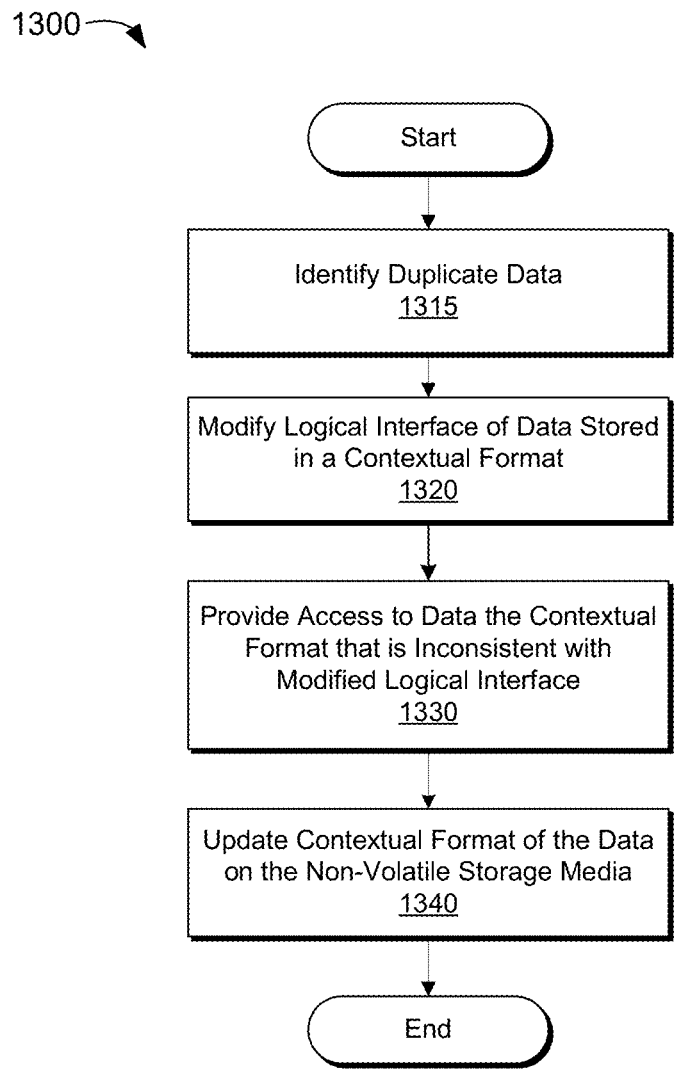
FIG. 13 is a flow diagram of another embodiment of a method for managing a logical interface of contextual data.

FIG. 13 is a flow diagram of another embodiment of a method 1300 for managing logical interfaces of data stored in a contextual format. Step 1315 may comprise identifying duplicate data on the storage medium 140. Step 1315 may be performed by a deduplication module 374 operating within the storage layer 130. Alternatively, step 1315 may be performed by the storage layer 130 as storage operations are performed.

Step 1315 may comprise determining and/or verifying that the storage medium 140 comprises duplicate data (or already comprises data of a write and/or modify request). Accordingly, step 1315 may occur within the path of a storage operation (e.g., as or before duplicate data is written to the storage medium 140) and/or may occur outside of the path of servicing storage operations (e.g., identify duplicate data already stored on the storage medium 140). Step 1315 may comprise generating and/or maintaining data signatures in storage metadata 135 and using the signatures to identify duplicate data.

In response to identifying the duplicate data at step 1315, the storage layer 130 (or other module, such as the deduplication module 374) may modify a logical interface of a copy of the data, such that a single copy may be referenced by two (or more) sets of LIDs. The modification to the logical interface at step 1320 may comprise updating storage metadata 135 and/or storing a persistent note on the storage medium 140, as disclosed above. Step 1320 may further comprise invalidating and/or removing other copies of the data on the non-volatile storage media, as disclosed above.

The contextual format of the data on the storage medium 140 may be inconsistent with the modified logical interface. Therefore, steps 1330 and 1340 may comprise providing access to the data in the inconsistent contextual format through the modified logical interface and updating the contextual format of the data on the storage medium 140, as disclosed above.

Figure 14:
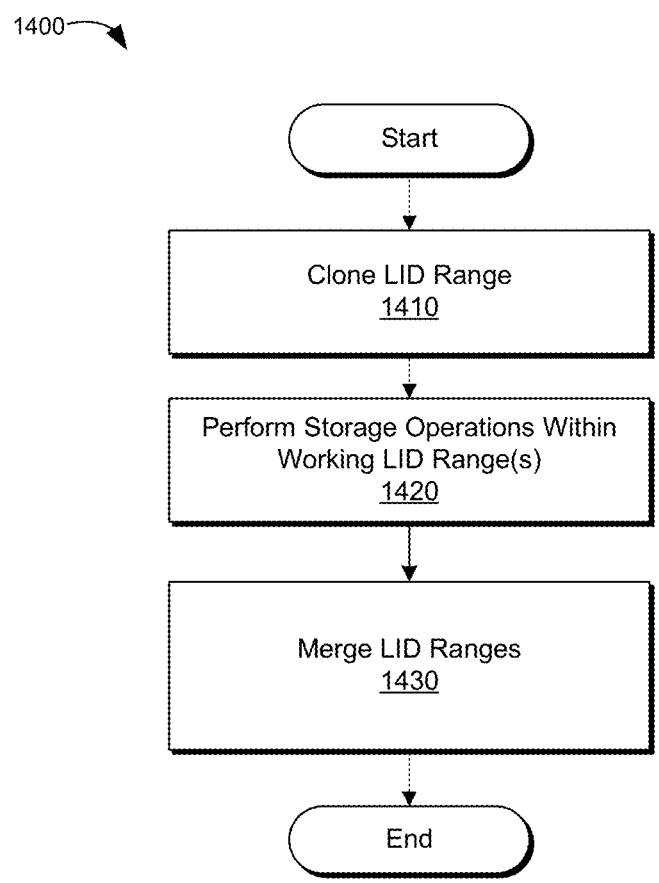
FIG. 14 is a flow diagram of one embodiment of a method for managing range merge operations.

FIG. 14 is a flow diagram of one embodiment of a range merge operation 1400 implemented by the storage layer 130 disclosed herein. Step 1410 may comprise cloning a set of LIDs within a logical address space 132. Cloning the LIDs may comprise referencing the same set of data on the storage medium 140 (e.g., the same storage locations and/or storage addresses) through two or more different sets of LIDs. The two or more sets may include a working set of LIDs and an original, consistency set of LIDs. The working set of LIDs may be used to perform file modification operations, and the original, consistency set of LIDs may be configured to maintain an original, unmodified state of the data.

As disclosed above, the data cloned at step 1410 may be referenced by a set of LIDs, which may be bound to storage locations of the data on the storage medium 140. Step 1410 may comprise allocating one or more other sets of LIDs within the logical address space 132 and/or within a separate address space. The one or more other sets of LIDs may comprise a logical capacity that is equivalent to the logical capacity of the original set of LIDs (e.g., may include the same number of LIDs and/or correspond to the same amount of storage capacity). Step 1410 may further comprise associating and/or binding the logical identifiers of the one or more other sets of LIDs with the same data referenced by the original set of LIDs. Accordingly, step 1410 may comprise modifying the logical interface of the data to associate the data with two or more different sets of LIDs. In some embodiments, step 1410 comprises allocating one or more sets of LIDs within the logical address space 132, and binding the LIDs to the same set of storage addresses. Alternatively, or in addition, step 1410 may comprise creating one or more reference entries within a reference map 460 to indirectly link the LIDs of the two or more different sets of LIDs to the storage addresses through one or more reference entries, as disclosed in conjunction with FIGS. 4A-E. Alternatively, step 1410 may be implemented by use of one or more intermediate mapping layers (e.g., as disclosed in conjunction with FIGS. 5A-B). Step 1410 may further comprise linking the two or more sets of LIDs through, inter alia, metadata 984 and/or 994 associated with the LIDs. The metadata 984 and/or 994 may be configured to indicate that the LID sets represent clones of the same storage entity (e.g., versions of the same file). The metadata 984 and/or 994 may be further configured to specify and/or reference a merge policy for the two or more sets of LIDs, as disclosed above.

Step 1410 may further comprise storing a persistent note 366 on the storage medium 140 configured to make the clone operation of step 1410 persistent and crash safe. The persistent note 366 may be configured to indicate the modified logical interface of the data (e.g., associate the data with the two or more sets of LIDs), indicate a merge policy of the clone operation, and the like.

Step 1420 may comprise performing storage operations within one or more of the LID ranges of step 1410. The storage operations may be performed in response to requests received through the interface 131 from one or more storage clients 106. The storage operations may comprise appending data to the storage medium 140. The storage operations may, therefore, comprise modifying the associations and/or bindings between LIDs in one or more LID sets and storage locations on the storage medium 140. Modifying the associations and/or bindings may further comprise mapping LIDs in one or more of the LID sets to the appended data directly and/or through one or more indirect references and/or mapping layers.

Step 1430 may comprise merging the LID sets, as disclosed above. Merging LID sets may comprise incorporating modifications made in one of the LID ranges into one or more of the LID sets, as disclosed above. Step 1430 may further comprise resolving one or more merge conflicts in accordance with a merge policy. In some embodiments, merging comprises deleting (e.g., invalidating) one or more of the LID sets, which may comprise removing entries from the forward map 160, removing shared references to storage locations from a reference count datastructure, removing reference entries from a reference map 460, removing references in an intermediate mapping layer, and/or the like. Step 1430 may further comprise modifying a logical interface of the merged data, as disclosed above. The modified logical interface may update the LIDs used to reference data that was originally stored in reference to one or more of the LID sets. The modified logical interface may be inconsistent with the contextual format of the data on the storage medium 140. Therefore, step 1430 may comprise appending one or more persistent notes 366 on the storage medium 140 to associate merged data with an updated logical interface of the data (e.g., associate data originally stored in association with LIDs in the second set with LIDs in the first set). Step 1430 may further comprise providing access to the data in the inconsistent contextual format and/or updating the contextual format of the data in one or more background operations, as disclosed above.

Figure 15:
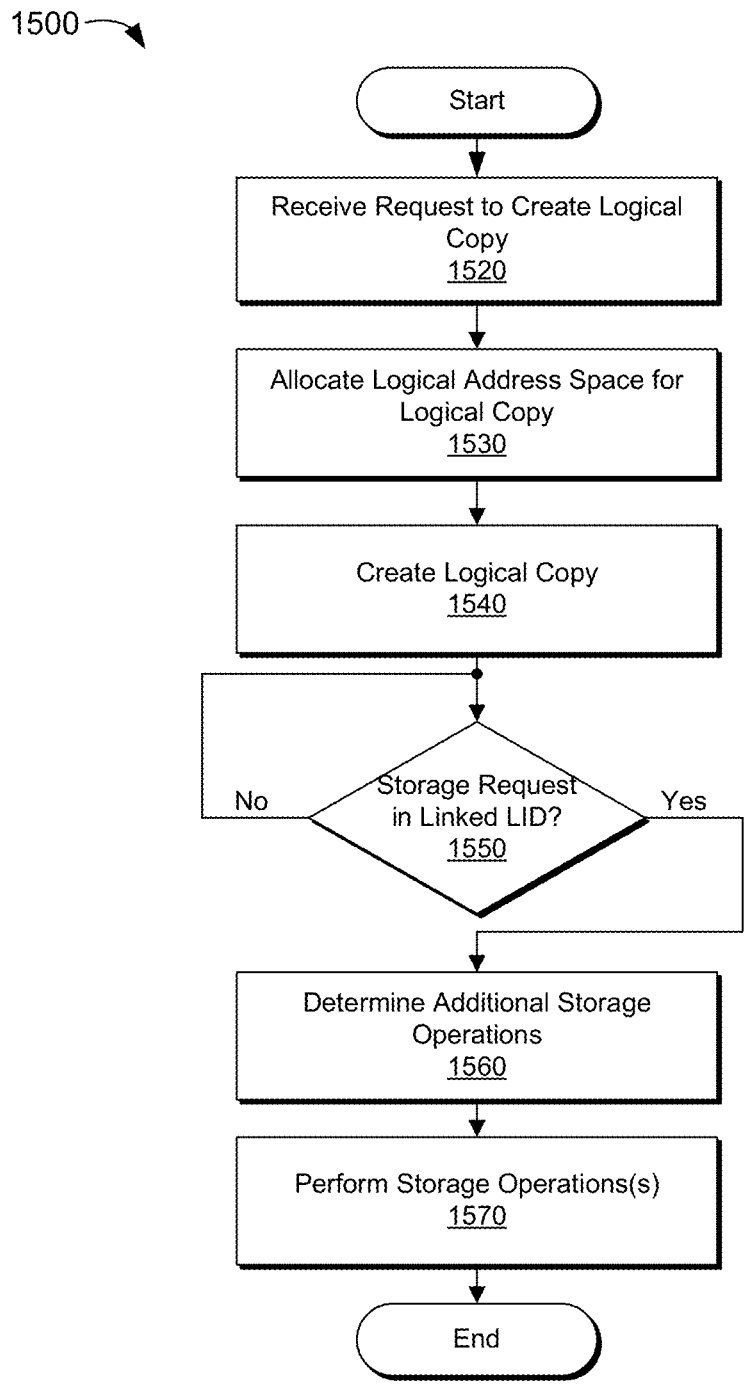
FIG. 15 is a flow diagram of another embodiment of a method for managing range clone operations.

FIG. 15 is a flow diagram of another embodiment of a method 1500 for range merge operations. Step 1520 may comprise receiving a request to create a logical copy of a LID range. The request may be received from a storage client 106 through an interface 131 and/or may be part of a higher-level API provided by the storage layer 130. The request may include an "operational mode" of the clone, which may include, but is not limited to, how the clones are to be synchronized, if at all; how merging is to occur (merge policy); whether the logical copy is to be designated as ephemeral; and so on.

Step 1530 may comprise allocating LIDs in the logical address space 132 to service the request. The allocation of step 1530 may further comprise reserving physical storage space to accommodate changes to the cloned LID range. The reservation of physical storage space may be predicated on the operational mode of the clone. For instance, if all changes are to be synchronized between the clone and the original address range, a small portion (if any) of physical storage space may be reserved. Alternatively, the storage layer 130 may reserve additional physical storage capacity for logical copy operations having a copy-on-conflict merge policy. Step 1530 may further comprise allocating the clone within a designated portion or segment of the logical address space 132 (e.g., a range dedicated for use with logical copy and/or clone operations). Accordingly, step 1530 may comprise allocating a second, different set of LIDs to clone a first set of LIDs.

Step 1540 may comprise updating the logical interface of data corresponding to the clone to reference both the original LIDs bound to the data and the cloned LIDs allocated at step 1530. Step 1540 may comprise storing a persistent note 366 on the storage medium 140, as disclosed above.

Step 1550 comprises receiving a storage request and determining if the storage request pertains to a LID in the first and/or second sets (cloned LID range). If so, the flow continues at step 1560; otherwise, the flow remains on step 1550.

Step 1560 may comprise determining what (if any) operations are to be taken on the other associated LID ranges (e.g., synchronize allocation operations, etc.). The determination of step 1560 may comprise accessing metadata 984 and/or 994, which may comprise and/or reference the synchronization policy of the clone.

Step 1570 may comprise performing the operations (if any) determined at step 1560 along with the requested storage operation. If one or more of the synchronization operations cannot be performed (e.g., additional logical address space 132 for one or more of the clones cannot be allocated), the underlying storage operation may fail.

Figure 16:
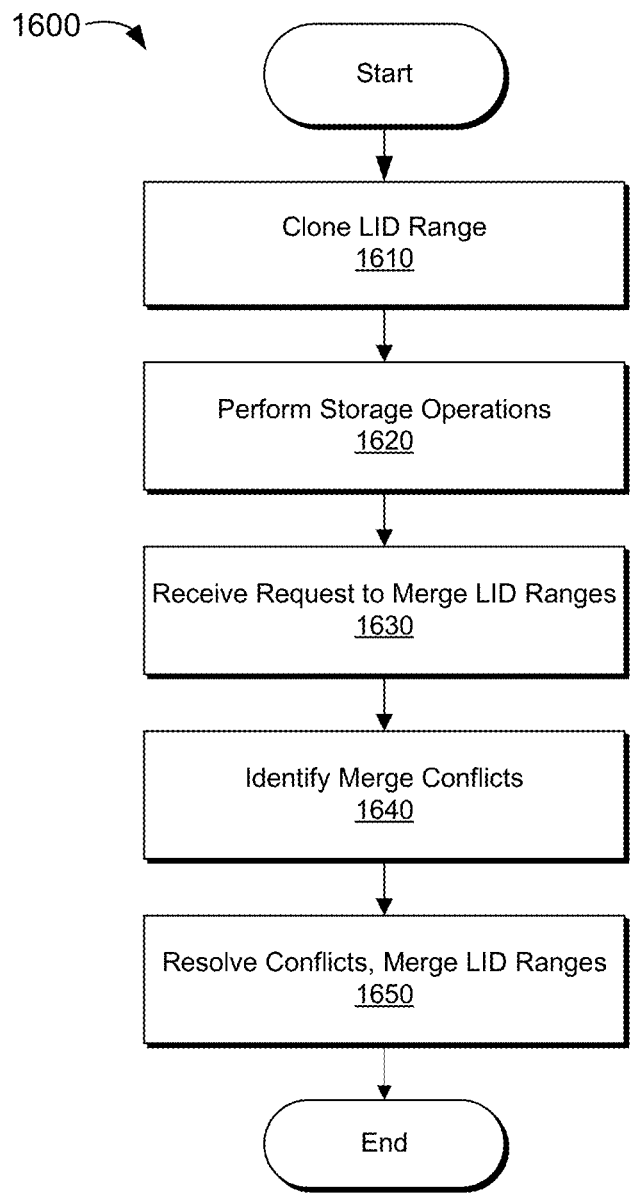
FIG. 16 is a flow diagram of another embodiment of a method for managing range merge operations.

FIG. 16 is a flow diagram of another embodiment of a method 1600 for implementing range clone and/or range merge operations. Step 1610 may comprise cloning a LID range, as disclosed above. Step 1610 may comprise cloning a set of LIDs associated with data stored on the storage medium 140 at respective storage addresses. Step 1610 may, therefore, comprise associating two or more different sets of LIDs with the same set of storage locations (e.g., the same data). Step 1610 may further comprise storing one or more persistent notes 366 on the storage medium 140 and/or rewriting the data in an updated contextual format, as disclosed above. Step 1610 may include linking the two or more sets of LIDs through, inter alia, metadata 984 and/or 994. The metadata 984 and/or 994 may comprise and/or reference a clone synchronization policy, merge policy, and/or the like, as disclosed above.

Step 1620 may comprise performing storage operations in reference to one or more of the cloned LID ranges. Step 1620 may comprise synchronizing allocation operations between the cloned ranges. The storage operations of step 1620 may comprise appending data to the storage medium 140 and/or associating the appended data with LIDs of one or more of the LID ranges.

Step 1630 comprises receiving a request to merge the two or more LID ranges of step 1610. The merge request may be received through the interface 131 and/or may be part of another, higher-level operation, such as an atomic storage operation or the like.

Step 1640 may comprise identifying merge conflicts (if any) between the two or more sets of LIDs. Identifying merge conflicts may comprise identifying LIDs that were modified within more than one of the cloned LID ranges. Referring back to FIG. 9C, step 1640 may comprise identifying a merge conflict in state 941D in response to determining that the LIDs 072-073 in range 914 were modified, as were the corresponding LIDs 972-973 in range 924. As such, step 1640 may comprise comparing modifications within the LID clones to identify cases where conflicting modifications would map to the same LID in the merge operation.

Step 1650 may comprise resolving merge conflicts identified at step 1640. Step 1650 may comprise determining an applicable merge policy, which, as disclosed above, may determine how merge conflicts are to be resolved. The merge policy may specify which version of a LID is included in the merged LID range and/or whether conflicts are resolved by maintaining separate copies of the LID ranges. Step 1650 may further comprise merging the LID ranges in accordance with the resolved merge conflicts, as disclosed above.

Figure 17:
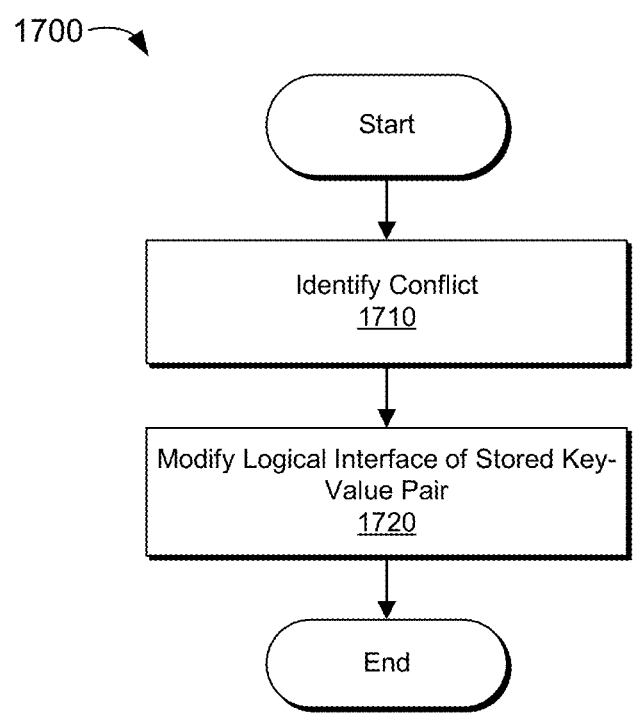
FIG. 17 is a flow diagram of one embodiment of a method for managing key-value storage operations.

FIG. 17 is a flow diagram of one embodiment of a method 1700 for managing key-value storage operations. Step 1710 may comprise identifying a conflict. The conflict of step 1710 may comprise a name and/or key conflict pertaining to a stored key-value pair. The conflict may be identified in response to a storage request pertaining to a key that already exists on the storage medium 140 and/or has already been allocated. The conflict may be identified by use of a forward map 160 (e.g., by determining that the key of a new key-value pair for storage on the storage medium 140 already exists within the forward map 160). Alternatively, or in addition, the conflict may be identified by use of a key map 1070 (e.g., by determining that a mapping between the key and one or more intermediate identifiers already exists within the key map 1070).

Step 1720 may comprise resolving the conflict by, inter alia, modifying the logical interface of the stored key-value pair. As disclosed herein, modifying the logical interface of the key-value pair may comprise: a) identifying a different, alternative key for the key-value pair; and b) moving the data to the alternative key in a range move operation. The range move operation may be implemented by use of any of the range move embodiments disclosed herein, including the direct reference embodiments of FIGS. 3A-E and 10A-B; the reference entry embodiments of FIGS. 4A-E; and/or the intermediate mapping layer embodiments of FIGS. 5A-B and 10C. The range move operations may comprise updating storage metadata 135, such as the forward map 160, key map 1070, and/or the like, to bind the alternative key to the existing data of the stored key-value pair. The range move operation may further comprise storing persistent data on the storage medium 140 configured to bind the alternative key to the existing data. Step 1720 may further comprise providing access to the stored key-value pair through the alternative key and/or informing one or more storage clients 106 of the change to the key-value pair (e.g., providing the alternative key to the storage clients 106).

Figure 18:
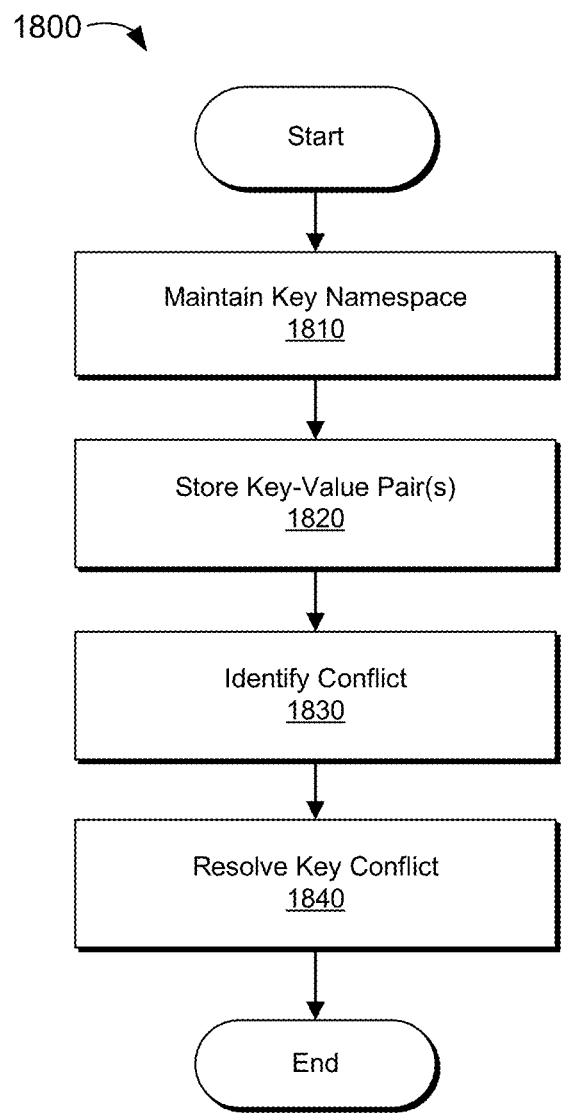
FIG. 18 is a flow diagram of another embodiment of a method for managing key-value storage operations.

FIG. 18 is a flow diagram of another embodiment of a method 1800 for managing key-value storage operations. Step 1810 may comprise maintaining a key namespace. The key namespace may correspond to a logical address space 132, a VAS 532 (e.g., as disclosed in FIGS. 5A-B), and/or a separate key address space 1062 (e.g., as disclosed in FIG. 10C). Maintaining the key namespace may comprise generating keys, deriving keys from key-value pairs, allocating keys, indexing allocated keys, and/or mapping keys to storage addresses within a storage address space 144. Keys may be mapped to storage addresses directly by use of a forward map 160 and/or indirectly through a key map 1070 and intermediate address space (e.g., logical address space 132), as disclosed in conjunction with FIGS. 5A-B and 10C.

Step 1820 may comprise storing one or more key-value pairs on a storage medium 140. As disclosed herein, storing a key-value pair may comprise: a) identifying, allocating, and/or generating a key for the key-value pair within the key address space 1062; b) storing data of the key-value pair on the storage medium 140, in association with persistent data configured to bind the stored data to the corresponding key (e.g., by use of persistent metadata 114 of a data packet 110); and c) binding the stored data to the key by use of, inter alia, the storage metadata 135 (e.g., the forward map 160, key map 1070, and/or the like).

Step 1830 may comprise identifying a key conflict pertaining to a key-value pair stored on the storage medium. The key conflict may be identified in response to a request to store on the storage medium 140 a key-value pair having a key that conflicts with the key of the stored key-value pair. The conflict may occur due to, inter alia, a hash collision, a name collision, and/or the like, as disclosed herein.

Step 1840 may comprise resolving the key conflict. Resolving the key conflict may comprise moving the stored key-value pair to a different, alternative key. Resolving the key conflict may, therefore, comprise modifying the logical interface of the stored key-value pair to allow the stored key-value pair to be referenced by use of the different, alternative key. Modifying the logical interface of the stored key-value pair may comprise one or more range move operations to move data of the key-value pair stored on the storage medium 140 from its original, unmodified key to the different, alternative key. Step 1840 may, therefore, comprise storing data on the storage medium 140 configured to bind data of the key-value pair to the alternative key, as disclosed herein. In some embodiments, the alternative key may be bound directly to storage addresses of the data of the key-value pair (e.g., as illustrated in FIGS. 10A-10B). In other embodiments, the alternative key may be bound to the data of the key-value pair by use of one or more intermediate identifiers, as illustrated in FIG. 10C.

Step 1840 may further comprise selecting the alternative key for the stored key-value pair. The alternative key may be selected according to a multi-layer hashing technique, such as Cuckoo hashing, or the like. The alternative hashing and/or naming algorithm may be configured to select a suitable alternative key for the stored key-value pair. Step 1840 may further comprise publishing the new logical interface of the stored key-value pair, which may include, but is not limited to: a) providing the alternative key to one or more storage clients 106, b) indexing the stored key-value pair to the alternative key (e.g., by use of the key map 1070, forward map 160, and/or the like); and/or c) providing for accessing the stored key-value pair by use of the alternative key, as disclosed herein.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

The invention claimed is:

1. A method, comprising:
    writing key-value pairs to a non-volatile storage medium, a key-value pair including a data segment and an associated key;
    detecting a name conflict involving a key associated with a data segment stored on the non-volatile storage medium; and
    resolving the name conflict, comprising:
        selecting an alternate key for the stored data segment;
        modifying a key mapping of the stored data segment to associate the stored data segment with the alternative key; and
        storing persistent data on the non-volatile storage medium to associate the stored data segment with the alternative key.

2. The method of claim 1, wherein modifying the key mapping of the stored data segment to associate the stored data segment with the alternative key comprises storing a packet on the non-volatile storage medium configured to associate the data segment stored on the non-volatile medium with the alternate key.

3. The method of claim 1, wherein modifying the key mapping of the stored data segment to associate the stored data segment with the alternative key comprises storing metadata on the non-volatile storage medium configured to associate an intermediate identifier corresponding to the data segment stored on the non-volatile storage medium with the alternate key.

4. The method of claim 1, further comprising:
    maintaining a key map corresponding to key-value pairs stored on the non-volatile storage medium; and
    identifying the name conflict by use of the key map.

5. The method of claim 1, further comprising generating the alternate key.

6. The method of claim 1, further comprising:
    relocating the data segment from a first storage address on the storage medium to a second storage address on the storage medium; and
    associating the relocated data segment with persistent metadata corresponding to the alternate key.

7. An apparatus, comprising:
    a non-volatile storage medium; and
    one or more control circuits configured to write key-value pairs to the non-volatile storage medium and read key-value pairs from the non-volatile storage medium, where a key-value pair includes a data segment and an associated key, the one or more control circuits further configured to detect a key collision involving a key of a data segment stored on the non-volatile storage medium, select an alternative key for the stored data segment, modify a key mapping of the stored data segment to associate the stored data segment with the alternative key and store persistent data on the non-volatile storage medium to associate the stored data segment with the alternative key.

8. The apparatus of claim 7, wherein the persistent data is configured to bind a storage address of the stored data segment to the alternative key.

9. The apparatus of claim 7, wherein the persistent data is configured to bind an intermediate address of the stored data to the alternative key.

10. The apparatus of claim 7, wherein the data segment is stored in a data packet comprising the key of the data segment, and wherein the one or more control circuits are configured to provide access to the data segment stored in the data packet by use of the alternative key.

11. The apparatus of claim 7, wherein the key collision corresponds to a request to store a new key-value pair on the storage medium, one or more control circuits are further configured to allocate intermediate identifiers for the new key-value pair, and to bind the allocated intermediate identifiers to a data segment corresponding to the new key-value pair stored on the storage medium.

12. The apparatus of claim 11, further comprising a log storage module configured to store the data segment corresponding to the new key-value pair in a packet format comprising the key.

13. The apparatus of claim 11, further comprising a translation layer configured to map the key to the intermediate identifiers allocated for the new key-value pair.

14. The apparatus of claim 7, wherein one or more control circuits are configured to generate the alternative key by use of data of the data segment stored on the storage medium.

15. The apparatus of claim 7, wherein one or more control circuits are configured to generate the alternative key by use of two-layer hashing.

16. The apparatus of claim 7, wherein the one or more control circuits are further configured to resolve the key collision and provide access to the stored data segment by use of the alternate key.

17. A system, comprising:
a non-volatile storage medium;
means for writing data to and reading data from the non-volatile storage medium;
means for associating a data segment stored at a first set of one or more storage addresses of the non-volatile storage medium with persistent metadata configured to bind the data segment to an identifier;
means for detecting a name conflict pertaining to the identifier of the stored data segment; and
means for selecting a different identifier of the stored data segment and storing persistent metadata on the non-volatile storage medium to bind the different identifier with the stored data segment.

18. The system of claim 17, further comprising means for storing a packet on the non-volatile storage medium configured to bind the first set of storage addresses to the different identifier.

19. The system of claim 18, wherein the packet is configured to bind the different identifier to one or more intermediate addresses, and wherein the intermediate addresses are bound to the first set of storage addresses of the non-volatile storage medium.

20. The system of claim 17, wherein the means for detecting the name conflict comprises means for maintaining a key address space comprising identifiers corresponding to data segments stored on the non-volatile storage medium.

* * * * *